(12) United States Patent
Kawamoto et al.

(10) Patent No.: US 11,422,142 B2
(45) Date of Patent: Aug. 23, 2022

(54) REAGENT CONTAINER, REAGENT SUCTION METHOD AND SAMPLE MEASURING APPARATUS

(71) Applicant: SYSMEX CORPORATION, Kobe (JP)

(72) Inventors: Yutaka Kawamoto, Kobe (JP); Tomohiro Kuroiwa, Kobe (JP); Shingo Kaida, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 425 days.

(21) Appl. No.: 16/258,029

(22) Filed: Jan. 25, 2019

(65) Prior Publication Data

US 2019/0227092 A1    Jul. 25, 2019

(30) Foreign Application Priority Data

Jan. 25, 2018  (JP) .............................. JP2018-010331

(51) Int. Cl.
*G01N 35/10* (2006.01)
*B01L 3/00* (2006.01)
*B65D 51/20* (2006.01)

(52) U.S. Cl.
CPC ........ *G01N 35/1002* (2013.01); *B01L 3/5082* (2013.01); *B01L 3/50825* (2013.01);
(Continued)

(58) Field of Classification Search
CPC ............. B01L 2300/042; B01L 3/5082; B01L 3/50825; B01L 3/52; B65D 51/20; G01N 35/1002; G01N 35/1079; Y10S 215/00
See application file for complete search history.

(56) References Cited

U.S. PATENT DOCUMENTS 6,145,688 A    11/2000   Smith
7,727,474 B2 *  6/2010   Krause ................... B01L 3/022
                                                    422/513

(Continued)

FOREIGN PATENT DOCUMENTS

JP    2004-157020 A    6/2004
JP    2006349683 A    12/2006
(Continued)

OTHER PUBLICATIONS

Extended European search report dated Jun. 24, 2019 in a counterpart European patent application No. 19153233.2.

(Continued)

*Primary Examiner* — Jennifer Wecker
(74) *Attorney, Agent, or Firm* — Crowell & Moring LLP

(57) ABSTRACT

The present invention is directed to suppress adhesion of a reagent to the periphery of an opening of a reagent container. The reagent container is a reagent container used for a sample measuring apparatus having a suction tube for suctioning a reagent, and includes a reagent, an upper surface part having an opening, a side surface part, and a bottom surface part that defines an internal space in which the reagent is stored, and a suction tube introducing part extending from the upper surface part to a position above the liquid level of the reagent to introduce the suction tube received from above the opening into the internal space.

20 Claims, 24 Drawing Sheets

(52) U.S. Cl.
CPC ................ *B01L 3/52* (2013.01); *B65D 51/20* (2013.01); *B01L 2300/042* (2013.01); *G01N 35/1079* (2013.01); *Y10S 215/00* (2013.01)

(56) References Cited

U.S. PATENT DOCUMENTS

| | | | |
|---|---|---|---|
| 2004/0067169 | A1 | 4/2004 | Krause |
| 2007/0287193 | A1* | 12/2007 | Pressman ................ B01L 3/502 |
| | | | 436/178 |
| 2008/0085222 | A1 | 4/2008 | Fukuda et al. |
| 2009/0139326 | A1 | 6/2009 | Kanahara |
| 2010/0233035 | A1 | 9/2010 | Denawa et al. |
| 2011/0244580 | A1* | 10/2011 | Hamada ........... G01N 35/00732 |
| | | | 436/43 |
| 2016/0023210 | A1 | 1/2016 | Birkner et al. |

FOREIGN PATENT DOCUMENTS

| | | |
|---|---|---|
| JP | 2008-96195 A | 4/2008 |
| JP | 2009-98114 A | 5/2009 |
| WO | 2006/104076 A1 | 10/2006 |

OTHER PUBLICATIONS

Japanese Office Action dated Oct. 5, 2021 in a counterpart Japanese patent application No. 2018-010331.

\* cited by examiner

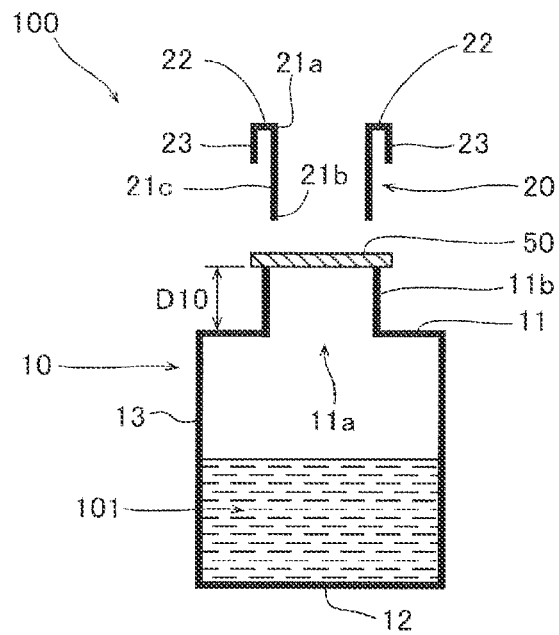
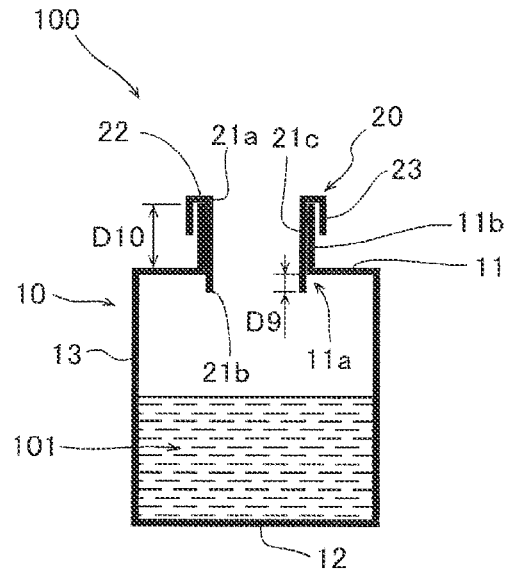
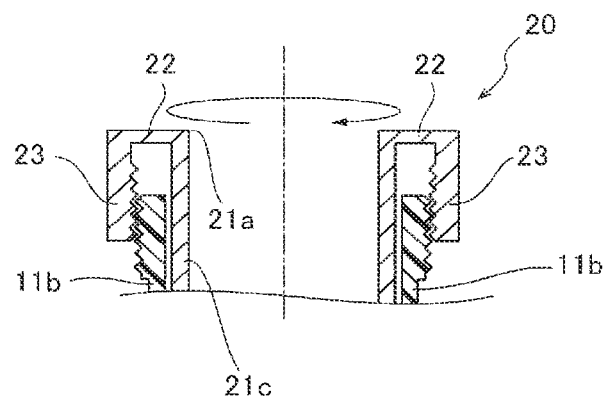

Stir direction

REAGENT CONTAINER, REAGENT SUCTION METHOD AND SAMPLE MEASURING APPARATUS

RELATED APPLICATIONS

This application claims priority from prior Japanese Patent Application No. 2018-010331, filed on Jan. 25, 2018, entitled: "Reagent Container, Reagent Suction Method and Sample Measuring Apparatus", the entire contents of which are incorporated herein by reference.

BACKGROUND OF THE INVENTION

1. Field of the Invention

There are reagent containers for containing a reagent used for analysis of a sample by a sample measuring apparatus (for example, refer to Japanese Patent Application Publication No. 2006-349683).

2. Description of the Related Art

As shown in FIG. 37, the reagent container of Japanese Patent Application Publication No. 2006-349683 includes a container body 910 having an uppermost part 911, a bottom part 912, and an opening part 913, and a hollow baffle 920 disposed inside the container body 910 and extending vertically such that an upper end thereof is connected to the opening part 913 and a lower end thereof is disposed near the bottom portion 912. The hollow baffle 920 is a cylindrical member having a tubular side wall 921, a first opening 922 at the upper end, and a second opening 923 at the lower end, and the first opening 922 and the second opening 923 are sealed with a seal material 924.

FIG. 37 shows a state in which the upper and lower seal members 924 are broken during use. As the seal member 924 is broken, the reagent flows into the hollow baffle 920. A suction pipe (not shown) of the sample measuring apparatus passes through the first opening 922 and suctions the reagent 930 in the container body 910. The second opening 923 of the hollow baffle 920 is immersed in the reagent 930. Therefore, the interior of the container main body 910 is partitioned into two chambers: the inside of the hollow baffle 920 and the outside of the hollow baffle 920, and movement of the reagent 930 is restricted. In this way the reagent container of Japanese Patent Application Publication No. 2006-349683 described above suppresses the formation of bubbles in the container during transportation and handling.

SUMMARY OF THE INVENTION

Japanese Patent Application Publication No. 2006-349683, however, droplets may be splashed during the operation of the sample measuring apparatus when the seal material is broken at the time of use and the interior of the hollow baffle is immersed in the reagent (the state shown in FIG. 37), and if the reagent container is inclined, there is a possibility that the droplets of the reagent may adhere to the periphery of the opening on the inner side of the hollow baffle producing the possibility that a liquid film of the reagent may form around the opening. In the sample measuring apparatus, when detection of the liquid surface of the reagent is performed by the method of detecting a change in electrostatic capacity of the suction tube, there is a possibility that liquid droplets or a liquid film may form above the liquid surface on the inner surface of the hollow baffle causing erroneous detection of the reagent liquid surface at a position different from the actual reagent liquid surface due to contact between the liquid droplets or liquid film and the suction tube. Since erroneous detection of the liquid level of the reagent may lead to a decrease in the quantitative performance of the reagent, it is desirable to suppress adhesion of the reagent around the opening of the reagent container.

The present invention is directed to suppressing adhesion of a reagent to the periphery of an opening of a reagent container.

A reagent container according to a first aspect of the invention is a reagent container (100) for use in a sample measuring apparatus (500) having a suction tube (531) for suctioning a reagent (101), the reagent container (110 including a reagent (101), an upper surface part (11) having an opening (11a) and a bottom part (12), and a side part (13) for partitioning or defining an internal space for storing the reagent (101), and a suction tube introducing part (20) extending from the upper surface part (11) to a position above the liquid surface (30) of the reagent (101), for introducing the suction tube (531) received from above the opening (11a) into the internal space.

In the reagent container according to the first aspect, as described above, the suction tube introducing part (20) is disposed so as to extend from the upper surface part (11) to a position above the liquid surface (30) of the reagent (101) to receive the suction tube (531) from above the opening (11a) and introduce the suction pipe (531) into the internal space. In this way, since the suction tube introducing part (20) extends from the upper surface part (11) to a position above the liquid surface (30), liquid droplets splashed during operation of the sample measurement apparatus (500) can be prevented from adhering to the periphery of the opening (11a) of the reagent container even if the reagent container (100) is inclined. Since the suction tube introducing part (20) is positioned above the liquid surface (30), droplets of reagent splashed during the operation of the sample measuring apparatus (500) only adhere to the exterior side surface of the suction tube introducing part (20) even when the reagent container (100) is inclined, thereby preventing reagent (101) from adhering to the inner side of the suction tube introducing part (20). As a result, it is difficult for liquid droplets to adhere to the inner peripheral surface side of the suction tube introducing part (20), and formation of liquid droplets and liquid film of the reagent (101) around the opening is suppressed. As described above, it is possible to prevent the reagent (101) from adhering to the periphery of the opening of the reagent container (100). As a result, formation of liquid droplets and a liquid film at positions above the liquid surface (30) is suppressed, so that erroneous detection of the reagent liquid surface at a position different from the actual reagent liquid surface can be suppressed in the sample measuring apparatus (500).

In the reagent container according to a first aspect, the suction tube introducing part (20) preferably is provided at a position away from the side surface part (13). According to this configuration, it is possible to make it difficult for the liquid droplets splashed from the side surface part (13) to adhere to the inside of the suction tube introducing part (20) by the separation of the suction tube introducing part (20) from the side surface part (13).

The reagent container according to the first aspect preferably also includes a container body (10) having an upper surface part (11), a bottom surface part (12) and a side surface part (13), and the suction tube introducing part (20) is separate from the container body (10) and configured to be detachable from the reagent container (100). According to this configuration, the suction tube introducing part (20) can be removed from the reagent container (100), for example, when the reagent container (100) is transported in a state of containing the reagent (101). Since the suction tube introducing part (20) can be attached when using the reagent container (100), it is possible to avoid the deposition of liquid droplets on the inside of the suction tube introducing part (20) during transportation or the like.

In the reagent container according to the first aspect, the suction tube introducing part (20) has an outer shape smaller than the opening (11a) of the upper surface part (11) and the tube (21c) is inserted into the opening (11a). According to this configuration, it is possible to easily introduce the suction tube (21c) by installing the suction tube introducing part (20) on the reagent container (100) without forming the suction tube introducing part (20) from a deformable material or a deformable structure. even if liquid droplets adhere to the periphery of the opening (11a) during transport, liquid droplets do not adhere to the inside of the tube (21c) inserted into the opening (11a) even if liquid droplets adhere to the periphery of the opening (11a), so that there is no fear of erroneous detection of the liquid surface.

In a configuration in which the outer shape of the tube (21c) is smaller than the opening (11a), the suction tube introducing part (20) preferably has a protrusion (22) having an outer shape larger than the opening (11a). According to this configuration, it is possible to prevent the suction tube introducing part (20) from falling into the container body (10) through the opening (11a) by the protrusion (22).

In this case, the suction tube introducing part (20) preferably has an upper opening (21a) for receiving the suction tube (531), and the protrusion (22) is disposed at a position on the side of the upper opening (21a) of the suction tube introducing part. According to this configuration, since the mounting position of the suction tube introducing part (20) with respect to the opening (11a) of the container body (10) is determined by the position of the protrusion (22), it is possible to suppress the projecting length of the suction tube introducing part (20) projecting upward from the opening (11a) by arranging the protrusion (22) on the side of the upper opening (21a) of the suction tube introducing part (20). Therefore, the total height of the reagent container (100) can be reduced.

In the configuration in which the suction tube introducing part (20) has the protrusion (22), the container body (10) preferably has a tubular guide for inserting the suction tube introducing part (20) from the opening (11a), and the protrusion (22) has a first engaging part (23) for engaging with the guide (11b). According to this configuration, the suction tube introducing part (20) can be easily inserted into the opening (11a) by the guide part (11b). The suction tube introducing part (20) then can be easily attached to the container body (10) by the first engaging part (23).

In this case, the guide (11b) and the first engaging part (23) are configured to be engaged by a screw structure. According to this configuration, the suction tube introducing part (20) and the container body (10) can be fixed securely and firmly with a simple structure.

In the configuration in which the suction tube introducing part (20) has the guide (11b), the guide (11b) preferably is provided so as to protrude upward from the upper surface part (11), and the distance (D9) from the bottom end of the suction tube introducing part (20) to the upper surface part (11) is less than the protrusion length from the upper surface part (11) of the guide (11b). According to this configuration, since the protrusion length from the upper surface part (11) of the lower end of the tube (21c) can be reduced, it is possible to effectively separate the lower end of the tube (21c) from the position of the reagent liquid surface when filled completely. As a result, it is possible to effectively prevent the reagent (101) from adhering to the periphery of the opening of the reagent container (100).

In the case where the suction tube introducing part is formed as a separate body from the container body, the suction tube introducing part (20) is preferably separately and detachably provided on the container body (110), and a cap (160) for sealing the opening (111a) is also provided. According to this configuration, the reagent (101) can be reliably sealed and stored during transport and storage with the reagent (101) contained therein. The cap (160) can be replaced with a suction tube introducing part (120) when the reagent container (200) is unsealed.

In the reagent container according to the first aspect, it is preferable that the lower end of the suction tube introducing part (20) is located closer to the upper surface part (11) side more than ½ the distance (D2) from the liquid surface (30) to the upper surface part (11). According to this configuration, since the lower end of the suction tube introducing part (20) can be further separated from the liquid surface (30), the reagent (101) can be efficiently prevented from adhering to the periphery of the opening of the reagent container (100).

In this case, it is preferable that the liquid level (30) is set within a range from ⅖ or more to ⅘ or less of the distance (D3) from the bottom surface part (12) to the top surface part (11) of the internal space. This configuration avoids the liquid level (30) being too low to ensure the capacity of the reagent (101), or the liquid level (30) being too high and approaching the lower end of the suction tube introducing part (20). Therefore, it is possible to suppress the reagent (101) from adhering around the opening of the reagent container (100) while ensuring the reagent capacity.

In the reagent container according to the first aspect, the lower end of the suction tube introducing part (20) preferably is disposed at a position on the upper surface part (11) side separated from the liquid surface (32) when the reagent (101) is agitated by the sample measuring apparatus (500). According to this configuration, when the reagent (101) requiring agitation for phase separation or the like is accommodated, it is possible to prevent the reagent (101) from adhering to the periphery of the opening of the reagent container (100) even during the agitation.

In the reagent container according to the first aspect, the suction tube introducing part (20) faces away from the side surface part (13), and the distance (D4) from the bottom end of the suction tube introducing part (20) to the upper surface part (11) is equal to or less than the distance (D5) between the suction tube introducing part (20) and the side surface part (13). According to this configuration, the lower end of the suction tube introducing part (20) is less than the length projecting from the upper surface part (11) to the bottom surface part (12) side, as compared with the distance (D5) from the side surface part (13) to the suction pipe introducing part (20). Therefore, it is possible to effectively separate the lower end of the suction pipe introducing part (20) from the position of the liquid surface (30), and to makes it difficult for the droplets splashed from the side part (13) side to adhere to the suction pipe introducing part (20).

In the reagent container according to the first aspect, the upper surface part (11) preferably is formed in a flat plate shape substantially orthogonal to the side surface part (13), and the suction tube introducing part (20) is provided so as to pass-through the upper surface part (11) and has an upper opening (21a) for receiving the suction tube (531); the distance (D4) from the lower end of the suction tube introducing part (20) to the upper surface part (11) is less than the distance (D6) to the upper surface opening (11a) to the upper opening (21a). According to this configuration, it is possible to effectively separate the lower end of the suction tube introducing part (20) from the position of the liquid surface (30) since the lower end of the suction tube introducing part (20) protrudes from the upper surface part (11) toward the bottom surface part (12) side by a small length equal to or less than the distance from the upper surface part (11) to the upper opening (21a).

In the reagent container according to the first aspect, it is preferable that the upper surface part (11) is formed in a flat plate shape substantially orthogonal to the side surface part (13), and the suction tube introducing part (20) is disposed substantially in the center of the upper surface part (11). According to this configuration, the suction tub introducing part (20) does not come close to the surrounding side part (13), and the horizontal distance from the suction tube introducing part (20) to the side surface part (13) can be ensured. As a result, it is difficult for the droplets splashed from the side part (13) side to adhere to the suction tube introducing part (20).

In the reagent container according to the first aspect, the bottom surface part (112) of the internal space preferably has a concave part (112a) just below the suction tube introducing part (120) and is inclined toward the concave part (112a). According to this a configuration, when the liquid amount of the reagent (101) decreases with the suction, the reagent (101) can be stored in the concave part (112a) directly below the suction tube introducing part (120). Therefore, it is possible to reduce the dead volume that cannot be suctioned by the suction tube (531).

In this case, the concave part (112a) preferably is provided in the bottom surface part (112) so as to extend along the oscillation direction at the time of agitation of the reagent container (200) by the sample measuring apparatus (500). According to this configuration, when the reagent (101) requiring agitation is accommodated, the concave (112a) extending along the oscillation direction, the liquid at the time of agitation can be easily moved within the concave part (112a) for more uniform stirring.

In the reagent container according to the first aspect, the lower end of the suction tube introducing part (20) preferably is located at a position that is ½ or more on the upper surface part (11) side of the distance (D3) from the bottom part (12) of the interior space to the upper part (11). According to this configuration, the lower end of the suction tube introducing part (20) can be easily separated from the position of the liquid level (30) disposed near the center of the reagent container (100) by arranging the lower end of the suction tube introducing part (20) on the upper side of the reagent container (100). As a result, it is possible to effectively prevent the reagent (101) from adhering to the periphery of the opening of the reagent container (100).

In this case, the lower end of the suction pipe introducing part (20) preferably is arranged at a position closer to the upper surface part (11) than ⅔ of the distance (D3) from the bottom part (12) to the upper part (11). According to this configuration, the lower end of the suction tube introducing part (20) can be more easily separated from the position of the liquid level (30) disposed near the center of the reagent container (100) by arranging the lower end of the suction tube introducing part (20) in the center of the reagent container (100). As a result, it is possible to effectively prevent the reagent (101) from adhering to the periphery of the opening of the reagent container (100).

In the reagent container according to the first aspect, the suction tube introducing part (20) preferably has an openable lid part (24) for opening and closing the suction tube introducing part (20), and the openable lid part (24) includes a first region (24a) for opening the suction tube introducing part (20) by pressing against the sample measuring apparatus (500), and a second region (24b) for closing the suction tube introducing part (20) by pressing against the sample measuring apparatus (500). According to this configuration, the upper opening (21a) can be opened and closed by the sample measuring apparatus (500). Therefore, evaporation or alteration of the reagent (101) can be suppressed by opening the openable lid part (24) only when suctioning the reagent (101) by the suction tube (531) and by closing the lid part (24) except during suction.

In this case, the openable lid part (24) has a hinge (24c) arranged between the first region (24a) and the second region (24b), and the and the lid part (24) pivots on the hinge (24c) when the first region (24a) or the second region (24b) is pressed. According to this configuration, the openable lid part (24) can be opened and closed simply by pressing one or the other of the first region (24a) and the second region (24b) against the hinge (24c) like a lever. Therefore, complexity of the structure of the reagent container (100) can be suppressed, and the mechanism for opening and closing on the sample measuring apparatus (500) side can also be simplified.

In the configuration in which the suction tube introducing part has the openable lid part, the opening and openable lid part (124) preferably has a protrusion (124d) formed so as to fit in the upper opening (121a) of the suction tube introducing part (120) in a closed state. According to this configuration, airtightness can be improved by the protrusion (124d) fitted into the upper opening (121a) when the openable lid part (124) is closed.

In the reagent container according to the first aspect, the container body (110) having the upper surface part (111), the bottom surface part (112), and the side surface part (113), it is preferable that an upper cover (140) is detachably provided on the container body (110) so as to cover the upper surface part (111) of the container body (110), and a second engaging part (142) for engaging with the container holding part (520) of the sample measuring apparatus (500). According to this configuration, the reagent container (100) can be stably held in the container holding part (520) by the upper cover (140) having the second engaging part (142).

In this case, the upper cover (140) preferably has a grip part (143) engaged with a container transfer part (610) of the sample measuring apparatus (500). According to this configuration, the container transfer unit (610) can automatically transfer the reagent container (200) to a desired position, and when transferring the reagent container (200), the container transfer unit (610) is stably held by the grip part (143).

In the configuration having the upper cover (140), the suction tube introducing part (120) preferably is formed separately from the container body (110) and detachable from the upper surface part (111), the upper cover (140) is disposed between the upper surface part (111) and the suction tube introducing part (120), and the cover opening (141) is smaller than the contour of the suction tube introducing part (120). According to this configuration, the suction tube introducing part (120) can also function as a stopper to lock the upper cover (140). Therefore, it is possible to prevent the upper cover (140) from being detached from the container body (110), when the user grips the upper cover (140) to lift up the reagent container (200), or when the reagent container (200) is held suspended via the upper cover (140) in the container holding unit (520) or the container transfer unit (610) of the sample measuring apparatus (500).

In the configuration including the upper cover (140), the upper cover (140) preferably includes a first part (144) extending along the upper surface part (111) and a second part (145) extending along the side surface part (113) from the exterior circumference of the first part (144) and covering a part of the side surface part (113), and the container body (110) has a third engaging part (114) for engaging with the upper cover (140) at a connection between the upper surface part (111) and the side surface part (113). Here, since the connection between the upper surface part (111) and the side surface part (113) of the container body (110) corresponds to the corner (shoulder) of the upper portion of the container body (110), the rigidity is high and deformation is difficult. Therefore, by disposing the third engaging part (114) at the connection which is not easily bent and deformed, it is difficult for the upper cover (140) to come off.

In this case, the first part (144) preferably is provided with an engaging rib (144*a*) into which the third engaging part (114) is fitted at a position distant on the inner circumference side from the second part (145), and the second engaging part (142) is provided in the second part (145). According to this configuration, the engaging rib (144*a*) for attaching and detaching from the container body (110) and the second engaging part (142) for engaging with the container holding part (520) are provided at positions mutually separated from each other in the upper cover (140). Therefore, it is possible to suppress the influence of flexure deformation of the second part (145) on the engaging rib (144*a*) when engaging the second engaging part (142) with the container holding part (520), and prevent the release of the engagement between the container body (110) and the upper cover (140) by the flexure deformation of the second portion (145).

In the configuration including the upper cover, it is preferable that a plurality of container bodies (201, 202) having the suction tube introducing part (120) are provided, and the upper cover (203) is provided for each container body (201, 202), the upper cover (203) being configured with a plurality of cover openings (231*a*, 231*b*) for exposing the upper opening on each container body (201, 202), so as to be attachable to a plurality of container main bodies (201, 202). According to this configuration, a reagent container (300) of a type that can accommodate plural kinds of reagents can be configured since a plurality of container bodies (201, 202) can be connected by the upper cover (203). Since the container bodies (201, 202) can be formed separately, for example, when manufacturing the container body (201, 202) containing reagent in advance, each container body (201, 202) can be manufactured to accommodate different reagent during the manufacturing process, so that handling of the container body (201, 202) at the time of manufacturing can be facilitated.

In the configuration in which the bottom surface part has a concave part, the bottom surface part (112) preferably has an outer surface that protrudes in correspondence to the concave part (112*a*), and includes a bottom cover (150) with a flat lower end that is detachably provided on the bottom surface part (122). According to this configuration, providing the concave part (112*a*) on the inner surface of the bottom part (112) makes it difficult for the outer surface to protrude and stand upright due to the substantially uniform thickness when the reagent container (200) is formed, for example, by blow molding of a resin material. Therefore, by providing the bottom cover (150), it is possible to stably stand up the reagent container (200) even if the bottom part (112) protrudes.

In this case, it is preferable that a plurality of container bodies (201, 202) having an upper surface part, a bottom surface part and a side surface part are provided, and the bottom cover (204) is configured to be attachable to a plurality of container bodies (201, 202) together. According to this configuration, a reagent container (300) of a type that can accommodate plural kinds of reagents can be configured since a plurality of container bodies (201, 202) can be connected by the bottom cover (204). Since the container bodies (201, 202) can be formed separately, for example, when manufacturing the container body (201, 202) containing reagent in advance, each container body (201, 202) can be manufactured to accommodate different reagent during the manufacturing process, so that handling of the container body (201, 202) at the time of manufacturing can be facilitated.

In the configuration including the bottom cover, it is preferable that a plurality of container main bodies (201, 202) having an upper surface part, a bottom surface part and a side surface part are provided, and the bottom cover (250) includes a plurality of individual container main bodies (201, 202) and has a fourth engaging part (251) for connecting the bottom covers (250) to each other. According to this configuration, a reagent container (300) of a type that can accommodate plural kinds of reagents can be configured since a plurality of container bodies (201, 202) can be connected by fourth engaging part (251) of the bottom cover (205). Since the bottom cover (250) is individually provided in the plurality of container main bodies (201, 202), it can easily stand upright even in the state of the single container body (201, 202) before being connected.

In the reagent container according to the first aspect, the reagent (101) preferably contains a reagent (101) that phase-separates into a plurality of phases in a stationary state. Since the reagent (101) that undergoes phase separation into a plurality of phases needs to be stirred and mixed at the time of use, liquid droplets of the reagent (101) tend to scatter and tend to adhere to the periphery of the opening during stirring. Therefore, the present invention, which can suppress the adhesion of the reagent (101) around the opening by the suction tube introducing part (120), is suitable for the reagent container (100) that contains the reagent (101) that phase-separates into a plurality of phases.

In the reagent container according to the first aspect, the reagent (101) preferably contains a capture substance that binds to a target substance in a sample using an antigen-antibody reaction, a solid phase carrier that binds to the capture substance, and a labeling substance that binds to the target substance by utilizing the antigen-antibody reaction. Such a reagent is used in an immunoassay apparatus that measures a target substance in a sample by utilizing an antigen-antibody reaction. In the immunoassay apparatus, from the viewpoint of accuracy control, it is desirable to suppress fluctuation of the dispensing amount due to false detection of the liquid level (30) due to the reagent (101) adhering to the periphery of the opening of the reagent container (200, 300), and the present invention which can suppress the occurrence of the above-mentioned problem is preferable.

The method for suctioning a reagent according to a second aspect of the present invention is a method for suctioning a reagent (101) in a reagent container (100) with a sample measuring apparatus (500) having a suction tube (531); a reagent container (100) having a side surface part (13) with an opening (11a) in the upper surface part (11) partitioning or defining an interior space accommodating the reagent (101), and an suction tube introducing part (20) for introducing a suction tube (531) received from above the opening (11a) into the internal space, wherein the suction tube (531) suctions the reagent (101) at a position below the liquid surface (30) from the bottom end of the suction tube introducing part (20) extending from the top surface part (11) to a position above the liquid surface (30) of the reagent (101).

In the method of suctioning a reagent according to the second aspect described above, the suction tube (531) is inserted into the suction tube introducing part (20) of the reagent container (100) provided with the suction tube introducing part (20), and the suction tube (531) is caused to enter the internal space from the lower end of the suction tube introducing part (20) that extends from the upper surface part (11) to a position above the liquid surface (30) of the reagent (101). In this way, since the suction tube introducing part (20) extends from the upper surface part (11) to a position above the liquid surface (30), liquid droplets of reagent (101) splashed during the operation of the sample measurement apparatus can be prevented from adhering to the periphery of the opening (21a) of the reagent container even if the reagent container is inclined. Since the suction tube introducing part (20) is positioned above the liquid surface (30), droplets of reagent splashed during the operation of the sample measuring apparatus only adhere to the exterior side surface of the suction tube introducing part (20) even when the reagent container (100) is inclined, thereby preventing reagent (101) from adhering to the inner side of the suction tube introducing part (20). As a result, it is difficult for liquid droplets to adhere to the inner peripheral surface side of the suction tube introducing part (20), and formation of liquid droplets and liquid film of the reagent (101) around the opening is suppressed. As described above, it is possible to prevent the reagent (101) from adhering to the periphery of the opening of the reagent container (100). As a result, formation of liquid droplets and a liquid film at positions above the liquid surface (30) is suppressed, so that erroneous detection of the reagent liquid surface at a position different from the actual reagent liquid surface can be suppressed in the sample measuring apparatus (500).

In the method of suctioning a reagent according to the second aspect, the reagent container (100) preferably is moved in the horizontal direction and agitated before insertion of the suction tube (531). In this way, when stirring is performed before inserting the suction tube (531), the droplets easily splash inside the reagent container (100), but even if the droplets splash, it is possible to prevent the reagent (101) from adhering to the inside of the suction tube introducing part (20) and adhere only to the outside surface of the suction tube introducing part (20). Therefore, even when stirring the reagent, it is possible to effectively prevent the reagent (101) from adhering to the periphery of the opening of the reagent container (100).

In the method of suctioning a reagent according to the second aspect, the liquid surface (30) preferably is detected by the suction tube (531) entered into the reagent container (100), and the suctioning of the reagent (101) by the suction tube (531) is carried out at a position below where the liquid level (30) has been detected by a predetermined amount. According to this configuration, the region where the suction tube (531) contacts the reagent (101) can be limited to only the leading end part compared to the case where the suction tube (531) is advanced to the vicinity of the bottom part (112) of the reagent container (200). Therefore, it is easy to clean the suction tube (531). Even when the liquid level (30) is detected by the suction tube (531) for suctioning the reagent, formation of liquid droplets and a liquid film above the liquid surface (30) can be suppressed, so that erroneous detection of the liquid surface (30) also can be suppressed.

A sample measuring apparatus according to a third aspect of the present invention includes a sample dispensing unit (510) for suctioning a sample collected from a subject and dispensing the suctioned sample into a reaction container, a reagent (101), a reagent container (100) having a side surface part (13) with an opening (11a) in the upper surface part (11) partitioning or defining an interior space accommodating the reagent (101), and a suction tube introducing part (20) for introducing a suction tube (531) received from above the opening (11a) into the internal space, a container holding part (520) in which the reagent container (100) is installed, a reagent dispensing unit (530) for suctioning the reagent (101) by the suction tube (531) and dispensing the suctioned reagent into the reaction vessel (501), the reagent dispensing unit (530) includes a suction tube (531) that enters the internal space from the lower end of the suction tube introducing part (20) that extends from the upper surface part (11) to a position above the liquid surface (30) of the reagent (101), and a detection unit (540) for detecting a component contained in the measurement sample in the reaction container (501) including the sample and the reagent (101).

In the sample measuring apparatus according to the third aspect described above, the container holding part (520) in which the reagent container (100) having the suction tube introducing part (20) is installed and the reagent (531) which enters the internal space from the lower end of the suction tube introducing part (20) that extends to a position above the liquid level (30) of the reagent (101), and a reagent dispensing unit (530) for suctioning the reagent (101) by the suction tube (531) and dispensing the suctioned reagent into the reaction vessel (501) are provided. In this way, since the suction tube introducing part (20) extends from the upper surface part (11) to a position above the liquid surface (30), liquid droplets of reagent (101) splashed during operation of the sample measurement apparatus (500) can be prevented from adhering to the periphery of the opening (21a) of the reagent container even if the reagent container (100) is inclined. Since the suction tube introducing part (20) is positioned above the liquid surface (30), droplets of reagent splashed during the operation of the sample measuring apparatus (500) only adhere to the exterior side surface of the suction tube introducing part (20) even when the reagent container (100) is inclined, thereby preventing reagent (101) from adhering to the inner side of the suction tube introducing part (20). As a result, it is difficult for liquid droplets to adhere to the inner peripheral surface side of the suction tube introducing part (20), and formation of liquid droplets and liquid film of the reagent (101) around the opening is suppressed. As described above, it is possible to prevent the reagent (101) from adhering to the periphery of the opening of the reagent container (100). As a result, formation of liquid droplets and a liquid film at positions above the liquid surface (30) is suppressed, so that erroneous detection of the reagent liquid surface at a position different from the actual reagent liquid surface can be suppressed in the sample measuring apparatus (500).

According to the present invention, it is possible to prevent reagent from adhering to the periphery of the opening of the reagent container.

BRIEF DESCRIPTION OF THE DRAWINGS

FIG. 10A shows a suction tube introducing part provided with a first engagement part in a separate state, and FIG. 10B shows a mounted state;

FIG. 11 is a view showing an example of an engagement structure of a first engaging part and a guide;

FIG. 19 is a perspective view showing the container body of the reagent container shown in FIG. 15;

FIG. 20 is a perspective view showing a bottom surface part of a container body;

DETAILED DESCRIPTION OF THE PREFERRED EMBODIMENTS

Figure 1:
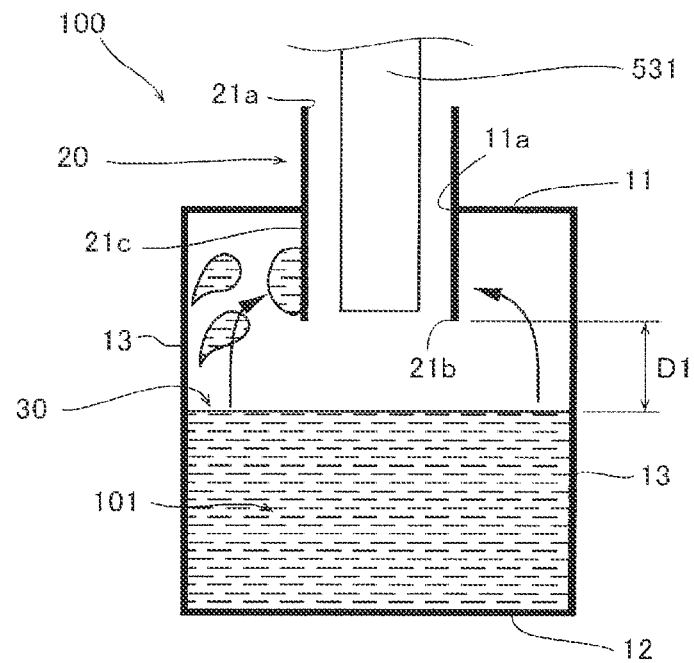
FIG. 1 is a schematic diagram showing an outline of a reagent container according to an embodiment.

Hereinafter, embodiments will be described with reference to the drawings.

Summary of Reagent Container

A summary of a reagent container 100 according to one embodiment will be described below with reference to FIG. 1.

The reagent container 100 is a container for accommodating reagents used for analyzing a sample by a sample measuring apparatus. For example, the sample measuring apparatus analyzes a sample prepared by adding a predetermined reagent to a sample collected from a subject. The reagent container 100 is used to contain a reagent to be added to a sample for preparation of a measurement sample.

The sample measuring apparatus detects a predetermined target substance contained in the sample. The target substance may include, for example, predetermined components in the blood or urine sample, cells and tangible components. The target substance may be nucleic acids such as DNA (deoxyribonucleic acid), cells and intracellular substances, antigens or antibodies, proteins, peptides and the like. The sample measuring apparatus may be a blood cell counter, a blood coagulation analyzer, an immunoassay device, a urinary solid component analyzer, or other analyzer.

The reagent 101 contained in the reagent container 100 varies depending on the type of the target substance and the content of the assay to be performed in the analysis, and is not particularly limited. The reagent container 100 may be a reagent container containing a predetermined amount of reagent 101 in advance, or may be an empty reagent container into which a predetermined amount of reagent 101 is injected separately.

As an example, the sample measuring apparatus may be an immunoassay device that detects a test substance in a sample using an antigen-antibody reaction. The immunoassay device detects, for example, an antigen or antibody, a protein, a peptide, or the like contained in blood as a target substance. The immunoassay device acquires serum or plasma as a sample and quantitatively or qualitatively measures antigens or antibodies or the like contained in the sample. Note that the antigen-antibody reaction includes not only a reaction between an antigen and an antibody but also a reaction using a specific binding substance such as an aptamer. An aptamer is a nucleic acid molecule or peptide synthesized to specifically bind to a specific substance.

A reagent including a capture substance that binds to a target substance in a sample using an antigen-antibody reaction, a reagent that includes a solid phase carrier that binds to the capture substance, a reagent containing a labeling substance that binds to the target substance, and the like may be used as the reagent 101 used in the immunoassay device. Such reagents 101 are contained in the reagent container 100.

The reagent container 100 of the present embodiment is used for a sample measuring apparatus 500 having a suction tube 531 for suctioning the reagent 101 in the reagent container 100. The suction tube 531 is inserted into the opening of the reagent container 100 and suctions the reagent 101 contained in the reagent container 100. The reagent 101 contained in the reagent container 100 is automatically suctioned by the sample measuring apparatus 500, and the suctioned reagent 101 is dispensed into a reaction container 501 (see FIG. 2) or the like.

The reagent container 100 includes a bottom surface part 12, side surface part 13, and an upper surface part 11 having an opening 11a that define an internal space in which the reagent 101 is stored. The shape of the reagent container 100 is not particularly limited. The reagent container 100 may have any shape insofar as the reagent container 100 has a structure in which the internal space for storing the reagent 101 is partitioned or defined by the upper surface part 11, the bottom surface part 12, and the side surface part 13. In the structural example shown in FIG. 1, for example, the reagent container 100 has a substantially flat plate-shaped upper surface part 11 and a bottom surface part 12, and a side surface part 13 substantially orthogonal to the upper surface part 11 and the bottom surface part 12. In the example of FIG. 1, the outer shape of the reagent container 100 may be, for example, a rectangular parallelepiped shape, a cylindrical shape, a triangular prism or other polygonal prism shape and the like except for a suction tube introducing part 20 to be described later.

The reagent container 100 is provided with a suction tube introducing part 20. The suction tube introducing part 20 is configured to introduce the suction tube 531 received from above the opening 11a into the internal space. That is, the suction tube introducing part 20 allows pass-through of the suction tube 531. In the structural example of FIG. 1, the suction tube introducing part 20 has a tubular shape penetrating the upper surface part 11. The suction tube introducing part 20 includes an upper opening 21a for receiving the suction tube 531, a lower opening 21b open to the inner space, a tube part 21c provided independently of the side surface part 13 and having a lower opening 21b formed in the lower end.

The suction tube 531 can be moved into the suction tube introducing part 20 via the upper opening 21a by descending from above the reagent container 100. Then, the suction tube 531 passes through the inside of the tube part 21c and can enter the internal space in which the reagent 101 is stored from the lower opening 21b.

The suction tube introducing part 20 has a cylindrical shape. The horizontal cross section shape of the suction tube introducing part 20 may be any shape, such as a circular shape, an elliptical shape, an oval shape, a rectangular shape, or other polygonal shape. Although the suction tube introducing part 20 is formed in a cylindrical shape, a throughhole or a slit may be partially formed in a region on the inner side (that is, lower side) from the upper surface part 11. The suction tube introducing part 20 has an inner diameter larger than the outer diameter of the suction tube 531 so that the suction tube 531 can pass through. Although the suction tube introducing part 20 is formed to have a constant diameter in the structural example of FIG. 1, the inner diameter may be changed between the upper end and the lower end. For example, the inner diameter of the suction tube introducing part 20 may be increased toward the upper opening 21a, the inner diameter may be reduced toward the lower opening 21b, and the inner diameter may increase toward the lower opening 21b.

In the structural example of FIG. 1, the lower end of the suction tube introducing part 20 protrudes toward the bottom surface part 12 side from the upper surface part 11. Specifically, the lower end of the suction tube introducing part 20 protrudes to the inner side than the inner surface of the upper surface part 11. Although the suction tube introducing part 20 protrudes upward from the upper surface part 11 in FIG. 1, the suction tube introducing part 20 also may be provided only on the lower side of the upper surface part 11. Additionally, although the suction tube introducing part 20 vertically extends from the edge part of the opening 11a of the upper surface part 11, the suction tube introducing part 20 may be formed, for example, to extend downward from a position between the edge part of the opening 11a and the side surface part 13.

In the present embodiment, the suction tube introducing part 20 extends from the upper surface part 11 to a position above the liquid surface 30 of the reagent 101. The lower end of the suction tube introducing part 20 is disposed at a position away from the liquid surface 30 of the reagent accommodated in the inner space toward the upper surface part 11 side. Note that in this specification, unless otherwise specified, the height position of the liquid surface 30 of the reagent means the height position of the liquid surface in a stationary state and containing the reagent 101 when it is full.

Figure 3:
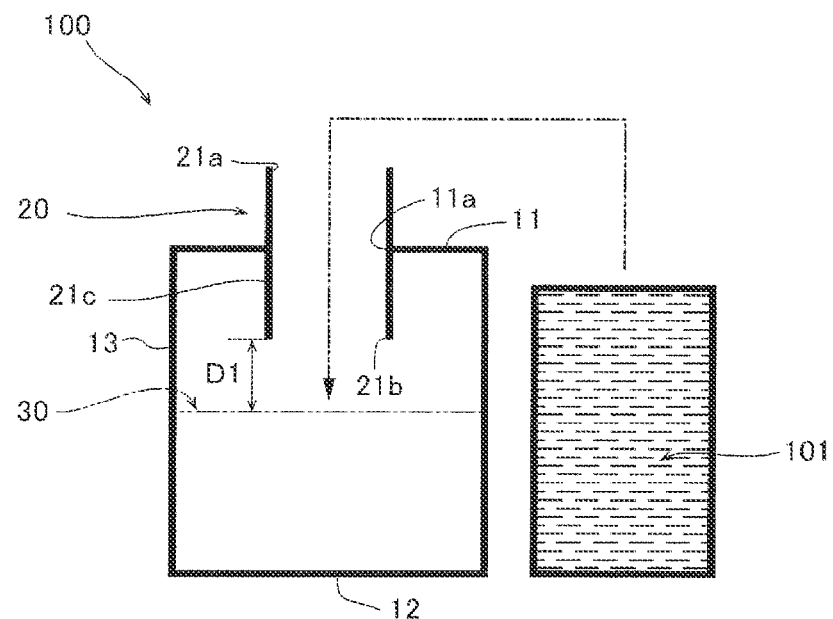
FIG. 3 is a schematic view showing an example in which a reagent is attached separately from a reagent container.
Figure 4A:
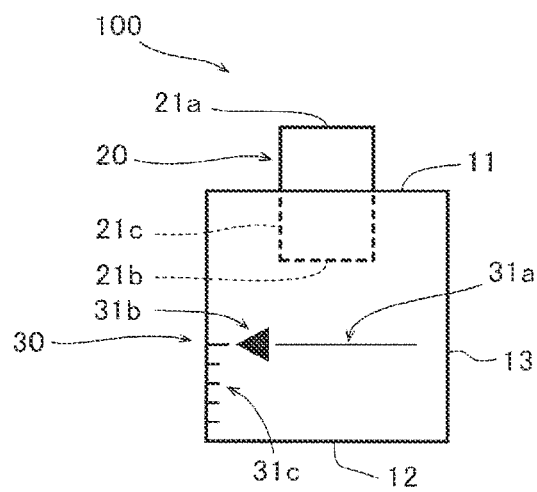
FIG. 4A is a side view that shows an example of a mark indicating a predetermined position, and a cross-section view
Figure 4B:
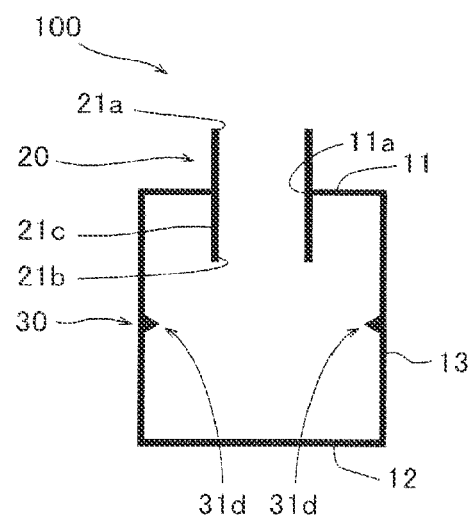
FIG. 4B shows another example of a mark.

As shown in FIG. 1, the reagent container 100 may be a reagent container containing a predetermined amount of reagent in advance. As shown in FIG. 3, the reagent container 100 also may be an empty container to which a predetermined amount of reagent 101 is attached to the reagent container 100. In the case of FIG. 3, the position of the liquid surface 30 is specified as the liquid surface position in a state where the predetermined amount of the reagent 101 attached to the reagent container 100 is accommodated in the reagent container 100. Even when the predetermined amount of the reagent 101 is not attached, the position of the liquid level 30 can be any one or more of the line 31a, the mark 31b, and the scale 31c indicating the full position as shown in FIG. 4A, or by a non-structural marking given by other printing or the like. The position of the liquid surface 30 can be specified by a structural marker such as a protrusion 31d, a recess, a rib, a window part for liquid level visual recognition and the like provided at a full position as shown in FIG. 4B. The marks indicating the positions of these liquid surfaces 30 are not necessary in the case of the reagent container 100 in which the reagent 101 is stored in advance.

In the present embodiment shown in FIG. 1, the lower end of the suction tube introducing part 20 is arranged at a position separated upward by a distance D1 (>0) from the liquid surface 30 when the full amount of reagent is present. The lower end of the suction tube introducing part 20 is not immersed in the liquid surface 30 and droplets of the reagent 101 are prevented from adhering to the inner surface of the suction tube introducing part 20.

In this way, since the suction tube introducing part (20) extends from the upper surface part (11) to a position above the liquid surface (30) of the reagent (101), liquid droplets of reagent (101) splashed during the operation of the sample measuring apparatus 500 can be prevented from adhering to the periphery of the opening (11a) of the reagent container even if the reagent container (100) is inclined. Since the suction tube introducing part (20) is positioned above the liquid surface (30), liquid droplets of reagent (101) splashed during the operation of the sample measuring apparatus only adhere to the exterior side surface of the suction tube introducing part (20) even when the reagent container (100) is inclined, thereby preventing reagent (101) from adhering to the inner side of the suction tube introducing part (20). As a result, it is difficult for liquid droplets of reagent 101 to adhere to the inner peripheral surface side of the suction tube introducing part 20, and formation of liquid droplets and liquid film of the reagent 101 around the opening is suppressed. As described above, it is possible to prevent the reagent 101 from adhering to the periphery of the opening of the reagent container 100. As a result, formation of liquid droplets and a liquid film at positions above the liquid surface 30 is suppressed, so that erroneous detection of the reagent liquid surface at a position different from the actual reagent liquid surface can be suppressed in the sample measuring apparatus 500.

In the structural example of FIG. 1, the suction tube introducing part 20 is provided at a position distant from the side surface part 13. In this way it is possible to make it difficult for the liquid droplets splashed from the side surface part (13) to adhere to the inside of the suction tube introducing part (20) by the separation of the suction tube introducing part (20) from the side surface part (13).

Summary of Sample Measuring Apparatus

A summary of a sample measuring apparatus 500 according to an embodiment will be described next with reference to FIG. 2.

The sample measuring apparatus 500 is an apparatus for analyzing a measurement sample prepared by adding a predetermined reagent to a sample collected from a subject.

The subjects are mainly human, but also may be another animal other than human. The sample measuring apparatus 500 performs measurements for clinical examination or medical research of, for example, a sample taken from a patient. The sample is a living body-derived specimen. A sample derived from a living body is prepared, for example, by subjecting a liquid such as blood (whole blood, serum or plasma), urine, or other body fluid collected from a subject to a predetermined pretreatment. The sample also may be, for example, a part of tissue of a subject other than a liquid, such as a cell or the like.

The sample measuring apparatus 500 prepares a sample for measurement by adding predetermined one or more kinds of reagents to the sample. The sample measuring apparatus 500 causes the suction tube 531 to enter the reagent container 100 via the suction tube introducing unit 20 and suctions the reagent in the reagent container 100. The sample measuring apparatus 500 dispenses the suctioned reagent to the reaction container 501. After suctioning the reagent, the sample measuring apparatus 500 retracts the suction tube 531 to the outside of the reagent container 100 through the suction tube introducing part 20.

Figure 2:
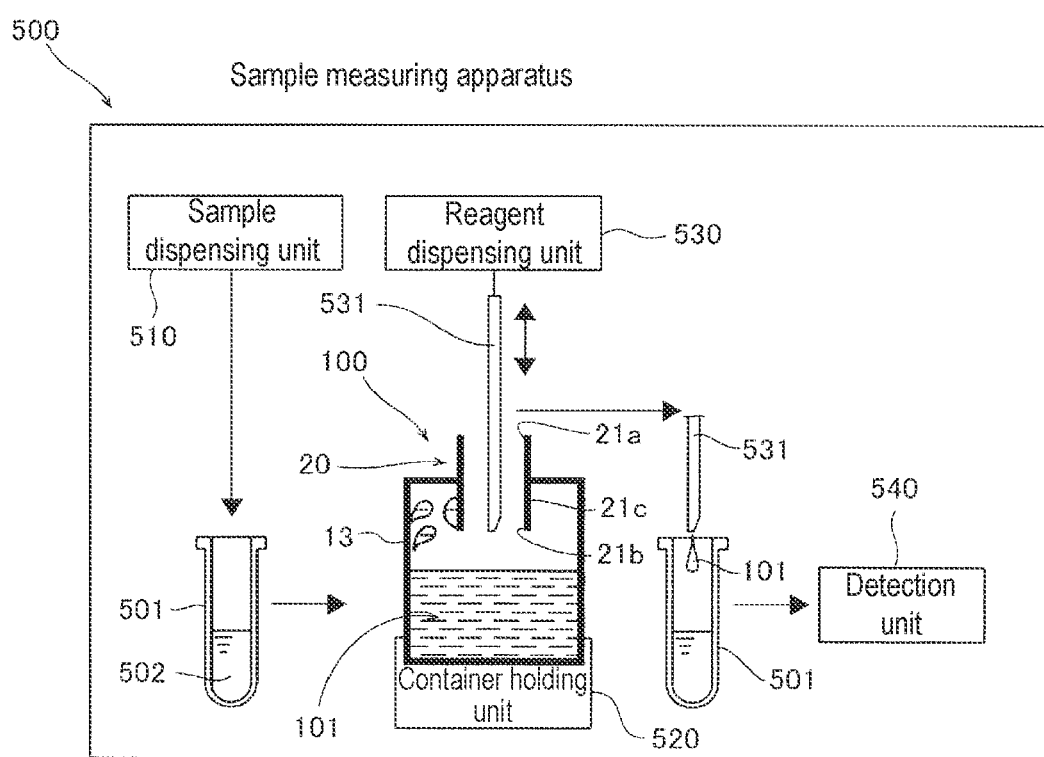
FIG. 2 is a schematic diagram showing an outline of a sample measuring apparatus according to an embodiment.

As shown in FIG. 2, the sample measuring apparatus 500 includes a sample dispensing unit 510, a container holding unit 520, a reagent dispensing unit 530, and a detection unit 540.

The sample dispensing unit 510 is configured to suction the sample collected from the subject and dispense the suctioned sample into the reaction container 501. The sample dispensing unit 510 is connected to a fluid circuit including, for example, a pump for suctioning and discharging a sample. The sample dispensing unit 510 suctions a sample from a sample container (not shown) using, for example, a suction tube or a pipette tip. The sample dispensing unit 510 dispenses the suctioned sample into the reaction container 501. The dispensing of the sample may be performed before or after dispensing the reagent.

The reagent container 100 of this embodiment is installed in the container holding unit 520. That is, installed in the container holding unit 520 is a reagent container provided with a reagent 101, an upper surface part 11 having a bottom surface part 12, a side surface part 13, and an opening 11a which partitions or defines an internal space for storing the reagent 101, a suction tube 531 received from above the opening 11a, and a suction tube introducing part 20 for introducing the suction tube 531 into the internal space from above the opening 11a.

The container holding unit 520 contacts with any part of the reagent container 100 and holds the reagent container 100. The container holding unit 520 may hold the reagent container 100 in any way. In FIG. 2, the container holding unit 520 has a placement surface on which the reagent container 100 is placed, and holds the bottom surface part 12 (see FIG. 1) of the reagent container 100. For example, the container holding unit 520 may sandwich and hold the side surface part 13 of the reagent container 100, or engage a part of the reagent container 100 so as to be caught on the container holding unit 520, and the engaged reagent container 100 may be held in a suspended state. The container holding unit 520 holds the reagent container 100 without covering the suction tube introducing part 20.

The reagent dispensing unit 530 is configured to suction the reagent 101 in the reagent container 100 by the suction tube 531, and dispense the suctioned reagent into the reaction container 501. That is, the reagent dispensing unit 530 includes a suction tube 531 which enters the internal space from the lower end of the suction tube introducing part 20 extending from the upper surface part 11 to a position above the liquid surface 30 of the reagent 101.

The reagent dispensing unit 530 includes, for example, a fluid circuit for suctioning the reagent with the suction tube 531, and discharging the suctioned reagent to the reaction container 501. The fluid circuit is preferably a metering pump such as a cylinder pump or a diaphragm pump which includes, for example, a pump and is capable of quantifying reagents. To quantify the reagent, a non-metered pump and a metering chamber may be combined. The suction tube 531 may be separately provided for reagent suction and reagent discharge. When the suction tube 531 is used for both of the suction of the reagent and the discharge of the reagent, one or both of the suction tube 531 and the reagent vessel 100 and the reaction container 501 may be movable in the horizontal direction.

The suction tube 531 is disposed at a position higher than the reagent container 100 installed in the container holding unit 520. At least one of the suction tube 531 and the container holding unit 520 of the reagent dispensing unit 530 is movable in the vertical direction. Therefore, the suction tube 531 descends from above the reagent container 100, enters the inside of the reagent container 100 via the upper opening 21a and the lower opening 21b of the suction pipe introduction part 20, and can suction the reagent 101.

The detection unit 540 detects components contained in the measurement sample in the reaction container 501 including the sample 502 and the reagent 101. Regardless of the detection method of the target component by the measuring unit 540, a method corresponding to a target component such as a chemical method, an optical method, an electromagnetism method, or the like can be adopted. On the basis of the detection result of the detection unit 540, the sample measuring apparatus 500 analyzes, for example, the presence or absence of the target component, the number or the amount of the target component, the concentration and the existence ratio of the target component and the like. For example, when performing optical detection such as fluorescence, reflected light or diffused light, color or the like, a photomultiplier, a spectrophotometer, a luminometer or the like can be used as the detection unit 540. When a radioactive isotope is used as a label, a scintillation counter or the like can be used as the detection unit 540.

According to this configuration, since the suction tube introducing part (20) extends from the upper surface part (11) to a position above the liquid surface (30) of the reagent (101), liquid droplets of reagent (101) splashed during the operation of the sample measuring apparatus 500 can be prevented from adhering to the periphery of the opening (11a) of the reagent container even if the reagent container (100) is inclined. Since the suction tube introducing part (20) is positioned above the liquid surface (30), liquid droplets of reagent (101) splashed during the operation of the sample measuring apparatus only adhere to the exterior side surface of the suction tube introducing part (20) even when the reagent container (100) is inclined, thereby preventing reagent (101) from adhering to the inner side of the suction tube introducing part (20). As a result, it is difficult for liquid droplets of reagent 101 to adhere to the inner peripheral surface side of the suction tube introducing part 20, and formation of liquid droplets and liquid film of the reagent 101 around the opening is suppressed. As described above, it is possible to prevent the reagent 101 from adhering to the periphery of the opening of the reagent container 100. As a result, formation of liquid droplets and a liquid film at positions above the liquid surface 30 is suppressed, so that erroneous detection of the reagent liquid surface at a position different from the actual reagent liquid surface can be suppressed in the sample measuring apparatus 500.

Method for Suctioning Reagent

A method of suctioning the reagent of the present embodiment will be described below. The method of suctioning the reagent of the present embodiment is a method of suctioning the reagent 101 in the reagent container 100 by the sample measuring apparatus 500 which has a suction tube 531, and executes the following steps (1) to (3). (1) A suction tube 531 is inserted into a suction tube introducing part 20 of a reagent container 100 provided with a side surface part 13 that partitions or defines an internal space that stores the reagent 101 and has an opening 11a in the top surface part 11, and a suction tube introducing part 20 that introduces the suction tube 531 received from above the opening 11a into the internal space. (2) The suction tube 531 is caused to enter the internal space from the lower end of the suction tube introducing part 20 extending from the upper surface part 11 to a position above the liquid surface 30 of the reagent 101. (3) The reagent 101 is suctioned by the suction tube 531 at a position lower than the liquid level 30.

In this way, since the suction tube introducing part (20) extends from the upper surface part 11 to a position above the liquid surface 30 of the reagent 101, liquid droplets of reagent 101 splashed during the operation of the sample measuring apparatus can be prevented from adhering to the periphery of the opening 11a of the reagent container even if the reagent container is inclined. Since the suction tube introducing part 20 is positioned above the liquid surface 30, liquid droplets of reagent 101 splashed during the operation of the sample measuring apparatus only adhere to the exterior side surface of the suction tube introducing part 20 even when the reagent container 100 is inclined, thereby preventing reagent 101 from adhering to the inner side of the suction tube introducing part 20. As a result, it is difficult for liquid droplets of reagent 101 to adhere to the inner peripheral surface side of the suction tube introducing part 20, and formation of liquid droplets and liquid film of the reagent 101 around the opening is suppressed. As described above, it is possible to prevent the reagent 101 from adhering to the periphery of the opening of the reagent container 100. As a result, formation of liquid droplets and a liquid film at positions above the liquid surface 30 is suppressed, so that erroneous detection of the reagent liquid surface at a position different from the actual reagent liquid surface can be suppressed in the sample measuring apparatus 500.

Structural Examples of Reagent Container

Figure 5A:
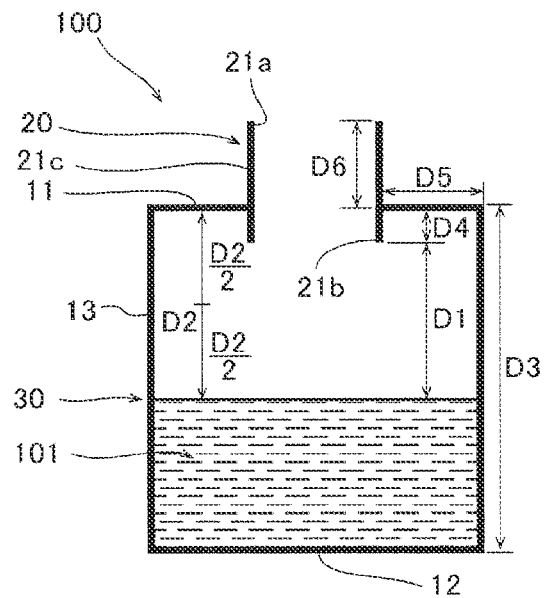
FIG. 5A through FIG. 5C are cross-section views showing structural examples in which dimensions of each part of a reagent container are different.
Figure 5B:
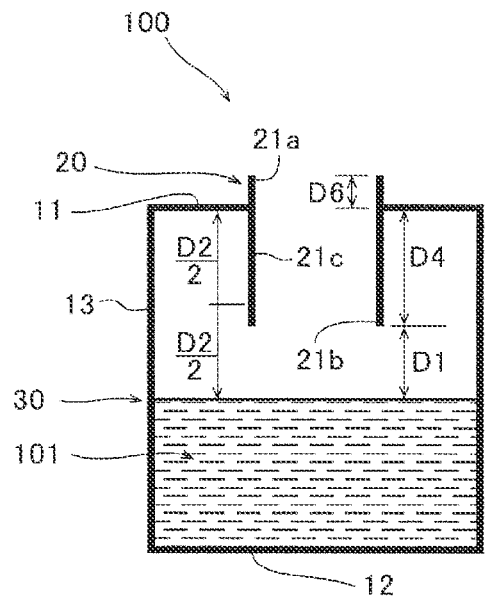
Figure 5C:
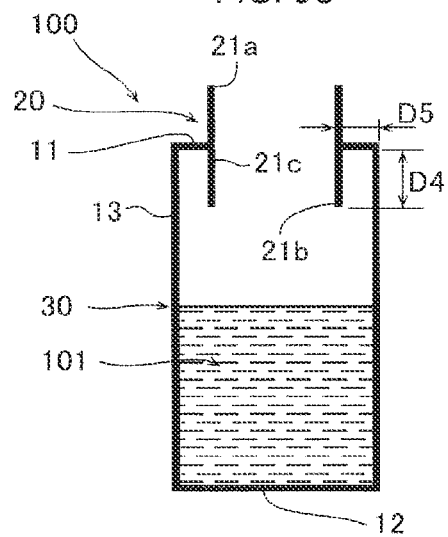

FIG. 5A to FIG. 5C show different structural examples of the reagent container 100.

In the Structural example of FIG. 5A, the lower end of the suction tube introducing part 20 is disposed at a position closer to the upper surface part 11 than half of the distance D2 from the liquid surface 30 to the upper surface part 11. That is, the lower end of the suction tube introducing part 20 is separated from the liquid surface 30 toward the upper surface part 11 side by a distance D1, and the distance D1 is larger than D2/2. In this way, since the lower end of the suction tube introducing part 20 can be further separated from the liquid surface 30 when full, the reagent 101 can be efficiently prevented from adhering to the periphery of the opening of the reagent container 100.

Note that the lower end of the suction tube introducing part 20 may be disposed at a position on the liquid surface 30 side more than ½ the distance D2 from the liquid surface 30 to the upper surface part 11 (D1<D2/2), as shown in FIG. 5B.

Note that the liquid level 30 is preferably set when the full amount is within an appropriate range according to the type of the reagent 101 to be contained. For example, the liquid level 30 is preferably set within a range from ⅖ or more to ⅘ or less of the distance D3 from the bottom surface part 12 to the top surface part 11. When the liquid level 30 is less than ⅖ of the distance D3, the amount of liquid that can be stored becomes too small as compared with the volume of the reagent container 100. When the liquid surface 30 is more than ⅘ of the distance D3, the liquid level 30 when full is too close to the upper surface part 11 of the reagent container 100, and due to a slight inclination of the reagent container 100 or a liquid splash, droplets tend to adhere to the inner surface of the suction tube introducing part 20 and the lower opening 21b. Therefore, by setting the liquid level 30 within the range of ⅖ or more and ⅘ or less of the distance D3, it is possible to avoid the liquid level 30 being too low to secure the capacity of the reagent 101, and the liquid level 30 being too high and coming close to the lower end of the suction tube introducing part 20. As a result, it is possible to suppress the reagent 101 from adhering around the opening of the reagent container 100 while ensuring the reagent capacity.

In the structural example of FIG. 5A, the suction tube introducing part 20 is opposed to and faces the side surface part 13, and the distance from the lower end of the suction tube introducing part 20 to the upper surface part 11 is less than the distance between the suction tube introducing part 20 and the side surface part 13. That is, the distance D4 from the lower end of the suction tube introducing part 20 to the upper surface part 11 is equal to or less than the distance D5 (D4 D5) between the suction tube introducing part 20 and the side surface part 13. In this way the length at which the lower end of the suction tube introducing part 20 protrudes from the upper surface part 11 to the bottom surface part 12 side becomes smaller than the distance D5 from the side surface part 13 to the suction tube introducing part 20. Therefore, it is possible to effectively separate the lower end of the suction tube introducing part 20 from the liquid surface 30 fully filled, and it is possible to make it difficult for the droplets splashed from the side surface part 13 to adhere to the suction tube introducing part 20.

Note that the distance D4 from the lower end of the suction tube introducing part 20 to the upper surface part 11 also may be larger than the distance D5 between the suction tube introducing part 20 and the side surface part 13, as shown in FIG. 5C.

In the structural example of FIG. 5A, the upper surface part 11 is formed in a flat plate shape substantially perpendicular to the side surface part 13, the distance D4 from the lower end of the suction tube introducing part 20 to the upper surface part 11 is less than the distance D6 from the upper surface part 11 to the upper opening 21a. In this way the lower end of the suction tube introducing part 20 protrudes from the upper surface part 11 to the bottom surface part 12 side by a short length equal to or less than the distance D6 from the upper surface part 11 to the upper opening 21a, so that the lower end of the suction tube introducing part 20 can be effectively separated from the liquid surface 30 when the full amount is attained.

Note that the distance D4 from the lower end of the suction tube introducing part 20 to the upper surface part 11 also may be greater than the distance D6 from the upper surface part 11 to the upper opening 21a, as shown in FIG. 5B.

In the Structural examples of FIG. 5A to FIG. 5C, the lower end of the suction tube introducing part 20 is disposed at a position closer to the upper surface part 11 side than ½ of the distance D2 from the liquid surface 30 to the upper surface part 11. That is, the distance D4 from the lower end of the suction tube introducing part 20 to the upper surface part 11 is less than (D3/2). Therefore, the lower end of the suction tube introducing part 20 is disposed at a position on the upper surface part 11 side between the bottom part 12 and the upper part 11. When the liquid level 30 is in the vicinity of the center of the reagent container 100, it is possible to easily separate the lower end of the suction tube introducing part 20 from the position of the liquid surface 30 when the liquid level 30 is full by placing the lower end of the suction tube introducing part 20 on the upper side of the reagent container 100. As a result, it is possible to effectively inhibit the reagent 101 from adhering to the periphery of the opening of the reagent container 100.

The lower end of the suction tube introducing part 20 preferably is arranged at a position closer to the upper surface part 11 than ⅔ of the distance D3 from the bottom surface part 12 to the upper surface part 11. That is, the distance D4 from the lower end of the suction tube introducing part 20 to the upper surface part 11 is less than ⅔ the distance D3. In this way the lower end of the suction tube introducing part 20 is not arranged in the vicinity of the center of the reagent container 100, so that the lower end of the suction tube introducing part 20 can be more easily separated from the position of the liquid surface 30 when the full volume is reached. As a result, it is possible to effectively inhibit the reagent 101 from adhering to the periphery of the opening of the reagent container 100.

Figure 6A:
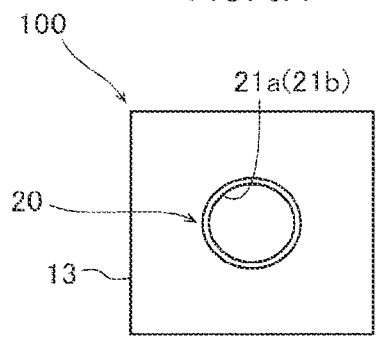
FIG. 6A through FIG. 6D are top views showing structural examples in which the shape of the reagent containers are different.
Figure 6B:
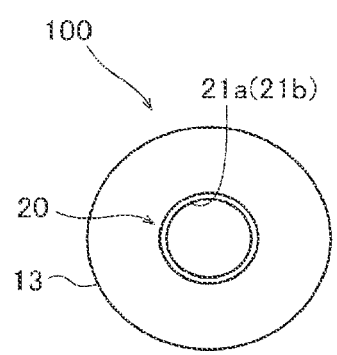
Figure 6C:
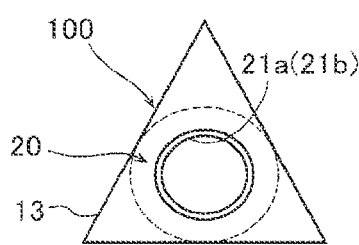
Figure 6D:
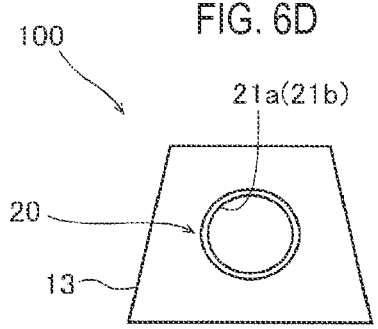

FIG. 6A to FIG. 6D show the shape of the upper surface part 11 of the reagent container 100 and the position of the suction tube introducing part 20 at the upper surface part 11. In FIG. 6A the upper surface part 11 has a rectangular shape. In FIG. 6B the upper surface part 11 has a circular shape. In FIG. 6C the upper surface part 11 has a triangular shape. In FIG. 6D the upper surface part 11 has a trapezoidal shape. In the case of FIG. 6D, for example, it is possible to specify the orientation of the reagent container 100 when it is installed in the container holding unit 520, unlike FIG. 6A which is rotationally symmetrical by 90 degrees and FIG. 6B which is rotationally symmetric at an arbitrary angle.

Here, also in FIG. 6, the upper surface part 11 is formed in a flat plate shape substantially orthogonal to the side surface part 13 as shown in FIG. 5. In FIG. 6, the suction tube introducing part 20 is disposed substantially at the center of the upper surface part 11. When the upper surface part 11 has a triangular shape as shown in FIG. 6C, the approximate center of the upper surface part 11 is, for example, the center of the inscribed circle (see the broken line in FIG. 6C). When the upper surface part 11 has a trapezoidal shape as shown in FIG. 6D, the approximate center of the upper surface part 11 is, for example, the intersection of two diagonal lines. Therefore, the distance D5 from the suction tube introducing part 20 to the side surface part 13 is substantially equal in each direction in the horizontal plane. In this way the suction tube introducing part 20 does not locally approach a part of the peripheral side surface part 13, and a horizontal distance from the suction tube introducing part 20 to the side surface part 13 can be ensured. As a result, it is difficult for the droplets splashed from the side surface part 13 side to adhere to the suction tube introducing part 20.

Depending on the type of the reagent 101 contained in the reagent container 100, stirring must be performed before suction of the reagent 101. For example, consider the case where the reagent 101 undergoes phase separation into a plurality of phases. The case of phase separation into a plurality of phases includes, for example, a case where the reagent 101 contains a plurality of liquid phase components that are not mixed with each other, and a case where the reagent 101 contains a liquid phase component and a solid phase component that is not soluble in the liquid phase component.

Figure 7:
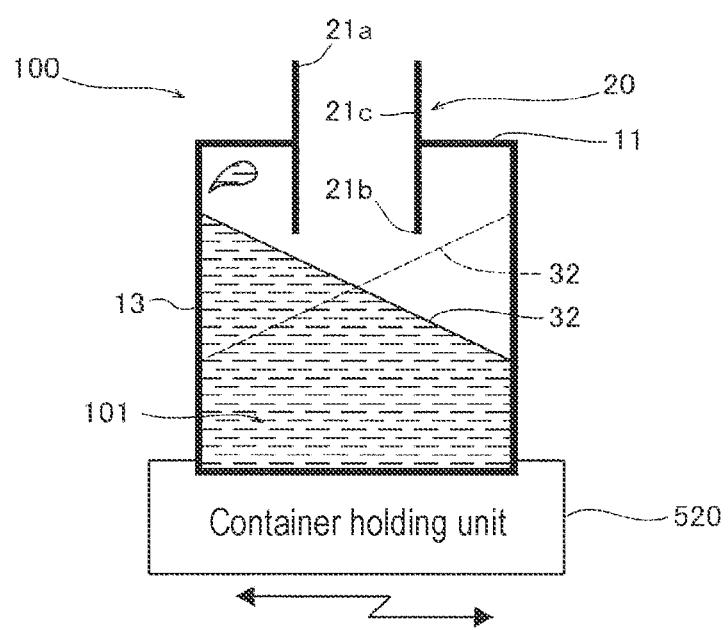
FIG. 7 is a cross-section view showing the surface of a reagent liquid during stirring.

In the structural example of FIG. 7, the reagent 101 is a reagent that phase-separates into a plurality of phases in a stationary state. The reagent 101 that undergoes phase separation into a plurality of phases in this way is stirred and mixed at the time of use. By stirring, the liquid surface 32 at the time of stirring oscillates like the solid line and the broken line in FIG. 7. At the time of stirring, the droplets of the reagent 101 tend to scatter and tend to adhere to the periphery of the opening. Therefore, the reagent container 100 of the present embodiment, which can suppress the adherence of the reagent 101 to the periphery of the opening by the suction tube introducing part 20, is ideally suited for a reagent container that accommodates the reagent 101 that undergoes phase separation in a plurality of phases.

In the method of suctioning a reagent according to the example of FIG. 7, the reagent container 100 is moved in the horizontal direction and agitated before insertion of the suction tube 531. For example, the container holding unit 520 is configured to be movable in the horizontal direction while holding the reagent container 100, and stirs the reagent 101 by horizontal movement. The container holding unit 520 may be stirred, for example, by reciprocating in a horizontal direction, or may be stirred by intermittently moving in a predetermined direction. Intermittently moving means to alternately repeat a start and stop movement in a predetermined direction. The movement in the horizontal direction may be, for example, a linear trajectory or an arcuate trajectory. the movement also may be random in an unspecified direction in the horizontal plane. In this way, when stirring is performed before inserting the suction tube 531, the droplets easily splash inside the reagent container 100, but even if the droplets splash, it is possible to prevent the reagent 101 from adhering to the inside of the suction tube introducing part 20 and adhere only to the outside surface of the suction tube introducing part 20. Therefore, even when stirring the reagent, it is possible to effectively prevent the reagent 101 from adhering to the periphery of the opening of the reagent container 100.

In the structural example of FIG. 7, the lower end of the suction tube introducing part 20 is disposed at a position away from the liquid surface 32 toward the upper surface part 11 side at the time of agitation of the reagent container 100 by the sample measuring apparatus 500. According to this configuration, when the reagent 101 requiring agitation for phase separation or the like is accommodated, it is possible to prevent the reagent 101 from adhering to the periphery of the opening of the reagent container 100 even during the agitation. The liquid surface 32 at the time of stirring can be analytically obtained by simulation.

Figure 8A:
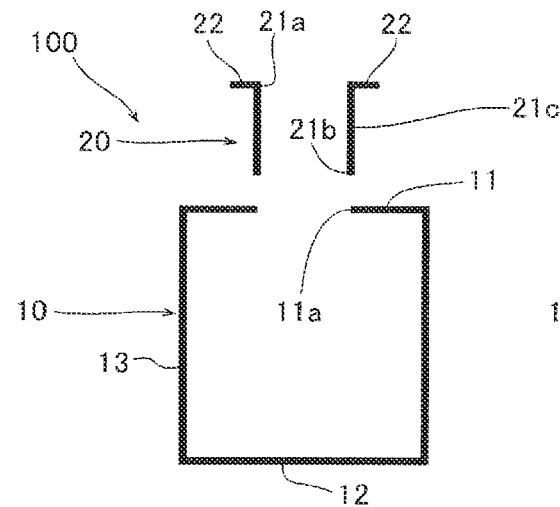
FIG. 8A shows a suction tube introducing part separated from a container body.
Figure 8B:
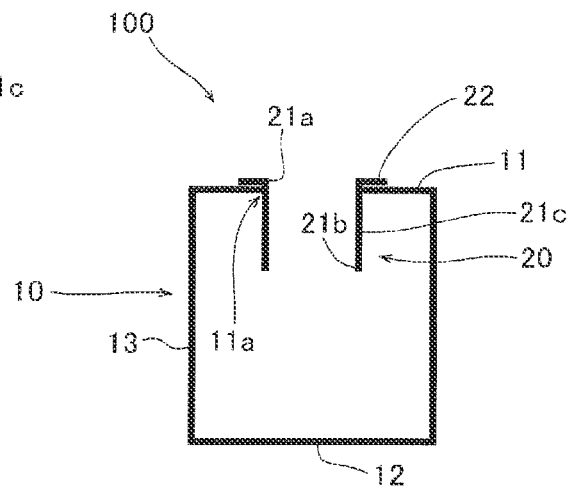
FIG. 8B shows the part mounted.

In the structural example of FIG. 8, the reagent container 100 includes a container body 10 having an upper surface part 11, a bottom surface part 12, and a side surface part 13, and separate from the container body 10, a suction tube introducing part 20 configured to be detachable from the container main body 10. FIG. 8A shows a state in which the container body 10 and the suction tube introducing part 20 are separated, and FIG. 8B shows a state in which the suction tube introducing part 20 is attached to the container body 10.

The upper surface part 11 of the container body 10 has an opening 11a through which the suction tube introducing part 20 is inserted. The opening 11a receives the suction tube introducing part 20 from the lower end side. In this way the suction tube introducing part (20) can be removed from the reagent container (100) when the reagent container (100) is transported in a state of containing the reagent 101. Since the suction tube introducing part (20) can be attached when using the reagent container (100), it is possible to avoid the deposition of liquid droplets on the inside of the suction tube introducing part (20) during transport or the like.

In the structural example of FIG. 8, the suction tube introducing part 20 has an external shape smaller than the opening 11a of the upper surface part 11, and has a tube 21c to be inserted into the opening 11a. The opening 11a has, for example, a circular shape having an inner diameter equal to or larger than the outer diameter of the cylindrical tube 21c. The tube 21c can pass through the opening 11a. In this way the suction tube introducing part 20 can be easily attached to the reagent container 100 simply by inserting the tube 21c without forming the suction tube introducing part 20 from a deformable material or a deformable structure. Since liquid droplets do not adhere to the inside of the tube 21c to be inserted into the opening 11a even if liquid droplets adhere to the periphery of the opening 11a during transport, there is no concern of erroneous detection of the liquid surface.

When the outer shape of the tube 21c of the suction tube introducing part 20 is larger than the opening 11a, for example, the tube 21c can be formed of an elastically deformable material such as rubber and inserted into the opening 11a while elastically deforming the tube 21c. A slit or the like also may be provided from a predetermined position of the tube 21c to the lower end of the tube 21c so that the tube 21c elastically deforms.

In the structural example of FIG. 8, the suction tube introducing part 20 has a protrusion 22 that has an external shape larger than the opening 11a. The inner diameter of the opening 11a is larger than the outer diameter of the tube 21c and smaller than the outer diameter of the protrusion 22. The protrusion 22 is configured not to pass through the opening 11a. Therefore, when the tube 21c is inserted into the opening 11a, the protrusion 22 comes into contact with the peripheral portion of the opening 11a and the suction tube introducing part 20 is locked. In this way it is possible to prevent the suction tube introducing part 20 from falling into the container body 10 through the opening 11a due to the protrusion 22. In the structural example of FIG. 8, the protrusion 22 is formed in a flange shape protruding radially outward from the cylindrical suction tube introducing part 20.

Figure 9A:
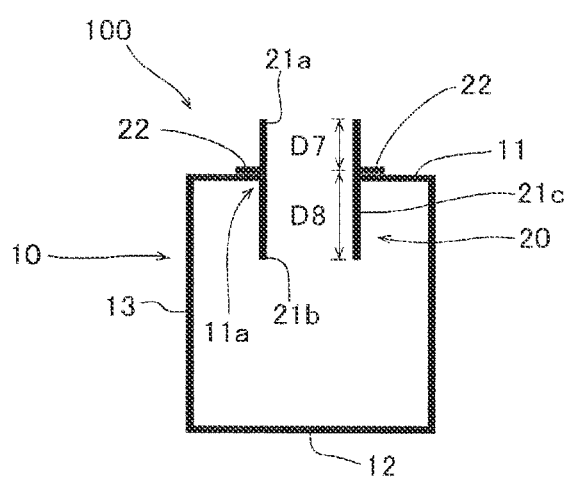
FIG. 9A is a diagram showing a structural example of a protrusion.
Figure 9B:
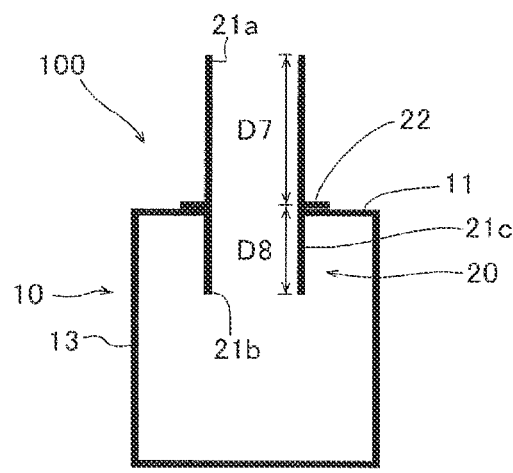
FIG. 9B shows another structural example.

In the structural example of FIG. 9A, the protrusion 22 is provided at a position on the upper opening 21a side of the suction tube introducing part 20. That is, in the suction tube introducing part 20, the distance D7 from the protrusion 22 to the upper opening 21a is less than the distance D8 from the protrusion 22 to the lower opening 21b. In FIG. 9, since the protrusion 22 abuts against the peripheral edge portion of the opening 11a and engages with the container body 10, the attachment position of the suction tube introducing part 20 relative to the opening 11a of the container body 10 is determined depending on the position of the protruding portion 22. Therefore, since the attachment position of the suction tube introducing part 20 relative to the opening 11a of the container body 10 is determined depending on the position of the protrusion 22, it is possible to suppress the protruding length of the suction tube introducing part 20 projecting upward from the opening 11a by arranging the protrusion 22 on the side of the upper opening 21a of the suction tube introducing part 20. That is, the total height of the reagent container 100 can be reduced compared with a configuration in which the distance D7 from the protrusion 22 to the upper opening 21a is greater than the distance D8 from the protrusion 22 to the lower opening 21b as shown in FIG. 9B. Note that the protrusion 22 also may be provided at a position on the lower opening 21b side of the suction tube introducing part 20, as shown in FIG. 9B.

Note that in the structural example of FIG. 8 the protrusion 22 is provided at substantially the same height position as the upper opening 21a of the suction tube introducing part 20, and the distance D7 from the protrusion 22 to the upper opening 21a is substantially 0. By providing the protrusion 22 so as to protrude radially outward from the upper end portion or the vicinity of the upper end portion of the suction tube introducing part 20, it is possible to minimize the protruding length of the suction tube introducing part 20 protruding upward from the opening 11a.

In the structural example of FIG. 10, the container main body 10 has a tubular guide part 11b for introducing the suction tube introducing part 20 from the opening 11a, and the protrusion 22 has a first engaging part 23 to engage the guide part 11b. In this way the guide part 11b allows the suction tube introducing part 20 to be easily inserted into the opening 11a. The suction tube introducing part 20 can be easily attached to the container body 10 by the first engaging part 23.

In the structural example of FIG. 10A, the guide art 11b is configured as a tubular part provided so as to linearly extend upward from the upper surface part 11 of the container body 10. The guide part 11b is integrally formed with the upper surface part 11 of the container body 10. The guide part 11b has, for example, a cylindrical shape. The opening 11a is provided from the upper end part of the guide part 11b to the lower end part of the guide part 11b communicating with the inner surface of the upper surface part 11.

In the structural example of FIG. 10A, the protrusion 22 is provided so as to project radially outward from the upper end part of the suction tube introducing part 20, and the first engaging part 23 extends downward from the outer peripheral end part of the protrusion 22. The first engaging part 23 is disposed at a position away from the tube 21c of the suction tube introducing part 20 in the radial direction. The first engaging part 23 faces the tube 21c in the radial direction. The radial length of the protrusion 22 is greater than the thickness of the guide part 11b. That is, the radial distance between the tube 21c of the suction tube introducing part 20 and the first engaging part 23 is greater than the thickness of the guide part 11b. The first engaging part 23 is formed, for example, in a cylindrical shape.

In this way, when the tube 21c of the suction tube introducing part 20 is inserted into the opening 11a from above, the suction tube introducing part 20 is guided by the guide part 11b and is inserted into the opening 11a without tilting, as shown in FIG. 10B. When the suction tube introducing part 20 is attached to the container body 10, the guide part 11b of the container body 10 is inserted so as to be fitted between the first engaging part 23 of the suction tube introducing part 20 and the tube 21c, and the guide part 11b and the first engaging part 23 engage with each other. In this way it is possible to prevent the suction tube introducing part 20 from unintentionally disengaging from the container body 10 since the suction tube introducing part 20 is attached to the container body 10 in an engaged state.

In the structural example of FIG. 10B, the guide part 11b is provided so as to protrude upward from the upper surface part 11, and the distance D9 from the lower end of the suction tube introducing part 20 to the upper surface part 11 is equal to or less than the protrusion length D10 from the upper surface part 11 of the guide part 11b. In this way it is possible to reduce the protruding length of the lower end of the tube 21c from the upper surface part 11, so that the lower end of the tube 21c can be effectively separated from the liquid surface 30 when filled to capacity. As a result, it is possible to effectively inhibit the reagent 101 from adhering to the periphery of the opening of the reagent container 100.

As shown in FIGS. 8 to 10, when the container main body 10 and the suction tube introducing part 20 are formed as separate bodies, the container main body 10 may be provided with a sealing material 50 or the like for closing the opening 11a. The user removes the sealing material 50 at the time of use, for example, and then inserts the suction tube introducing part 20 into the opened opening 11a so as to attach the suction tube introducing part 20 to the container body 10. In a state where the opening 11a is blocked by the sealing material 50, the tube 21c of the suction tube introducing part 20 is pressed against the opening 11a, and the tube 21c is inserted through the sealing material 50 into the opening 11a.

The guide part 11b and the first engaging part 23 may be engaged by fitting, for example, or may be engaged by a snap-fit structure of a type that is fitted using elastic deformation of the engaging part. In the structural example of FIG. 11, the guide part 11b and the first engaging part 23 are configured to be engaged by a screw structure. In this way the suction tube introducing part 20 and the container body 10 can be fixed securely and firmly with a simple structure.

Figure 12A:
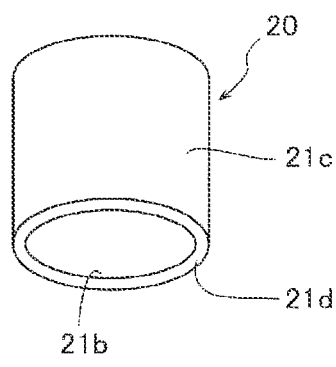
FIG. 12A is a perspective view showing a shape example of a lower end part of a suction tube introducing part.

FIG. 12A shows an example of the shape of the lower end of the tube 21c. In FIG. 12A, the tube 21c has a cylindrical shape and a circular lower opening 21b is formed. The lower end surface 21d of the tube 21c, which is the edge portion of the lower opening 21b, is formed in a flat surface shape.

Figure 12B:
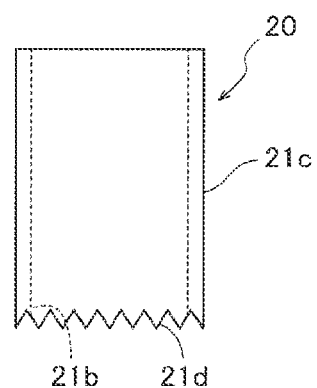
FIG. 12B is a side view showing a second shape example.

In the structural example of FIG. 12B, the lower end surface 21d of the tube 21c has a downward facing unevenness. The lower end surface 21d has a sawtooth uneven surface. In the case of forming the lower end surface 21d of the tube 21c as a non-flat uneven surface, it is possible to make it difficult to form a liquid film with the irregular surface even when droplets of the reagent adhere to the lower end surface 21d of the tube 21c.

Figure 12C:
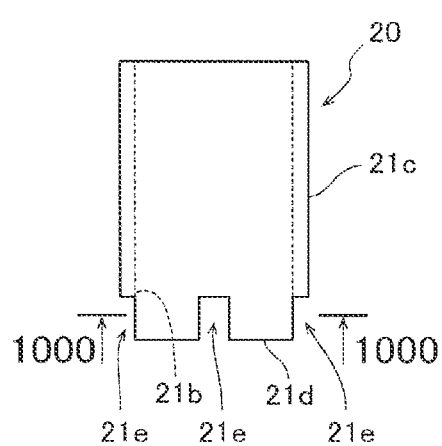
FIG. 12C is a side view showing a third shape example.
Figure 12D:
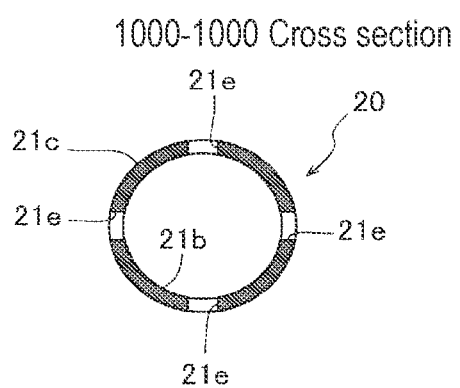
FIG. 12D is a cross-section view taken along line 1000-1000.

In the structural example of FIG. 12C, a notch or slit 21e extending upward is formed in the lower end surface 21d of the tube 21c. FIG. 12D shows a horizontal cross section of the tube 21c at the formation position of the slit 21e. In the structural examples of FIGS. 12C and 12D, the slits 21e are provided at a plurality of positions in the tube 21c. In the structural examples of FIGS. 12C and 12D, it also is possible to make it difficult to form a liquid film with the slit 21e even when droplets of the reagent adhere to the lower end surface 21d of the tube 21c.

Figure 13A:
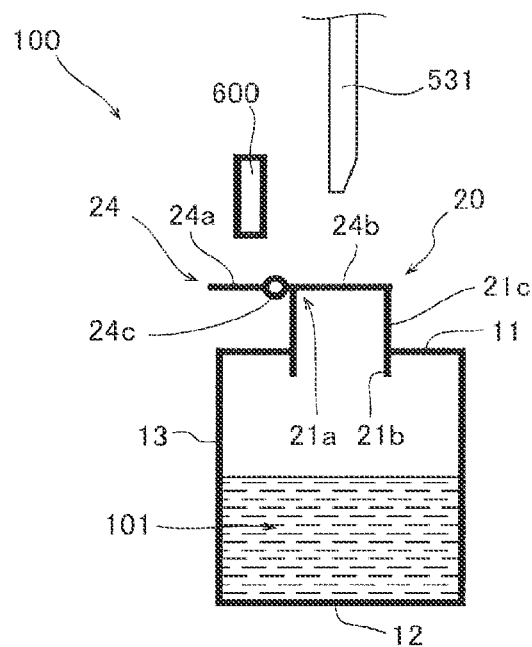
FIG. 13A shows a closed state of the opening/closing lid, and FIG. 13B show an opened state.
Figure 13B:
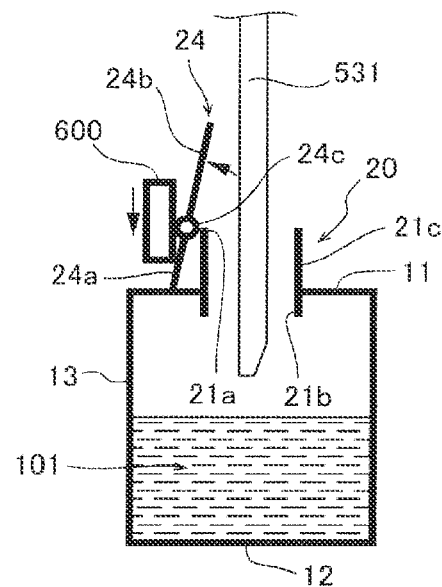

In the structural examples of FIGS. 13A and 13B, the reagent container 100 is configured to be opened and closed by an openable lid 24. The suction tube introducing part 20 has an openable lid 24 for opening and closing the upper opening 21a. The openable lid 24 includes a first region 24a for opening the upper opening 21a when pressed by the sample measuring apparatus 500, and a second region 24b for closing the upper opening 21a when pressed by the sample measuring apparatus 500. In the structural example of FIG. 13, the sample measuring apparatus 500 has a pressing part 600 that can move up and down, and the first region 24a and the second region 24b in the reagent container 100 of the container holding unit 520 are pressed by the up and down movement of the pressing part 600. In this way the upper opening 21a can be opened and closed by the sample measuring apparatus 500. Therefore, evaporation or alteration of the reagent 101 can be prevented by opening the openable lid 24 only when suctioning the reagent 101 with the suction tube 531, and closing the lid 24 when not suctioning reagent.

As shown in FIG. 13B, as the first region 24a is pressed by the pressing part 600, the openable lid 24 covering the upper opening 21a is moved and the upper opening 21a is opened. In the open state, the suction tube 531 passes through the upper opening 21a and the lower opening 21b and suctions the reagent. In the structural example of FIG. 13, the pressing part 600 and the reagent container 100 are movable relative to each other in the horizontal direction. The pressing part 600 is disposed above the second region 24b, and the inside of the container can be hermetically closed by closing the openable lid 24 by pushing the second region 24b, as shown in FIG. 13A.

In the structural example of FIG. 13, the openable lid 24 has a hinge 24c disposed between the first region 24a and the second region 24b, and the lid 24 pivots about the hinge 24c when either the first region 24a or the second region 24b is pressed. The openable lid 24 is configured to be rotatable between a position of covering the upper opening 21a (FIG.

13A) and a position of opening the upper opening 21a (FIG. 13B). In this way the openable lid 24 can be opened and closed only by pressing one first region 24a and the other second region 24b against the hinge 24c like a lever. Therefore, complication of the structure of the reagent container 100 can be suppressed, and the mechanism for opening and closing the side of the sample measuring device 500 can also be simplified.

Figure 14A:
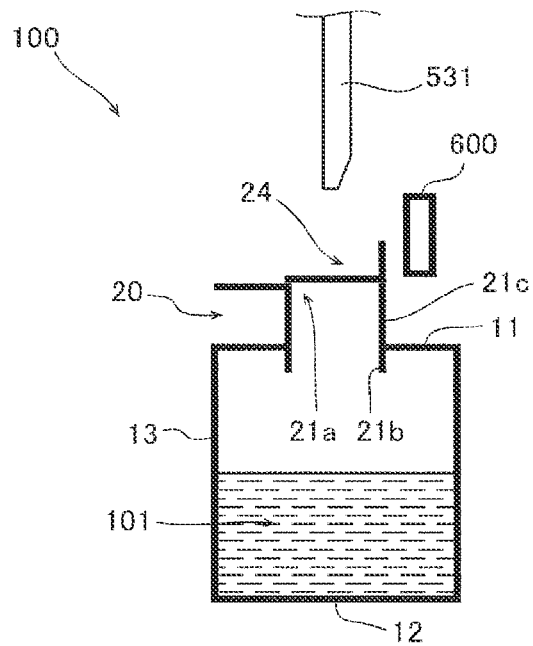
FIG. 14A shows a closed state according to another structural example of the opening/closing lid.
Figure 14B:
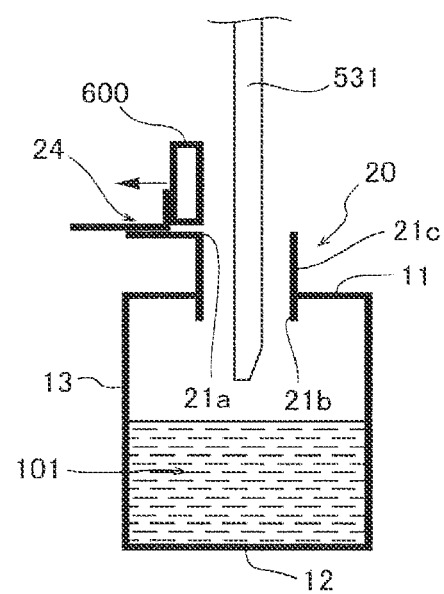
FIG. 14B shows an open state.

In the structural example of FIG. 14, the openable lid 24 is configured to be horizontally movable between a position (FIG. 14A) for closing the upper opening 21a and a position (FIG. 14B) for opening the upper opening 21a. In the structural example of FIG. 14, the pressing part 600 of the sample measuring apparatus 500 and the reagent container 100 are relatively moved in the horizontal direction; one direction to open the openable lid 24 (leftward direction in FIG. 14B), and another direction to close the openable lid 24 (rightward direction in FIG. 14A) by pressing.

Specific Configuration Examples of Container

Next, a specific structural example of the reagent container 100 will be described in detail with reference to FIGS. 15 to 22.

Figure 15:
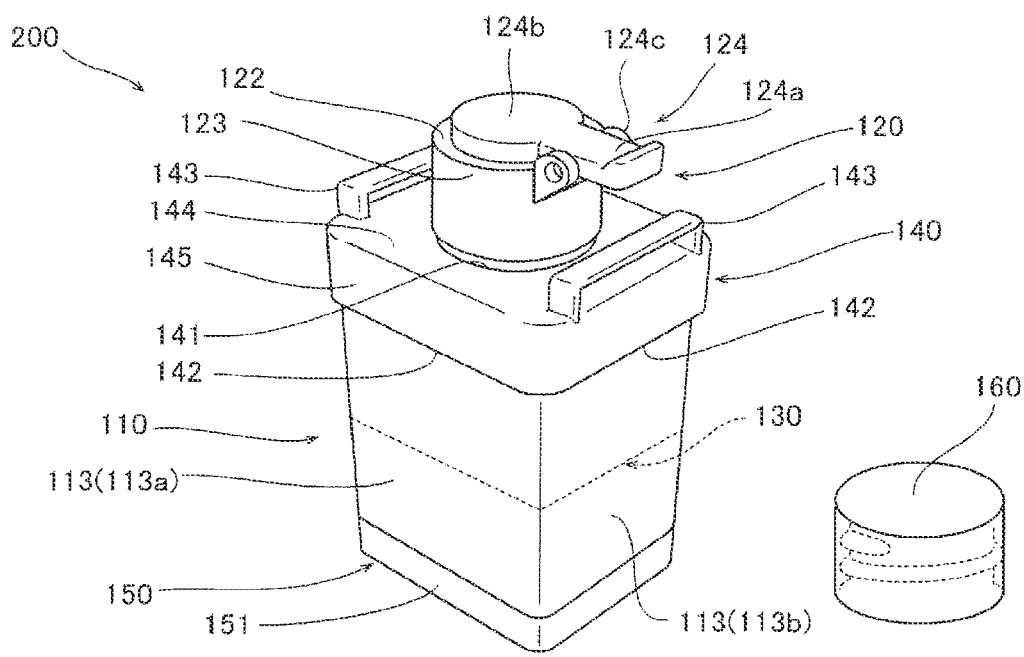
FIG. 15 is a perspective view showing a structural example of a reagent container.
Figure 16:
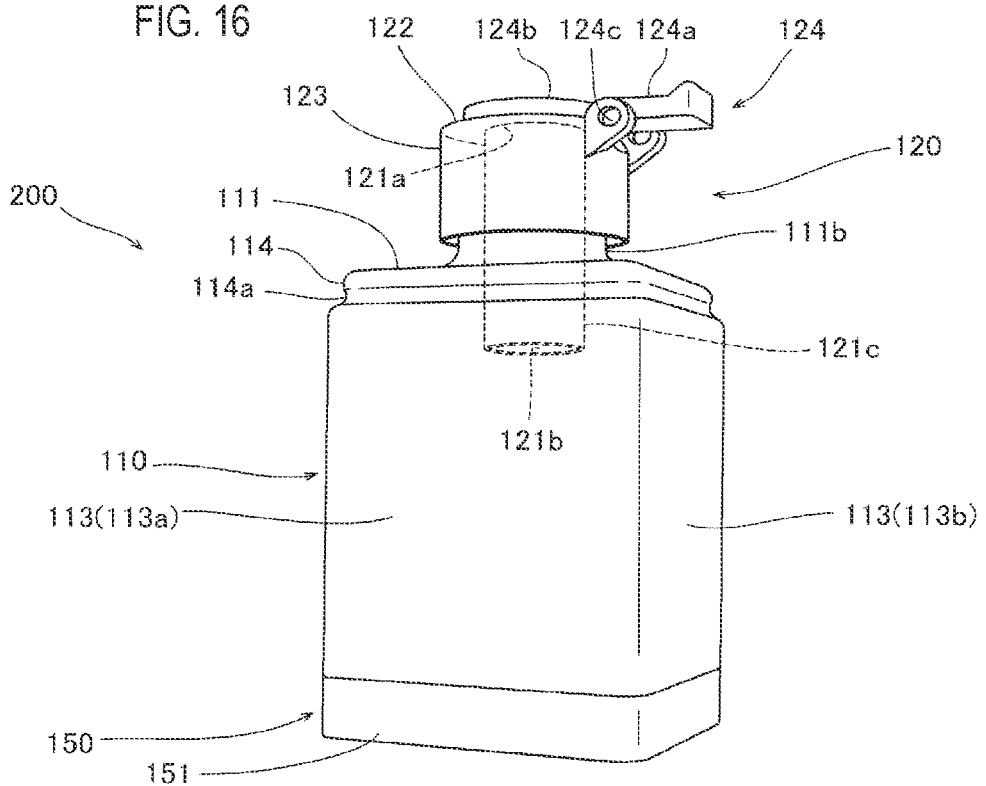
FIG. 16 is a perspective view showing a reagent container with an upper cover removed.

As shown in FIG. 15 and FIG. 16, the reagent container 200 includes a container body 110 having an upper surface part 111, a bottom surface part 112 (see FIG. 17,) and side surface part 113, and the reagent container 200 also has, separate from the container body 110, a suction tube introducing part 120 configured to be attachable to and detachable from the reagent container 200. The reagent container 200 also includes an upper cover 140 detachably provided on the container body 110 so as to cover the upper surface part 111 of the container body 110. The reagent container 200 also includes a lower cover 150 which is detachably provided on the bottom part 112 and has a flat lower end portion. In FIG. 15, the reagent container 200 is configured as an assembly in which the container body 110, the suction tube introducing part 120, the upper cover 140, and the lower cover 150 are assembled, and accommodates the reagent in the container body 110. Note that, for the sake of convenience, the upper cover 140 is removed in FIG. 16.

Figure 17:
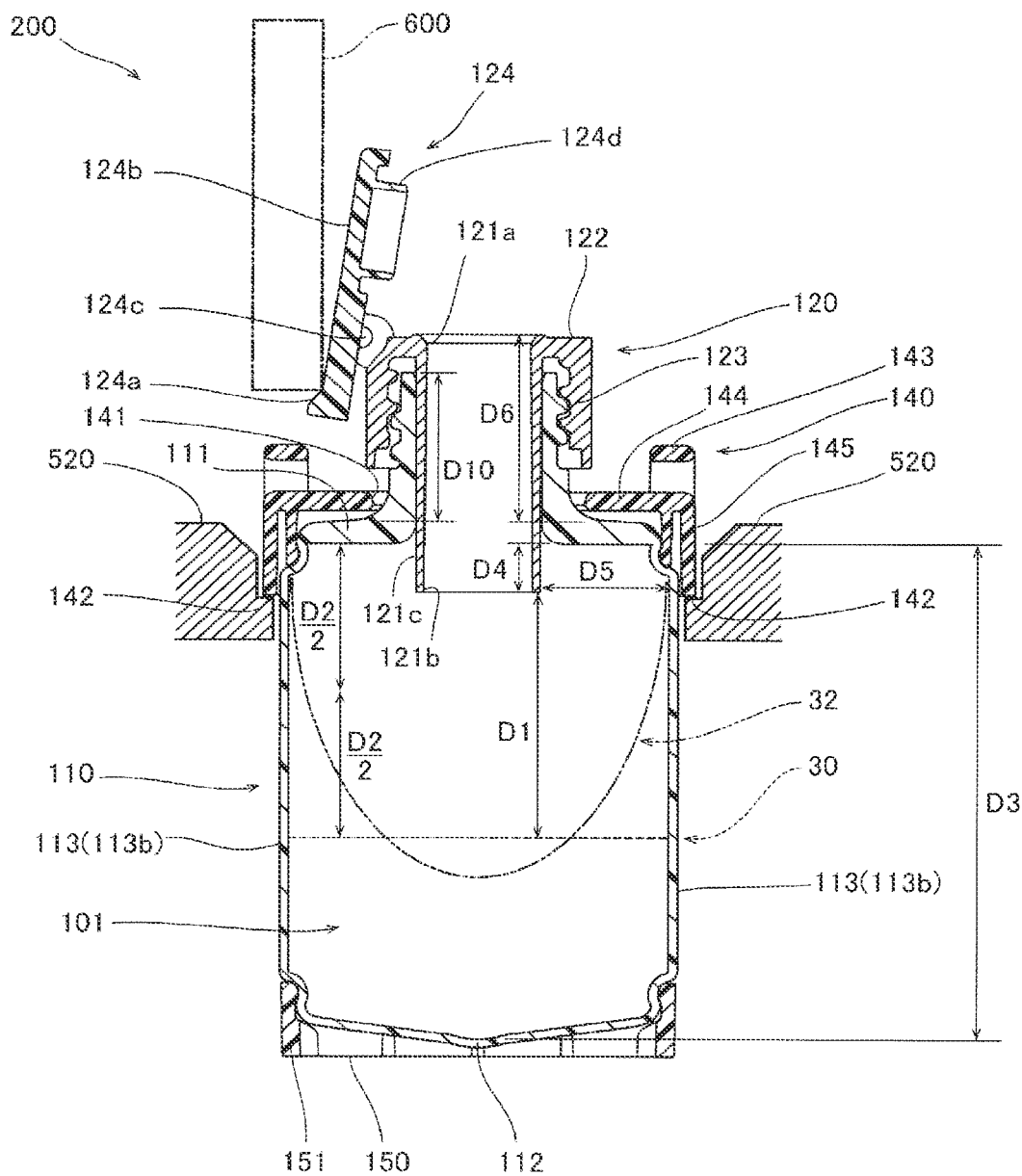
FIG. 17 is a longitudinal sectional view of the reagent container shown in FIG. 15.
Figure 18:
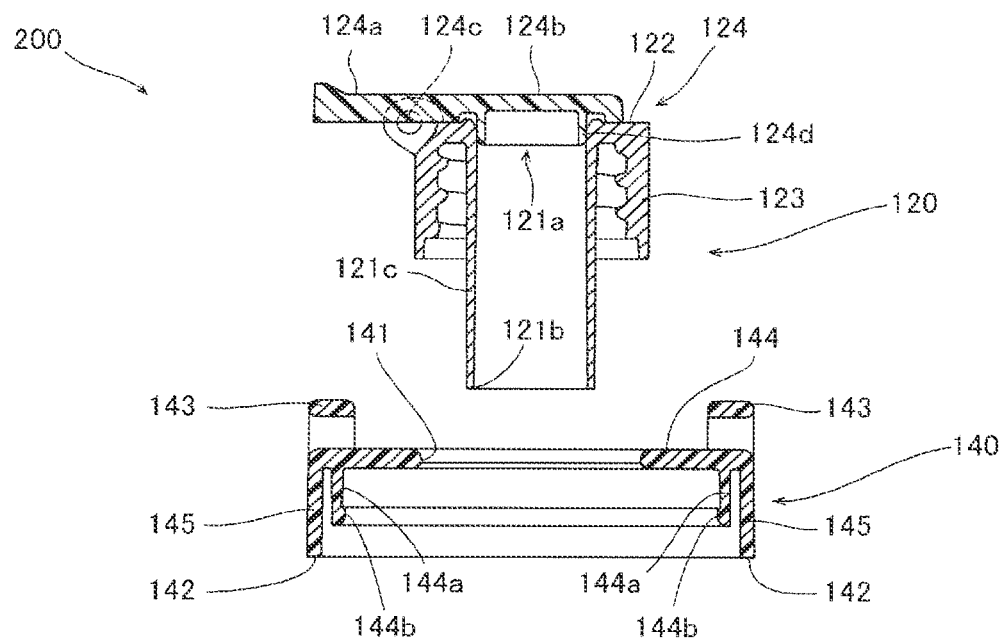
FIG. 18 is a vertical cross-section view showing the disassembled state of the reagent container in FIG. 17.

FIG. 17 shows a longitudinal cross section of the reagent container 200 in the assembled state, and FIG. 18 shows a vertical cross section of the reagent container 200 in the disassembled state.

Suction Tube Introducing Part

As shown in FIGS. 17 and 18, the suction tube introducing part 120 extends vertically from the upper surface part 111 to a position above the liquid surface 30 of the reagent 101. The suction tube introducing part 120 is provided so as to pass-through the upper surface part 111, and is provided with an upper opening 121a for receiving the suction tube 531, a lower opening 121b open to the inner space, and a side surface part 113 independently, and a tube 121c in which the lower opening 121b is formed. The lower end of the tube 121c corresponds to the lower end of the suction tube introducing part 120.

The lower end of the tube 121c protrudes toward the bottom surface part 112 side from the upper surface part 111, and is disposed at a position away from the liquid surface 30 toward the upper surface part 111 side in the stationary state when filled to full capacity. The lower end of the tube 121c is disposed at a position away from the liquid surface 32 toward the upper surface portion 111 side (see the two-dot chain line in FIG. 17) at the time of agitation of the reagent container 200 by the sample measuring apparatus.

In FIG. 17, the lower end of the tube 121c is disposed at a position closer to the upper surface part 111 than ½ the distance D2 from the liquid surface 30 to the upper surface part 111. Here, the liquid surface 30 is set within a range of ⅖ or more and ⅘ or less of the distance D3 from the bottom surface part 112 to the upper surface part 111.

The tube 121c faces away from the side surface part 113 and the distance D4 from the lower end of the tube 121c to the upper surface part 111 is equal to or less than the distance D5 between the tube 121c and the side surface part 113. The distance D4 from the lower end of the tube 121c to the upper surface part 111 is equal to or less than the distance D6 from the upper surface part 111 to the upper opening 121a.

The lower end of the tube 121c is disposed at a position closer to the upper surface part 111 than ½ the distance D3 from the bottom surface part 112 to the upper surface part 111. Specifically, the lower end of the tube 121c is disposed at a position closer to the upper surface part 111 than ⅔ of the distance D3 from the bottom surface part 112 to the upper surface part 111.

Here, the upper surface part 111 of the container main body 110 has an opening 111a (see FIG. 18) into which the suction tube introducing part 120 is inserted. The outer shape of the tube 121c of the suction tube introducing part 120 is smaller than the opening 111a. The tube 121c can pass through the opening 111a.

The suction tube introducing part 120 has a protrusion 122 that has an exterior shape larger than the opening 111a of the upper surface part 111. The protrusion 122 is provided at a position on the upper opening 121a side of the suction tube introducing part 120. The protrusion 122 is configured not to pass through the opening 111a. The protrusion 122 is provided in the vicinity of the upper end portion which is substantially the same height position as the upper opening 121a of the suction tube introducing part 120, and the vertical distance from the protrusion 22 to the upper opening 121a is substantially zero. Therefore, in the suction tube introducing part 120, the distance in the vertical direction from the protrusion 122 to the upper opening 121a is less than the distance in the vertical direction from the protrusion 122 to the lower opening 121b.

Here, the container body 110 has a tubular guide part 111b for introducing the suction tube introducing part 120 from the opening 111a. The protrusion 122 has a first engaging part 123 for engaging with the guide part 111b. The guide part 111b and the first engaging part 123 are configured to engage by a screw structure. The guide part 111b is provided so as to protrude upward from the upper surface part 111, and the distance D4 from the lower end of the tube 121c to the upper surface part 111 is equal to or less than the protruding length D10 from the upper surface part 111 of the guide part 111b.

The suction tube introducing part 120 has an openable lid 124 for opening and closing the upper opening 121a. The openable lid 124 includes a first region 124a for opening the upper opening 121a when pressed by the sample measuring apparatus 500, and a second region 124b for closing the upper opening 121a when pressed by the sample measuring apparatus 500.

The openable lid 124 has a hinge 124c disposed between the first region 124a and the second region 124b, and the openable lid 124 pivots on the hinge 124c when the first region 124a or the second region 12b is pressed.

As shown in FIG. 17, the openable lid 124 has a protrusion 124d formed so as to fit into the upper opening 121a in a closed state (see FIG. 18). The protrusion 124d has an outer diameter substantially equal to the inner diameter of the upper opening 121a. The protrusion 124d is provided so as to protrude toward the lower opening 121b in the closed state of the openable lid 124. The protruding length of the protrusion 124d is set within a range that does not hinder the opening and closing operation of the openable lid 124. The protrusion 124d is fitted into the upper opening 121a in the closed state of the openable lid 124. When the openable lid 124 is closed by the protrusion 124d, airtightness is improved by the protrusion 124d fitted in the upper opening 121a.

Note that in the structural example shown in FIG. 15, the reagent container 200 is provided separately from the suction tube introducing part 120 so as to be detachably provided in the container body 110, and further includes a cap 160 for sealing the opening 111a. The cap 160 has an engaging part having a screw structure similar to that of the first engaging part 123 of the suction tube introducing part 120, and is attached to the guide part 111b of the container body 110 in exchange for the suction pipe introduction portion 120. The cap 160 is not provided with the upper opening 121a for allowing the suction tube 531 to pass therethrough, and is configured so that the container body 110 can be hermetically sealed. The reagent 101 can be reliably sealed and stored at the time of transportation, storage and the like by the cap 160 in a state where the reagent 101 is contained therein. When the reagent container 200 is unsealed, the cap 160 can be replaced with the suction tube introducing part 120.

Figures 19, 20:
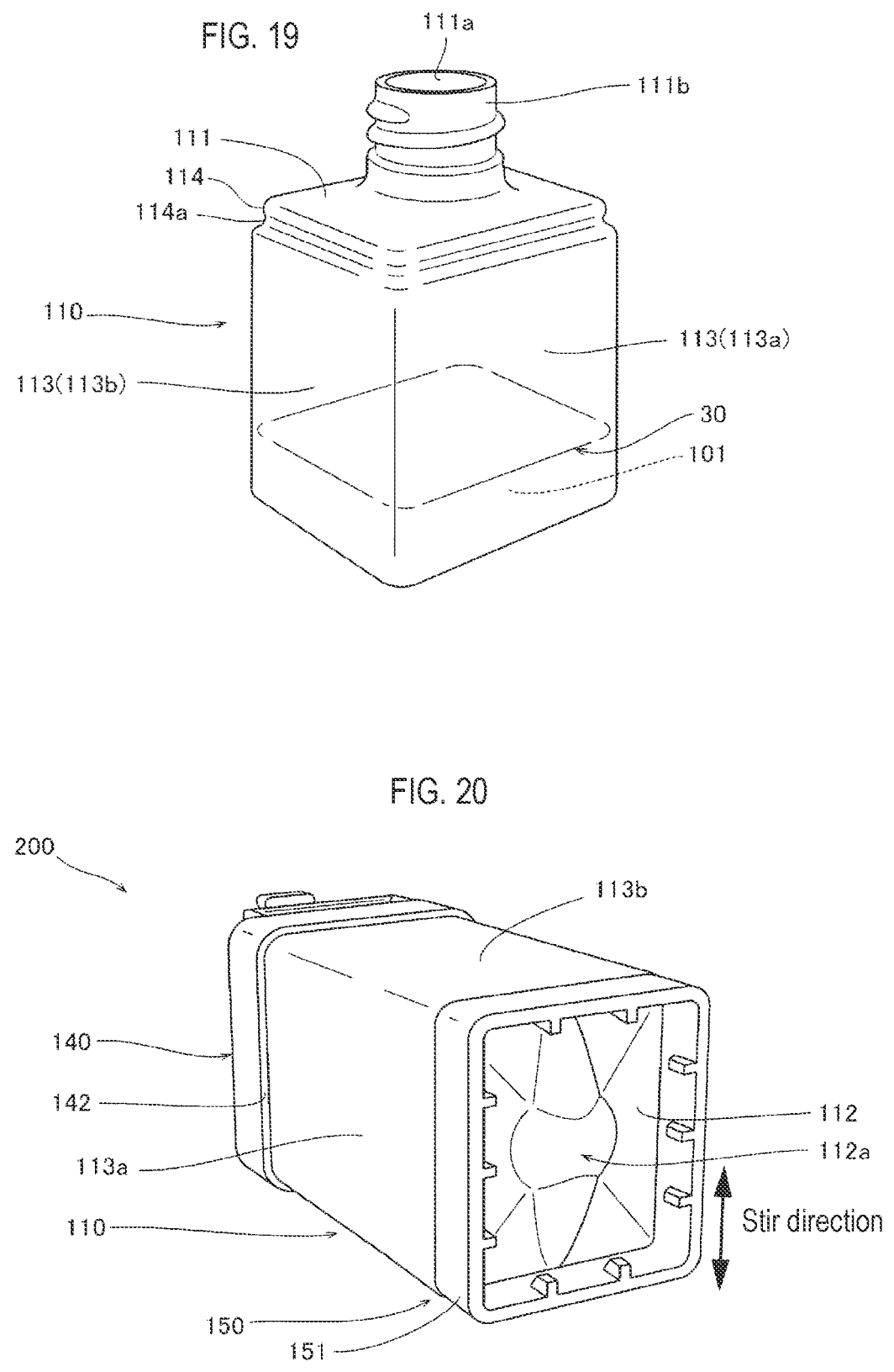

That is, in the structural example of FIG. 15, the reagent container 200 is provided to the user in a state in which the cap 160 is attached to the container body 110 and the container body is sealed. The suction tube introducing part 120 is attached as a part to be mounted in exchange with the cap 160 when setting the reagent container 200 in the sample measurement apparatus 500. When using the reagent container 200, the user removes the cap 160 and attaches the suction tube introducing part 120 to the container body 110.
Container Body As shown in FIG. 19, the container body 110 has a flat plate-shaped upper surface part 111 in plan view, a side surface part 113 having four flat plate-like side surfaces, and a rectangular bottom surface part 112 (see FIG. 20).

The container body 110 accommodates in advance the R2 reagent as the reagent 101 used in the sample measurement apparatus 500 described later. The R2 reagent includes a solid phase carrier that binds to a capture substance that binds to a target substance in a sample using an antigen-antibody reaction. The R2 reagent is used in an immunoassay device that measures a target substance in a sample using an antigen-antibody reaction. In the immunoassay apparatus, it is desirable to suppress fluctuation of the dispensing amount due to erroneous detection of the liquid level 30 from the viewpoint of accuracy control, and the reagent container 200 of the present embodiment is ideally suited to suppress the adherence of the R2 reagent to the periphery of the opening of the reagent container 200.

The solid phase carrier is, for example, a magnetic particle to which a substance binding to a capture substance is immobilized. The solid phase carrier is, for example, magnetic particles (StAvi-bound magnetic particles) to which streptavidin binding to biotin is immobilized. A solid-liquid two-phase component of a solid phase carrier and a liquid phase component in which a solid phase carrier is dispersed is contained as R2 reagent in the container main body 110. In the solid-liquid two-phase R2 reagent, stirring is performed by the sample measurement device 500 since the solid phase carrier settles on the bottom surface part 112. In order to secure an internal space for moving the reagent in conjunction with stirring, as shown in FIGS. 17 and 18, the liquid surface 30 of the reagent 101 is located at a low position that is less than ½ of the distance D3 from the bottom surface part 112 to the upper surface part 111. For a reagent that does not require stirring, the liquid surface 30 may be set to a position higher than ½ of the distance D3.

The upper surface part 111 is formed in a flat plate shape substantially orthogonal to the side surface part 113. The upper surface part 111 has an opening 111a into which the suction tube introducing part 120 is inserted. That is, the container body 110 has a cylindrical guide part 111b for introducing the suction tube introducing part 120 from the opening 111a, and the guide part 111b is disposed so as to project upward from the upper surface part 111. The opening 111a is formed so as to penetrate from the upper end part of the guide part 111b to the inner surface side of the upper surface part 111.

The upper end opening 111a of the guide part 111b and the guide part 111b are disposed substantially at the center of the rectangular upper surface part 111. Therefore, the suction tube introducing part 120 is arranged at substantially the center of the upper surface part 111 (see FIG. 15).

As shown in FIG. 19, the container body 110 has a substantially rectangular parallelepiped shape. The upper surface part 111 has a substantially rectangular shape. The side surface part 113 includes a pair of long side surfaces 113a on the sides connected to the long side of the upper surface part 111, and a pair of short side surfaces 113b on the sides connected to the short side of the upper surface part 111.

The bottom surface part 112 of the internal space has a concavity 112a (see FIG. 18) immediately below the lower opening 121b and is inclined toward the concavity 112a. In this way the reagent 101 can be stored in the concavity 112a just below the lower opening 121b when the liquid amount of the reagent 101 decreases with the suction. Therefore, it is possible to reduce the dead volume that cannot be suctioned by the suction tube 531.

The concavity 112a is provided in the bottom surface part 112 so as to extend along the oscillation direction of the reagent container 200 when being stirred by the sample measuring apparatus 500. In this way the liquid at the time of stirring can be easily moved even in the concavity 112a and more uniform stirring can be performed since the recess 112a extends along the vibration direction.

Figure 21:
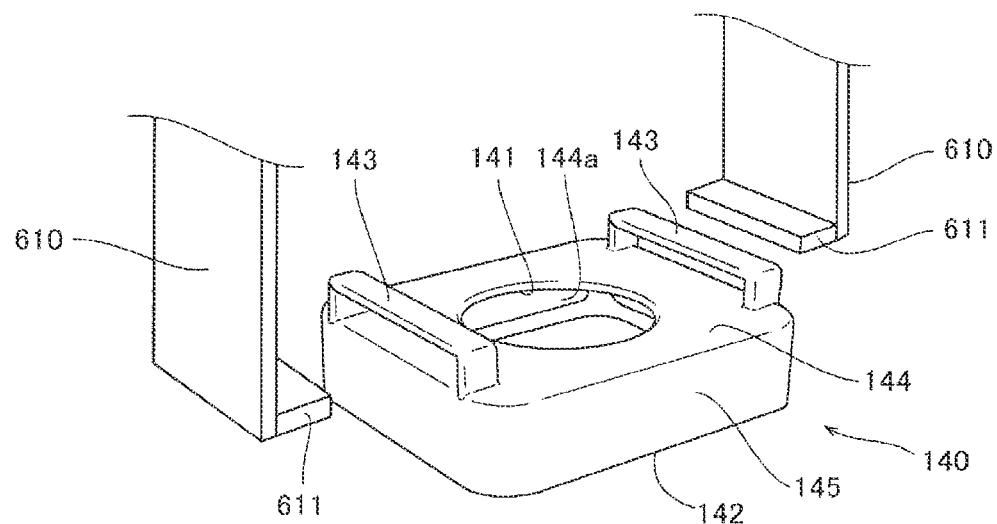
FIG. 21 is a perspective view showing an upper cover of the reagent container shown in FIG. 15.

Specifically, as shown in FIG. 20, the concavity 112a is provided so as to extend in the longitudinal direction of the bottom surface part 112 along the long side surface 113a. That is, the concavity 112a is provided so as to extend in the longitudinal direction from the vicinity of one short side surface 113b to the vicinity of the opposite short side surface 113b. On the other hand, the concavity 112a has a small width in the lateral direction in which the long side surface 113a is disposed, and is provided at a position away from the long side surface 113a. As will be described later, the reagent container 200 is held by the circular container holding unit 520 and stirred intermittently in the circumferential direction of the container holding unit 520. Therefore, the oscillation direction at the time of stirring of the reagent container 200 is a tangential direction in the circumferential direction of the container holding unit 520, and the longitudinal direction of the bottom part 112 is held along the tangential direction of the container holding unit 520 in the circumferential direction. As a result, the oscillating direction at the time of stirring coincides with the extending direction of the concavity 112a, and the internal reagent is efficiently stirred.
Upper Cover As shown in FIGS. 15 and 21, the upper cover 140 is detachably provided on the container body 110 so as to cover the upper surface part 111 of the container body 110.

The upper cover 140 has a cover opening 141 exposing the suction tube introducing part 120. As shown in FIGS. 17 and 18, the cover opening 141 has an inner diameter greater than the outer diameter of the guide part 111b of the container body 110, and is formed so as to pass through the guide part 111b. In this way the suction tube introducing part 120 is attached to the upper end of the guide part 111b protruding upward through the cover opening 141 when the upper cover 140 is attached to the container body 110.

The upper cover 140 has a second engaging part 142 for engaging with the container holding unit 520 of the sample measuring device 500. In this way the upper cover 140 that has the second engaging part 142 allows the reagent container 200 to be stably held in the container holding unit 520 in an engaged state.

As shown in FIGS. 17 and 18, the upper cover 140 is disposed between the upper surface part 111 and the suction tube introducing unit 120. The cover opening 141 of the upper cover 140 is smaller than the outer shape of the suction tube introducing part 120. That is, the cover opening 141 can pass through the guide part 111b of the container body 110, and is formed to have a size that cannot pass through the protrusion 122 and the first engaging part 123 of the suction tube introducing part 120. The suction tube introducing part 120 engages the guide part 111b of the container body 110 in the first engaging part 123 via a screw structure. Therefore, the upper cover 140 cannot be detached from the container body 110 between the upper surface part 111 and the first engaging part 123 unless the suction tube introducing part 120 is removed. In this way the suction tube introducing part 120 can also function as a stopper for preventing the upper cover 140 from coming out. Therefore, it is possible to prevent the upper cover 140 from being detached from the container main body 110 when the user grips the upper cover 140 to lift the reagent container 200, or when the reagent container 200 is suspended via the upper cover 140 in the container holding unit 520 or the container transfer unit 610 of the above-described sample measuring apparatus 500.

The upper cover 140 has a first part 144 extending along the upper surface part 111 and a second part 145 extending along the side surface part 113 from the outer peripheral portion of the first part 144 and covering a portion of the side surface part 113. That is, the upper cover 140 has an L-shaped configuration in the longitudinal section by the first part 144 along the upper surface part 111 and the second part 145 along the side surface part 113. The second part 145 is annularly formed along the outer edge of the first part 144. That is, the second part 145 is formed so as to face each of the four side surfaces of the side surface part 113 of the container body 110.

As shown in FIG. 18, the container body 110 has a third engaging part 114 for engaging with the upper cover 140 at a connecting part between the upper surface part 111 and the side surface part 113. Here, since the connecting part between the upper surface part 111 and the side surface part 113 of the container body 110 corresponds to the upper corner portion of the container body 110, it is high in rigidity and scarcely can be bent and deformed. Therefore, by disposing the third engaging part 114 in the connecting part which is scarcely is bent and deformed, it is possible to make it difficult for the upper cover 140 to come off.

More specifically, the first part 144 has an engaging rib 144a to which the third engaging part 114 is fitted, at a position distant from the second part 145 on the inner peripheral side. The engaging rib 144a is annularly provided substantially parallel to the second part 145. A convexity 144b is provided on the inner surface side at the distal end portion of the engaging rib 144a. On the other hand, the third engaging part 114 of the container body 110 is bent at the connecting part between the upper surface part 111 and the side surface part 113 so as to correspond to the engaging rib 144a, and a concavity 114a is provided into which the convexity 144b of the leading end of the engaging rib 144a is fitted. The engaging rib 144a and the third engaging part 114 have a snap fit structure that engages by elastically deforming the engaging rib 144a and fitting the convexity 144b at the tip into the concavity 114a of the third engaging part 114. As shown in FIG. 19, the third engaging part 114 is provided circumferentially around the entire circumference of the upper surface part 111, and the engaging rib 144a and the third engaging part 114 are formed substantially in the upper surface part 111 to engage over the entire circumference.

On the other hand, as shown in FIG. 18, the second engaging part 142 for engaging with the container holding unit 520 is provided in the second part 145. Therefore, the engaging rib 144a for attaching and detaching from the container body 110 and the second engaging part 142 for engaging with the container holding unit 520 are provided at positions separated from each other in the upper cover 140. In this way, for example, it is possible to prevent the bending deformation of the second part 145 when the second engaging part 142 is engaged with the container holding unit 520 from affecting the engaging rib 144a, and it is possible to prevent the engagement between the container body 110 and the upper cover 140 from being released by deformation of the second part 145.

Specifically, the second engaging part 142 is formed at the lower end portion of the second part 145. Here, the second engaging part 142 is provided at a position projecting outward in the radial direction from the container body 110 and the lower cover 150. As shown in FIG. 17, the container holding unit 520 has a holding hole (see FIG. 32) through which the container body 110 and the lower cover 150 can pass, and through which the second engaging part 142 cannot pass. When the reagent container 200 is inserted into the opening from above the container holding unit 520, the second engaging part 142, which is the lower end surface of the second part 145, comes into contact with the container holding unit 520 and is caught. In this way the reagent container 200 is held such that the second engaging part 142 engages with the container holding unit 520 and is suspended.

As shown in FIG. 21, the upper cover 140 has a gripped part 143 to be grasped by being engaged with the container transfer unit 610 of the sample measuring apparatus 500. In this way the container transfer unit 610 can automatically transfer the reagent container 200 to a desired position, and when transferring the reagent container 200, the container transfer unit 610 can be engaged with the gripped part 143 and stably held. The gripped part 143 protrudes upward from the upper surface of the upper cover 140, and is formed in a loop shape so as to form the engagement passage 143a on the inner side. In the structural example of FIG. 21, a pair of engaging claws 611 of the container transfer unit 610 are inserted into the engaging passages 143a of the pair of gripped parts 143, so that the reagent container 200 is gripped through the upper cover 140. The container transfer unit 610 moves the reagent container 200 while holding the reagent container 200 by a moving mechanism (not shown), and sets it in the container holding unit 520 shown in FIG. 17.

Lower Cover

The lower cover 150 is detachably provided on the bottom surface part 112. As shown in FIG. 18, the lower cover 150 has a flat lower end portion. Here, the outer surface of the bottom part 112 of the container body 110 protrudes corresponding to the concavity 112*a*. Therefore, the container body 110 is shaped so as not to easily stand upright on a flat installation surface by itself. The lower cover 150, when attached to the container body 110, provides a lower end surface for allowing the reagent container 200 to stand upright on a flat installation surface. In this way the reagent container 200 can be stably stood on by the lower cover 150 even if the bottom part 112 protrudes.

Figure 22:
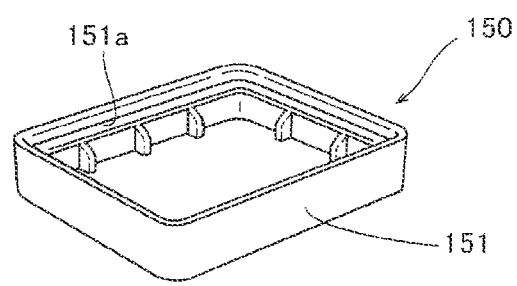
FIG. 22 is a perspective view showing the lower cover of the reagent container shown in FIG. 15.

As shown in FIG. 22, the lower cover 150 has a wall part 151 formed in a rectangular frame shape along the side surface part 113 so that the outer peripheral surface thereof is disposed on substantially the same plane as the side surface part 113 of the container body 110. An inner peripheral side of the wall part 151 is an opening penetrating vertically, and a protruding portion corresponding to the concavity 112*a* of the bottom surface part 112 is accommodated in the opening. The height of the lower cover 150 also is greater than the protrusion amount of the protrusion corresponding to the concavity 112*a*. Therefore, when the reagent container 200 is installed on a flat installation surface, the bottom cover part 150 holds the bottom surface part 112 of the container body 110 in a state separated from the installation surface.

The engagement structure between the lower cover 150 and the container body 110 is the same as the connection structure between the upper cover 140 and the container body 110. That is, the inner peripheral surface of the upper portion of the wall part 151 is formed with a convexity 151*a* at the front end portion thereof similar to the engaging rib 144*a* of the upper cover 140.

As shown in FIG. 18, the container body 110 has an engaging part 115 for engaging with the lower cover 150 at a connecting portion between the bottom surface part 112 and the side surface part 113. Here, since the connecting portion between the bottom surface part 112 and the side surface part 113 of the container body 110 corresponds to the corner portion of the lower portion of the container body 110, it is possible to have high rigidity and scarcely bend and deform. Therefore, by disposing the engaging part 115 in a connecting portion which is scarcely bent and deformed, it is possible to make it difficult for the lower cover 150 to come off. The engaging part 115 of the bottom part 112 is bent so as to fit inside the lower cover 150, and a concavity 115*a* is provided into which the protrusion 151*a* of the upper end portion of the lower cover 150 fits.

In this way the lower cover 150 and the engaging part 115 have a snap-fit structure in which the convexity 151*a* at the tip is fitted into the concavity 115*a* of the engaging part 115 by elastic deformation of the lower cover 150. The engaging part 115 is provided circumferentially around the entire circumference of the bottom surface part 112, and the lower cover 150 and the engaging part 115 are engaged over substantially the entire circumference of the bottom surface part 112.

Other Structural Examples of Reagent Container

FIGS. 23 to 28 show other configuration examples of the reagent container. In the structural example of FIG. 23, the reagent container 300 includes a plurality of container bodies each having an upper surface part, a bottom surface part, and a side surface part. Although three or more container bodies may be used, the reagent container 300 includes two container bodies 201 and 202 in FIG. 23. The two container bodies 201 and 202 are adjacent to each other and formed so as to have a wedge shape in which the width decreases toward the front end part 205 of the reagent container 300 as a whole.

The container bodies 201 and 202 may have the same shape or may have different shapes. In the structural example of FIGS. 23 and 24, the container bodies 201 and 202 have mutually different shapes. As shown in FIG. 25, in the container body 201, the upper surface part 211 and the bottom surface part 212 have a wedge-like shape extending in a predetermined direction and having a width decreasing toward the distal end part 205. The distal end part 205 is formed in a curved shape that is rounded in a substantially arc shape. The side surface part 213 is formed to be substantially orthogonal to the upper surface part 211 and the bottom surface part 212, and the distal end part 205 is formed in a curved surface shape. The side surface part 213 adjacent to the container body 202 has a width W1.

The container body 201 accommodates the R3 reagent used in the sample measuring apparatus 500. The R3 reagent contains a labeling substance that binds to the target substance by utilizing an antigen-antibody reaction. The label contained in the labeling substance, for example, may be an enzyme, a fluorescent substance, a radioactive isotope and the like.

Figure 23:
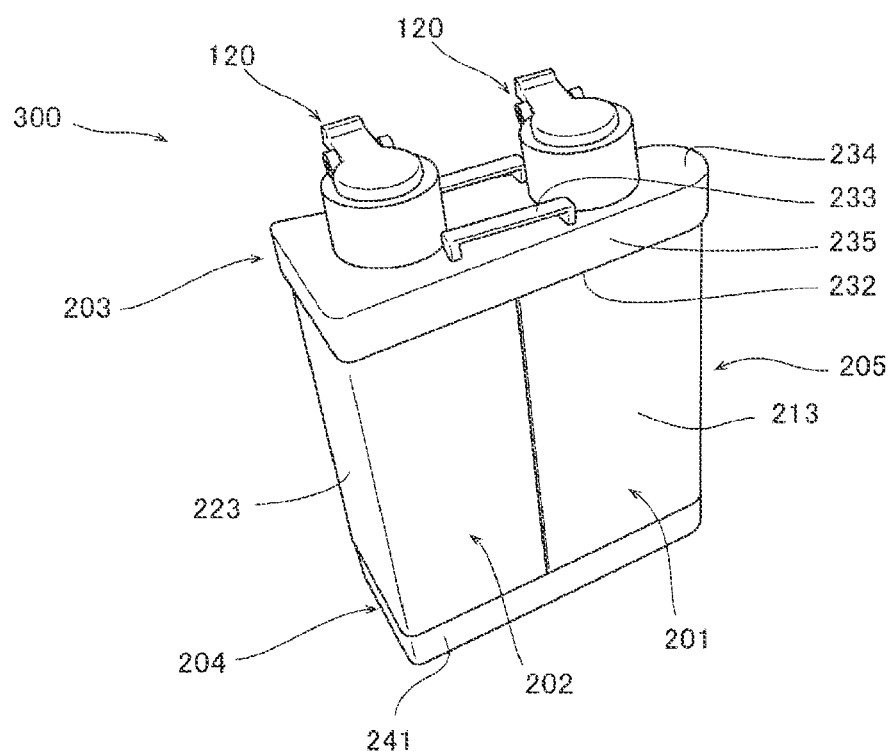
FIG. 23 is a perspective view showing a structural example of a reagent container having a plurality of container main bodies.
Figure 26:
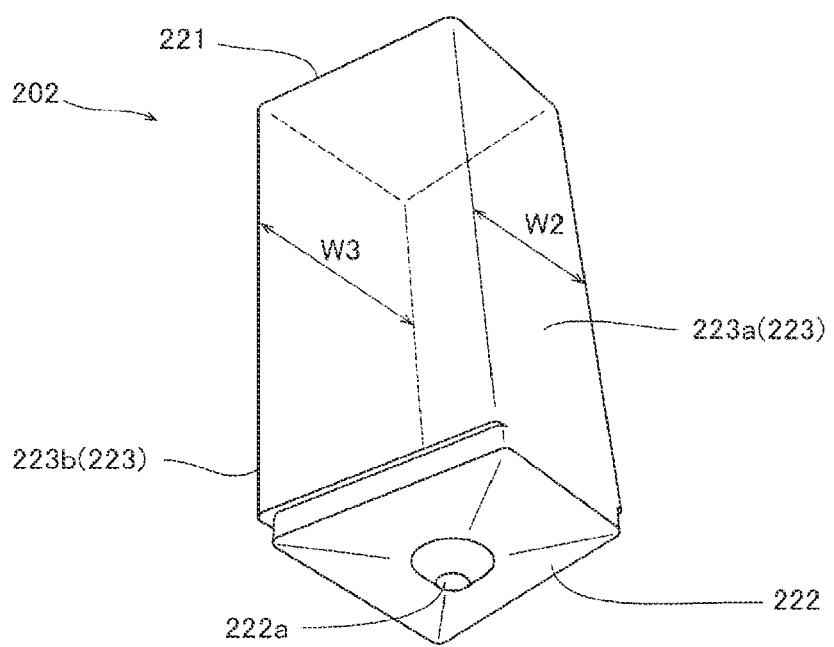
FIG. 26 is a perspective view showing the second container body in FIG. 23.

As shown in FIG. 26, in the container body 202, the upper surface part 221, and the bottom surface part 222 have a substantially trapezoidal shape. The side surface part 223 is substantially orthogonal to the upper surface part 221 and the bottom surface part 222. The width W2 of the side surface part 223*a* on the side adjacent to the container body 201 is less than the width W3 of the side surface part 223*b* on the side opposite to the side surface part 223*a*. The width W2 of the side surface part 223*a* is substantially equal to the width W1 of the adjacent side surface part 213 of the container main body 201. Therefore, when the container bodies 201 and 202 are arranged as shown in FIG. 23, the container body 201 and the container body 202 have a wedge shape in which the width decreases toward the front end part 205 as a whole.

The container body 202 accommodates the R1 reagent used in the sample measuring apparatus 500 described later. The R1 reagent contains a capture substance that binds to a target substance in a sample using an antigen-antibody reaction. The capture substance binds to the target substance in the sample and contains a component for binding with a solid phase carrier. In this way the container bodies 201 and 202 contain different kinds of reagents 101.

The suction tube introducing part of the reagent container 300 is common to the suction tube introducing part 120 of the reagent container 200. That is, the suction tube introducing part 120 having the same structure as the suction tube introducing part 120 of the reagent container 200 can be attached to each container body 201 and 202 of the reagent container 300. Detailed description of the structure of the suction tube introducing part 120 is omitted.

Figure 27:
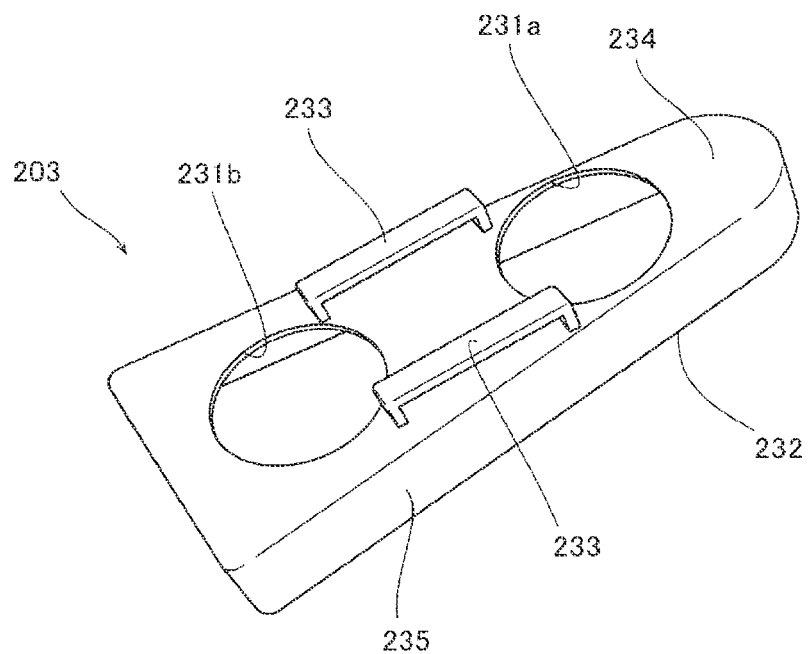
FIG. 27 is a perspective view showing an upper cover of the reagent container shown in FIG. 23.

As shown in FIG. 27, the upper cover 203 has a plurality of cover openings for exposing upper openings (not shown) in the respective container main bodies 201 and 202, and is attachable to a plurality of container bodies 201 and 202. That is, the upper cover 203 includes a cover opening 231*a* through which the guide part 11*b* of the container body 201 passes, and a cover opening 231 through which the guide part 11*b* of the container body 202 passes. In this way it is possible to configure a reagent container 300 of a type that can accommodate plural types of reagents since the plurality of container bodies 201 and 202 can be connected by the upper cover 203. Since the container bodies 201 and 202 can be separately formed, for example, when the container bodies 201 and 202 containing reagents are manufactured in advance, the respective container bodies 201 and 202 can be manufactured by separate manufacturing processes handling different reagents, so that handling of the container bodies 201 and 202 at the time of manufacturing can be facilitated.

The configuration of the upper cover 203 is the same as the structural example shown in FIG. 21, except that it is configured to be attachable to a plurality of container bodies 201, 202. That is, in the structural example of FIG. 27, the upper cover 203 is provided with a pair of gripped parts 233. The upper cover 203 (see FIG. 23) also is disposed between the upper surface parts 211 and 221 and the suction tube introducing part 120. The cover openings 231a and 231b of the upper cover 203 are smaller than the outer shape of the suction tube introducing part 120. That is, each suction tube introducing part 120 also functions as a stopper for preventing the upper cover 203 from coming off.

The upper cover 203 also has a second engaging part 232 for engaging with the container holding unit 520 of the sample measuring apparatus 500. That is, the upper cover 203 has a first part 234 extending along the upper surface parts 211 and 221, and a second part 235 extending along the side surface parts 213 and 223 from the outer peripheral portion of the first part 234 and covering a portion of the side surface parts 213 and 223. The second engaging part 232 is provided in the second part 235. The second engaging part 232 is configured by the lower end surface (see FIG. 24) of the second part 235. Similar to the structural example of FIG. 17, when the reagent container 300 is inserted into the opening from above the container holding unit 520 while the lower cover 204 and the container bodies 201 and 202 pass through the opening, the second engaging part 232 which is the lower end surface of the second part 235 abuts on the container holding portion 520 and is caught. In this way, the reagent container 300 is held such that the second engaging part 232 engages with the container holding unit 520 and is suspended.

Although not shown, the engagement structure between the upper cover 203 and the container bodies 201 and 202 is the same as the above-described engagement structure between the upper cover 140 and the container body 110. The first part 234 has an engaging rib 144a (see FIG. 18) at which the third engaging part 114 (see FIG. 18) is fitted, at a position distant from the second part 235 on the inner peripheral side. The engaging rib 144a and the third engaging part 114 are engaged by a snap fit structure.

Figure 24:
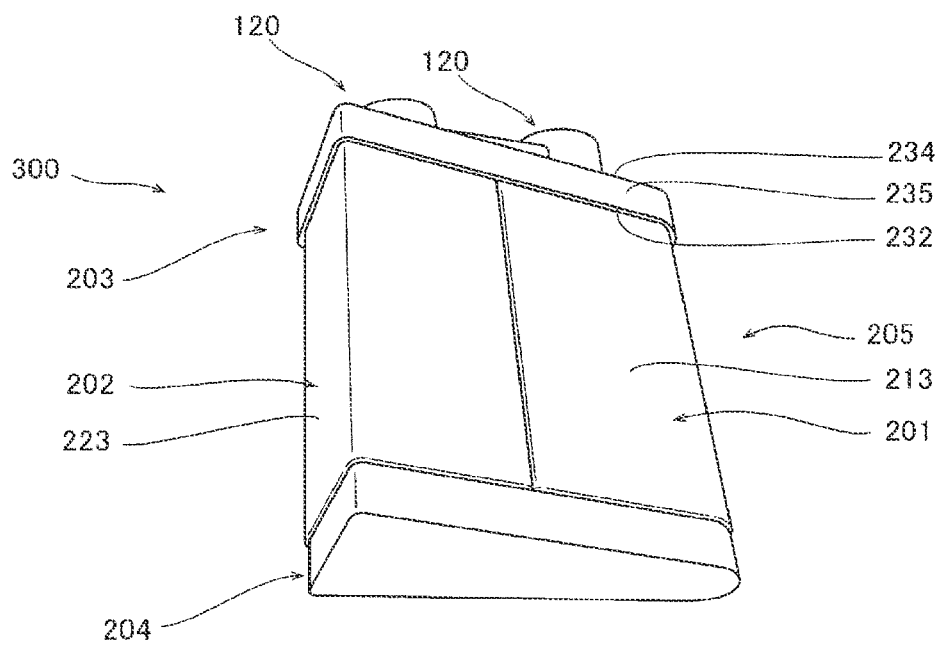
FIG. 24 is a perspective view of the reagent container shown in FIG. 23 as viewed from the bottom surface side.
Figure 25:
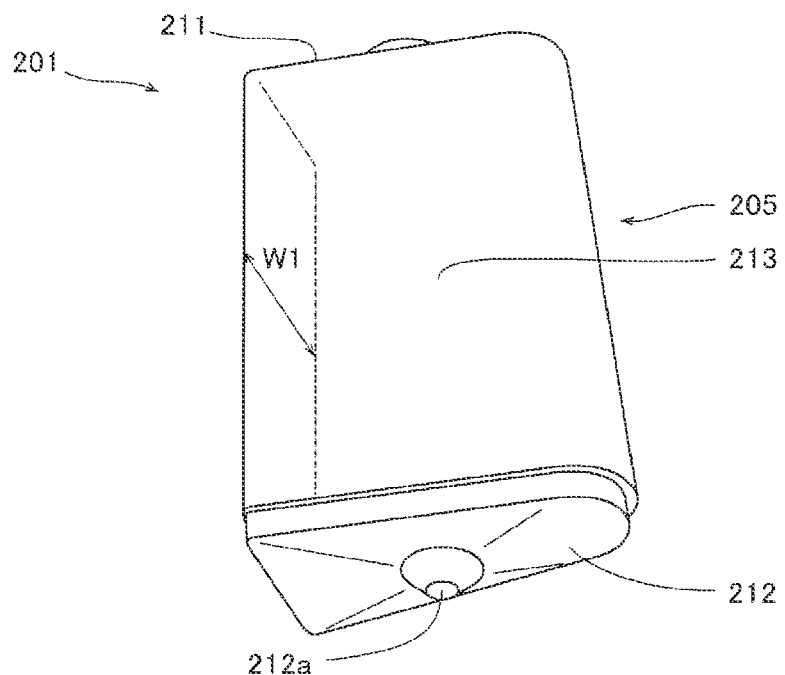
FIG. 25 is a perspective view showing the first container body in FIG. 23.

In the structural examples of FIG. 23 and FIG. 24, the lower cover 204 is configured so that a plurality of container bodies 201 and 202 can be attached together. In this way it is possible to configure a reagent container 300 of a type that can accommodate plural kinds of reagents since the plurality of container bodies 201 and 202 can be connected by the lower cover 204. Since the container bodies 201 and 202 can be separately formed, for example, when manufacturing the container bodies 201 and 202 in which the reagents are stored in advance, it is possible to manufacture the respective container bodies 201 and 202 by separate manufacturing processes handling different reagents, so that handling of the container bodies 201 and 202 at the time of manufacturing can be facilitated.

Figure 28:
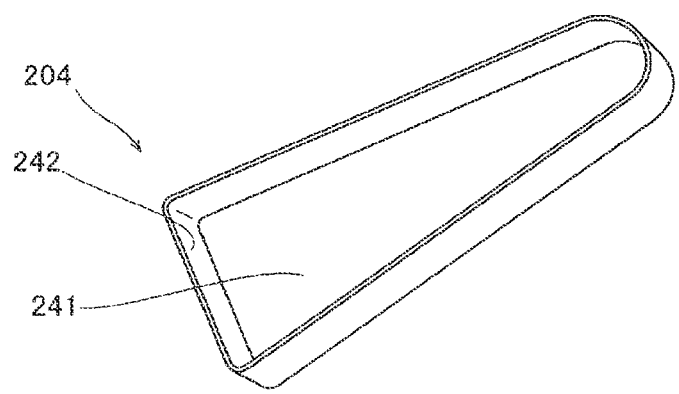
FIG. 28 is a perspective view showing the lower cover of the reagent container shown in FIG. 23.

As shown in FIG. 28, the lower cover 204 has a flat bottom part 241 and has an annular wall part 242 formed so as to extend along the side surface parts 213 and 223 of the container bodies 201 and 202. The wall part 242 and the bottom surface parts 212 and 222 of the container bodies 201 and 202 are engaged by a snap fit structure. In the inner space of the lower cover 204 defined by the bottom part 241 and the wall part 242, protrusions corresponding to the concavities 212a and 222a are provided in the bottom surface parts 212 and 222 of the container bodies 201 and 202.

Modification of Lower Cover

Although the example of the lower cover 204 configured so that the plurality of container bodies 201 and 202 can be attached simultaneously is shown In FIG. 28, the lower cover also may be individually provided to the plurality of container bodies 201 and 202.

Figure 29:
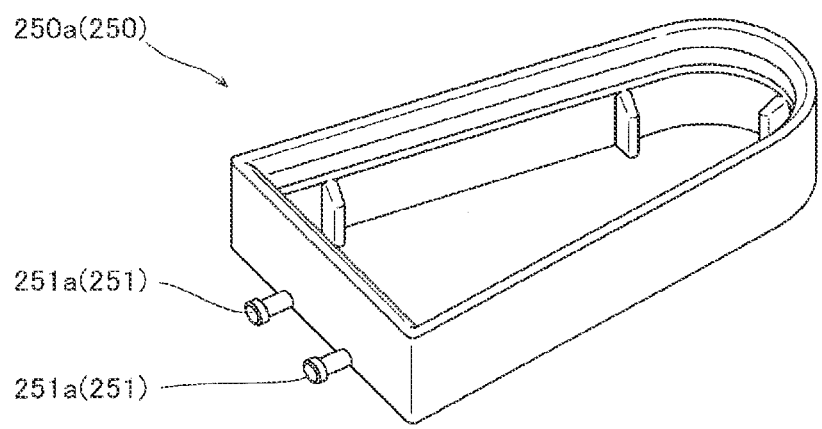
FIG. 29 is a perspective view showing a structural example of the lower cover for the first container body shown in FIG. 25.
Figure 30:
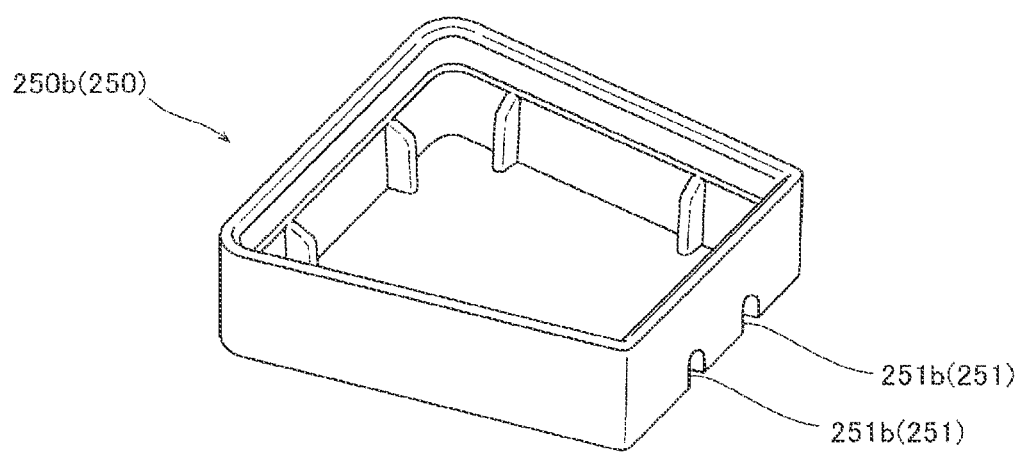
FIG. 30 is a perspective view showing a structural example of the lower cover for the second container body shown in FIG. 26.

In FIGS. 29 and 30, the lower cover 250 is individually provided to the plurality of container main bodies 201 and 202, and has a fourth engaging part 251 for connecting the lower covers 250 to each other. In this way it is possible to configure a reagent container 100 of a type capable of accommodating plural kinds of reagents since the plurality of container main bodies 201 and 202 can be connected by connecting the fourth engaging part 251 of the lower cover 250. Since the lower cover 250 is individually provided in the plurality of container bodies 201 and 202, it also is possible to easily stand upright even in the state of the single container bodies 201 and 202 before the connection.

That is, FIG. 29 shows the lower cover 250a mounted on the container body 201 (see FIG. 25), and FIG. 30 shows the lower cover 250b attached to the container body 202 (see FIG. 26). The lower cover 250a is provided with a pair of protruding fourth engaging parts 251a. The lower cover 250b is provided with a pair of notched fourth engaging parts 251b corresponding to the pair of fourth engaging parts 251a. The lower cover 250a and the lower cover 250b are coupled by fitting the pair of fourth engaging parts 251a into the pair of fourth engaging parts 251b, respectively.

In FIGS. 29 and 30, the container bodies 201 and 202 can stand independently on the installation surface when the lower covers 250a and 250b are attached, respectively.

Specific Structural Example of Sample Measuring Apparatus

Next, a specific structural example of the sample measuring apparatus 500 will be described in detail with reference to FIG. 31 to FIG. 36. In the examples of FIGS. 31 to 36, the sample measuring apparatus 500 is an immunoassay device that detects a test substance in a sample using an antigen-antibody reaction.

The sample measuring apparatus 500 includes a sample dispensing unit 510, a container holding unit 520, a reagent dispensing unit 530, and a detection unit 540. In the structural example of FIG. 31, the sample measuring apparatus 500 also includes a housing 505, a sample transport unit 550, a reaction container supply unit 560, a reaction container transport unit 570, a reaction unit 580, a BF separation unit 590, and a container transfer unit 610. The sample measuring apparatus 500 also includes a control unit 400 for controlling the above-described respective units.

The housing 505 has a box-like shape capable of accommodating each part of the sample measuring apparatus 500 therein. The housing 505 may be configured to accommodate each part of the sample measuring apparatus 500 on a single level or may have a hierarchical structure in which a plurality of levels are provided in the vertical direction and each part of the sample measuring apparatus 500 may be allocated and arranged to the respective levels.

The sample transport unit 550 is configured to transport the sample collected from the subject to the suction position by the sample dispensing unit 510. The sample transport unit 550 can transport a rack in which a plurality of test tubes containing samples are installed to a predetermined sample suction position.

The sample dispensing unit 510 suctions the sample transported by the sample transport unit 550 and dispenses the suctioned sample into a reaction container 501. The sample dispensing unit 510 includes a pipette connected to a fluid circuit for performing suction and discharge, and a moving mechanism for moving the pipette. The sample dispensing unit 510 attaches a dispensing tip set in a chip supply unit (not shown) to the tip of a pipette, and suctions a predetermined amount of the sample in the transported test tube into the dispensing tip. The sample dispensing unit 510 dispenses the suctioned sample into the reaction container 501 disposed at a predetermined sample dispensing position. After dispensing, the sample dispensing unit 510 removes and discards the dispensing tip from the tip of the pipette.

The reaction container supply unit 560 can store a plurality of reaction containers 501. The reaction container supply unit 560 can supply the reaction containers 501 one by one to the reaction container transfer unit 570 at a predetermined reaction container supply position.

The reaction container transfer unit 570 can transfer the reaction container 501. The reaction container transfer unit 570 acquires the reaction container 501 from the reaction container supply position and transports the reaction container 501 to the processing positions of the sample dispensing unit 510, the reagent dispensing unit 530, the reaction unit 580, the detection unit 540, and the like. The reaction container transfer unit 570 is configured by, for example, a holding unit having a catcher for holding the reaction container 501 or an installation hole for the reaction container 501, and a moving mechanism for moving the catcher or holding unit. The moving mechanism moves in one or more axial directions, for example, by one or a plurality of linearly movable linear motion mechanisms. The moving mechanism may include an arm mechanism that horizontally rotates around the rotation axis, and an articulated robot mechanism. One or a plurality of reaction vessel transfer units 570 are provided.

The reaction unit 580 includes a heater and a temperature sensor, and holds the reaction container 501 to heat the sample contained in the reaction container 501 for reaction. The sample and the reagent contained in the reaction container 501 are reacted by heating. One or more reaction units 580 are provided in the housing 505. The reaction unit 580 may be fixedly provided in the housing 505, or may be provided movably in the housing 505. When the reaction unit 580 is configured to be movable, the reaction unit 580 may also function as a part of the reaction vessel transfer unit 570.

Figure 31:
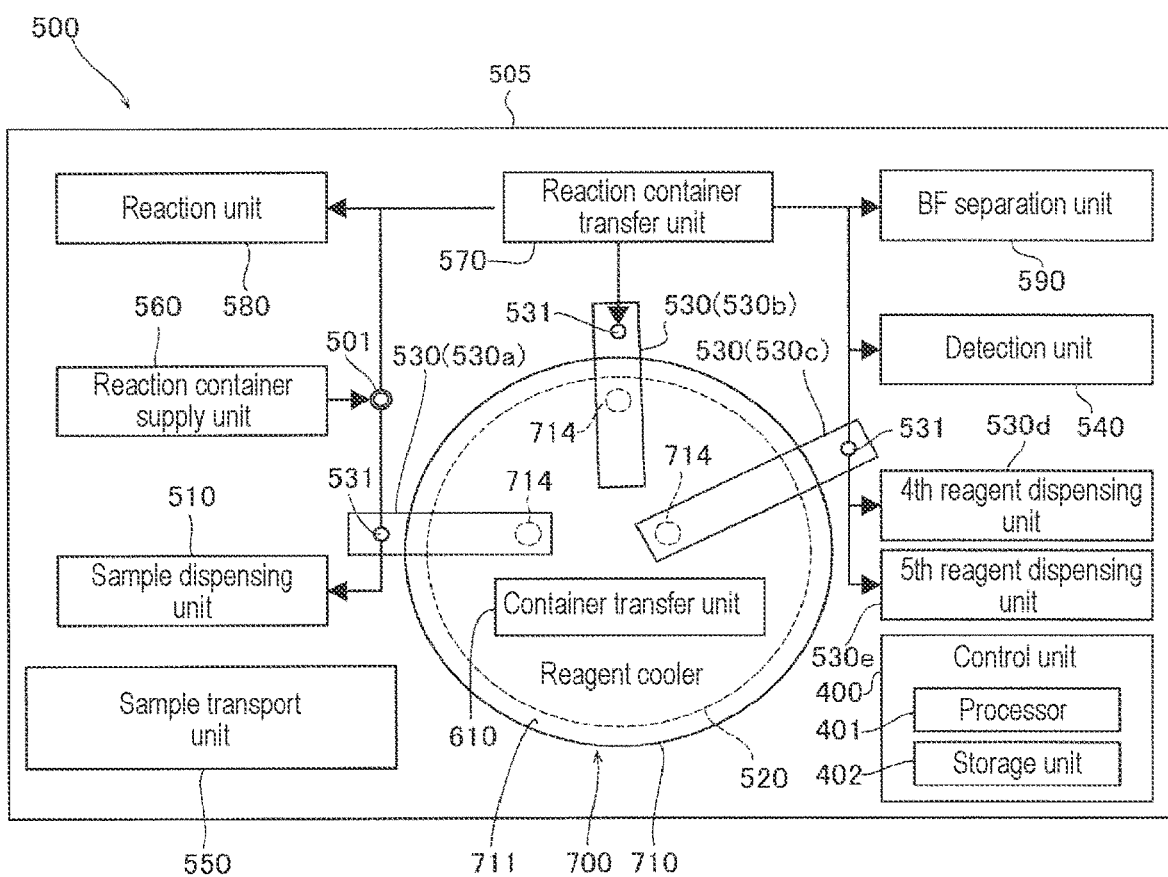
FIG. 31 is a schematic plan view showing a structural example of a sample measuring apparatus.
Figure 32:
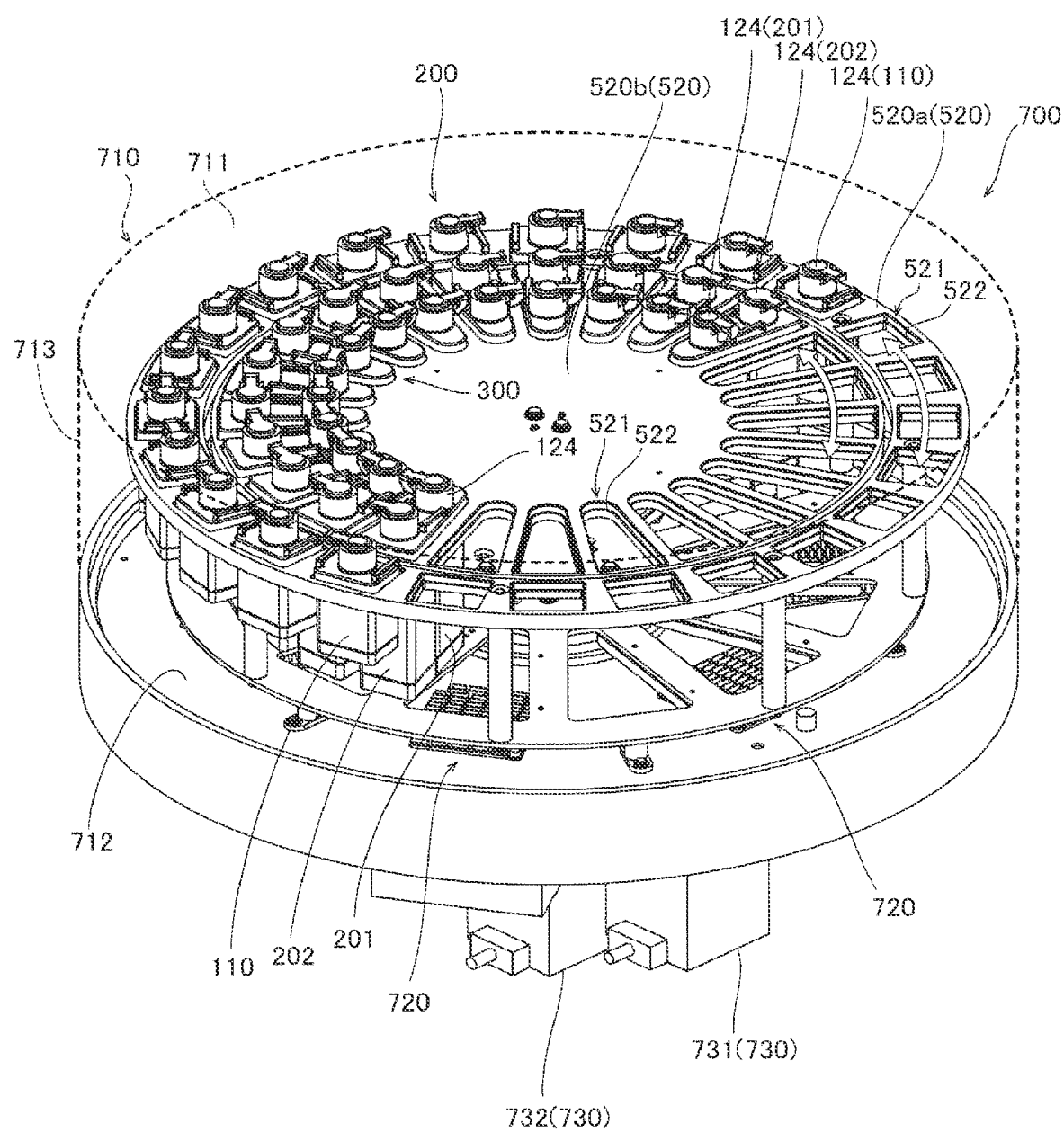
FIG. 32 is a schematic perspective view showing a structural example of a reagent cooler.

In the structural example of FIG. 31, the sample measurement apparatus 500 includes a box-like reagent cooler 700 that houses the container holding unit 520. As shown in FIG. 32, the container holding unit 520 is provided in a case 710 having a heat insulating function of the reagent cooler 700. The reagent cooler 700 has a container holding unit 520 and a cooling mechanism 720 in a case 710 and keeps the reagents in the reagent containers 200 and 300 set in the container holding unit 520 at a constant temperature suitable for storage.

The case 710 has an internal space defined by a circular case upper surface 711 and a case bottom surface 712 and a cylindrical case side surface 713. The case upper surface 711, the case bottom surface 712, and the case side surface 713 include a heat insulating material to insulate the inside and the outside of the case 710. In this way the reagent containers 200 and 300 can be stored cold.

The reagent cooler 700 has a case upper surface 711 that has a hole 714 (see FIG. 31) through which the pressing part 600 and the reagent dispensing part 530 enter the reagent cooler 700. In this way the pressing part 600 and the reagent dispensing unit 530 can be arranged outside the reagent cooler 700. Therefore, it is possible to improve the cooling efficiency by minimizing the volume of the reagent cooler 700.

The container holding unit 520 is formed so as to hold the plurality of reagent containers 200 and 300 in the circumferential direction. In the structural example of FIG. 32, the container holding unit 520 includes a first annular reagent holding part 520a on the outer peripheral side, and a second circular reagent holding part 520b on the inner peripheral side. The first reagent holding part 520a and the second reagent holding part 520b are disposed concentrically and can rotate independently of each other. The first reagent holding part 520a on the outer peripheral side can hold a plurality of reagent containers 200. The second reagent holding part 520b on the inner peripheral side can hold a plurality of reagent containers 300.

As shown in FIG. 32, the first reagent holding part 520a and the second reagent holding part 520b each have a holding hole 521 for inserting the reagent container 200 and the reagent container 300. A receiving surface 522 for supporting the second engaging parts 142 and 232 from the lower side is provided on the inner peripheral edge portion of the holding hole 521. In this way the first reagent holding part 520a and the second reagent holding part 520b respectively engage the second engaging parts 142 and 232 on the receiving surface 522 as shown in FIG. 17, to hold the reagent container 200 and the reagent container 300. The first reagent holding part 520a and the second reagent holding part 520b are provided with a container transfer unit 610 (see FIG. 31) for holding the gripped parts 143 and 233 by the engagement claw 611 (see FIG. 21) to automatically set the reagent container 200 and the reagent container 300.

In the structural example of FIG. 32, the plurality of reagent containers 200 held in the first reagent holder 520a are arranged side by side on the same circumference. The plurality of reagent containers 300 held by the second reagent holding part 520b are arranged side by side on the same circumference. The container bodies 201 and 202 of the plurality of reagent containers 300 are arranged side by side on different circumferences, respectively. In the container holding unit 520, the container body 110, the container body 201, and the container body 202 are arranged at different positions in the radial direction. That is, the containers are arranged in the order of the container body 201, the container body 202, and the container body 110 in this order from the radially inner side. Therefore, as shown in FIG. 31, on the case upper surface 711 of the case 710, the holes 714 corresponding to the suction positions of the respective reagents R1 to R3 are formed in predetermined circumferential positions and are provided at three positions so as to overlap at specific positions on the circumference.

The sample measuring apparatus 500 includes a holding unit drive unit 730 for moving the container holding unit 520. The holding unit drive unit 730 is a driving source such as a stepping motor or a servo motor, for example. Specifically, as shown in FIG. 32, a first driving unit 731 for rotationally driving the first reagent holding part 520a on the outer peripheral side in the circumferential direction and a second reagent holding part 520*b* on the inner peripheral side are arranged in the circumferential direction, and a second driving unit 732 for rotationally driving the reagent cold cooler 700 are provided at a lower position outside the case bottom surface 712 of the reagent cooler 700. The first driving unit 731 is connected to the first reagent holding unit 520*a* via a transmission mechanism (not shown). The second driving unit 732 is connected to the second reagent holding unit 520*b* via a rotating shaft (not shown) connected vertically and connected to the center of the second reagent holding unit 520*b*. The first driving unit 731 and the second driving unit 732 independently rotate and drive the first reagent holding unit 520*a* on the outer peripheral side and the second reagent holding unit 520*b* on the inner peripheral side.

Figure 33:
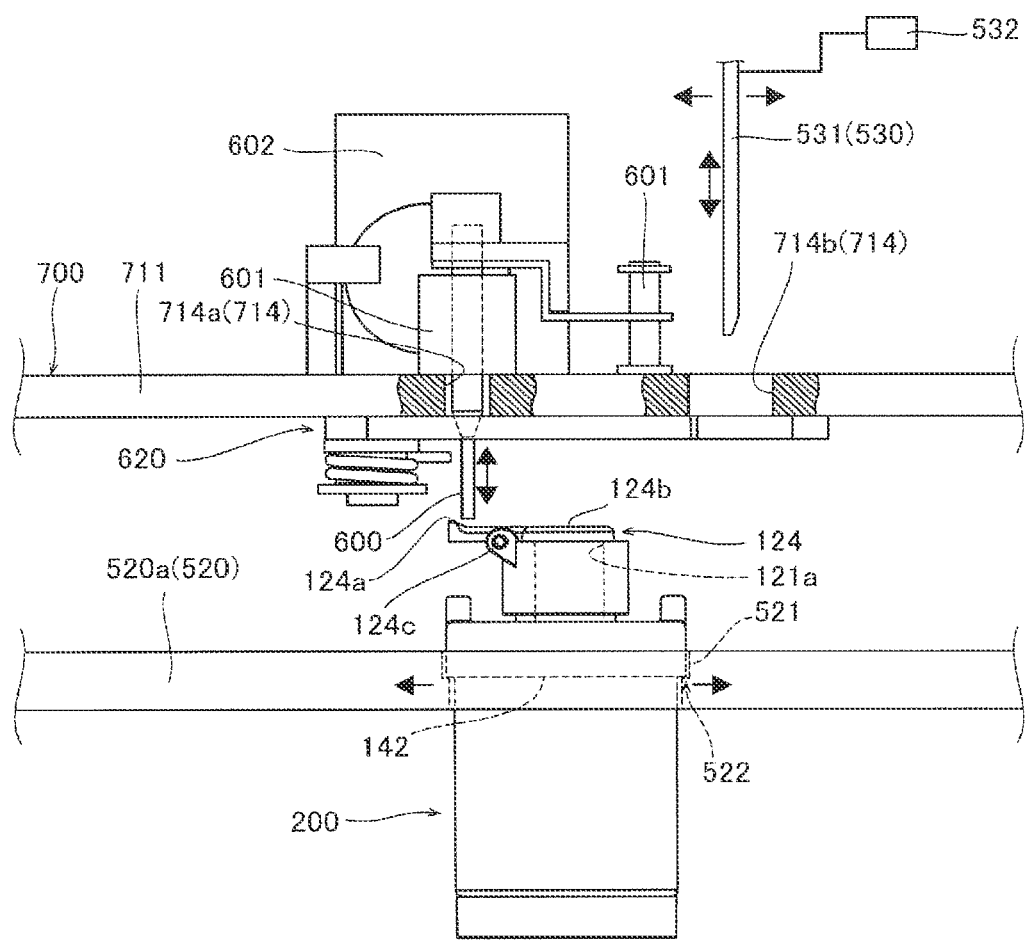
FIG. 33 is a schematic side view showing the structure of the periphery of the pressing part inside the reagent cooler.

FIG. 33 is a schematic side view of the vicinity of the case upper surface 711 of the reagent cooler 700; in FIG. 33, the lower side of the case upper surface 711 is the internal region of the reagent cooler 700. In the structural example of FIG. 33, the pressing part 600 and the reagent dispensing unit 530 are installed on the case upper surface 711 outside the reagent cooler 700.

Three holes 714 (see FIG. 31) corresponding to the R1 reagent to the R3 reagent respectively have a first hole 714*a* for passing through the pressing part 600 and a second hole 714*b* for passing through the reagent dispensing unit 530. The pressing part 600 and the reagent dispensing unit 530 pass through the corresponding first hole 714*a* and second hole 714*b* from above the case upper surface 711, respectively, and access the reagent container 200 or 300 held in the container holding unit 520.

The pressing part 600 has a columnar shape extending in the vertical direction. The pressing part 600 is guided so as to linearly move vertically by the guide part 601. The pressing part 600 is vertically moved by a pressing part drive unit 602 installed on the case upper surface 711 of the reagent cooler 700. The configuration of the pressing part drive unit 602 is not particularly limited. For example, the pressing part 600 and the pressing part drive unit 602 may be integrated by a linear motion mechanism such as an air cylinder, a solenoid, a linear motor, or the like. In the case of an air cylinder, the rod portion serves as the pressing part 600, and the cylinder portion that supplies the air pressure becomes the pressing part drive unit 602. The pressing part drive unit 602 may be configured by a motor that rotates the output shaft. In this case, the pressing part drive unit 602 and the pressing part 600 are connected via a converting mechanism for converting the rotation of the output shaft into linear motion in the vertical direction. The conversion mechanism is, for example, a cam mechanism, a rack and pinion mechanism, a belt-pulley mechanism, or the like.

Note that in the structural example of FIG. 33 the container holding unit 520 moves in the horizontal direction such that the first region 124*a* and the second region 124*b* of the openable lid 124 are disposed below the pressing part 600. The pressing part 600 is provided so as not to be horizontally movable on the case upper surface 711. That is, at the time of suction of the reagent, the holding unit drive unit 730 rotationally moves the container holding unit 520 in the circumferential direction, and disposes the respective reagent containers 200, 300 below the pressing unit 600.

Other than when the reagent is being suctioned, the first drive unit 731 intermittently rotates the first reagent holding part 520*a* intermittently by a predetermined angle at a constant time interval in the circumferential direction. The R2 reagent in the reagent container 200 held in the first reagent holding part 520*a* is stirred (see FIG. 17) from the repetition of stop and horizontal movement caused by intermittent rotation. The oscillation direction at the time of stirring of the reagent container 200 is the tangential direction in the circumferential direction of the first reagent holding part 520*a*, and the longitudinal direction (see FIG. 20) of the bottom surface part 112 is the tangential direction in the circumferential direction of the container holding unit 520 so that the internal reagent is efficiently agitated.

On the other hand, stirring is unnecessary for R1 reagent and R3 reagent. Therefore, except when the reagent is suctioned, the second drive unit 732 stops the second reagent holding part 520*b* without intermittently driving.

In the structural example of FIG. 33, the sample measuring apparatus 500 includes a shutter mechanism 620 for opening and closing the hole 714 of the reagent cooler 700. One shutter mechanism 620 is provided for each of the three holes 714 (see FIG. 31), and the first hole 714*a* and the second hole 714*b* can be opened and closed. Since the airtightness of the reagent cooler 700 is improved when the reagent is not suctioned by the shutter mechanism 620, it is possible to suppress temperature change inside the reagent cooler 700 and improve the cooling efficiency.

The reagent dispensing unit 530 suctions the reagent in the reagent containers 200 and 300 in the open state of the openable lid 124, and dispenses the suctioned reagent into the reaction container 501. The reagent dispensing unit 530 can move the suction tube 531 for suctioning and discharging the reagent in the horizontal direction between the second hole 714*b* and a predetermined reagent dispensing position (see FIG. 31). The reagent dispensing unit 530 also can move the suction tube 531 in the vertical direction, pass through the second hole 714*b* from above the second hole 714*b*, and enter the reagent containers 200 and 300, and the suction tube 531 can be retracted to a position above the second hole 714*b*. The suction tube 531 is connected to a fluid circuit (not shown), suctions a predetermined amount of reagent from the reagent containers 200 and 300 of the container holding unit 520, and dispenses the reagent to the reaction container 501 transferred to the reagent dispensing position.

The suction tube 531 is connected to the liquid level sensor 532. The liquid level sensor 532 is connected to a control unit 400 (see FIG. 31), and when suctioning the reagent from the reagent containers 200, 300, and detects the liquid surface 30 based on the change in electrostatic capacitance due to the contact between the liquid surface of the reagent and the suction tube 531, and outputs the detection result to the control unit 400. The control unit 400 monitors the movement amount of the suction tube 531 in the vertical direction by monitoring the operation amount of the reagent dispensing unit 530.

The control unit 400 controls the reagent dispensing unit 530 so as to suction the reagent at a position where the suction tube 531 is lowered by a predetermined amount from the detected liquid level position. In this way, in the method of suctioning a reagent according to the present embodiment, the liquid surface 30 is detected by the suction tube 531 that has entered the reagent containers 200 and 300, and the suctioning of the reagent 101 by the suction tube 531 is detected by the detected liquid surface 30 at a lower position moved by a predetermined amount. In this way the region in which the suction tube 531 contacts the reagent 101 can be limited to only the front end portion compared to when the suction tube 531 is advanced to the vicinity of the bottom surface part of the reagent containers 200, 300. Therefore, it is easy to clean the suction tub 531. Even when the liquid level 30 is detected by the suction tube 531 for suctioning the reagent, formation of liquid droplets or a liquid film above the liquid surface can be suppressed, so erroneous detection of the liquid surface 30 is avoided.

Three reagent dispensing units 530 are provided, for example, for dispensing each of the R1 reagent to the R3 reagents. A plurality of kinds of reagents may be dispensed by one reagent dispensing unit 530. In the structural example of FIG. 31, the reagent dispensing unit 530 includes a first reagent dispensing unit 530a for dispensing the R1 reagent in the reagent container 300, a second reagent dispensing unit 530b for dispensing the R2 reagent in the reagent container 200, and a third reagent dispensing unit 530c for dispensing the R3 reagent in the reagent container 300. The reagent dispensing unit 530 also includes a fourth reagent dispensing unit 530d for dispensing the R4 reagent, and a fifth reagent dispensing unit 530e for dispensing the R5 reagent.

The first reagent dispensing unit 530a can move the suction tube 531 between the innermost hole 714 for suctioning the R1 reagent and the predetermined R1 reagent dispensing position. The second reagent dispensing unit 530b can move the suction tube 531 between the outermost hole 714 for suctioning the R2 reagent and the predetermined R2 reagent dispensing position. The third reagent dispensing unit 530c can move the suction tube 531 between the hole 714 in the radial direction intermediate position for suctioning the R3 reagent and the predetermined R3 reagent dispensing position. The fourth reagent dispensing unit 530d and the fifth reagent dispensing unit 530e are provided at positions separated from the reagent cooler 700. The fourth reagent dispensing unit 530d and the fifth reagent dispensing unit 530e are connected to reagent containers (not shown) containing the R4 reagent and the R5 reagent, respectively, via a liquid transfer tube, and the reaction container transfer unit 570, so that the reagent can be discharged into the reaction container 501.

Returning to FIG. 31, the BF separation unit 590 has a function of executing a BF separation process for separating a liquid phase and a solid phase from the reaction container 501. The BF separation unit 590 includes one or more processing ports capable of accepting reaction containers. A magnetic force source 592 (see FIG. 35) for magnetically collecting the magnetic particles contained in the R2 reagent and a cleaning unit 591 (see FIG. 35) for suctioning the liquid phase and supplying the cleaning liquid are provided at a processing port. The BF separation unit 590 suctions the liquid phase in the reaction container 501 and supplies the washing liquid by the cleaning unit 591 in a state where the magnetic particles on which immunocomplexes are formed as described below are collected. The cleaning unit 591 includes a liquid phase suction passage and a cleaning liquid discharge passage, and is connected to a fluid circuit (not shown). In this way unnecessary components contained in the liquid phase can be separated and removed from the conjugate of the immunocomplex and magnetic particles.

The detection unit 540 includes a photodetector 541 (see FIG. 35) such as a photomultiplier tube. The detection unit 540 measures the amount of antigen contained in the sample by acquiring the light generated during the reaction process between the labeled antibody that binds to the antigen of the sample subjected to various treatments, and the luminescent substrate by the photodetector 541.

The control unit 400 includes a processor 401 such as a CPU and a storage unit 402 such as a ROM, a RAM, and a hard disk. The processor 401 functions as a control unit of the sample measuring apparatus 500 by executing a control program stored in the storage unit 402. The control unit 400 controls the operation of each unit of the above-described sample measuring apparatus 500.

Lid Opening and Closing Operation by the Pressing Part

Figure 34:
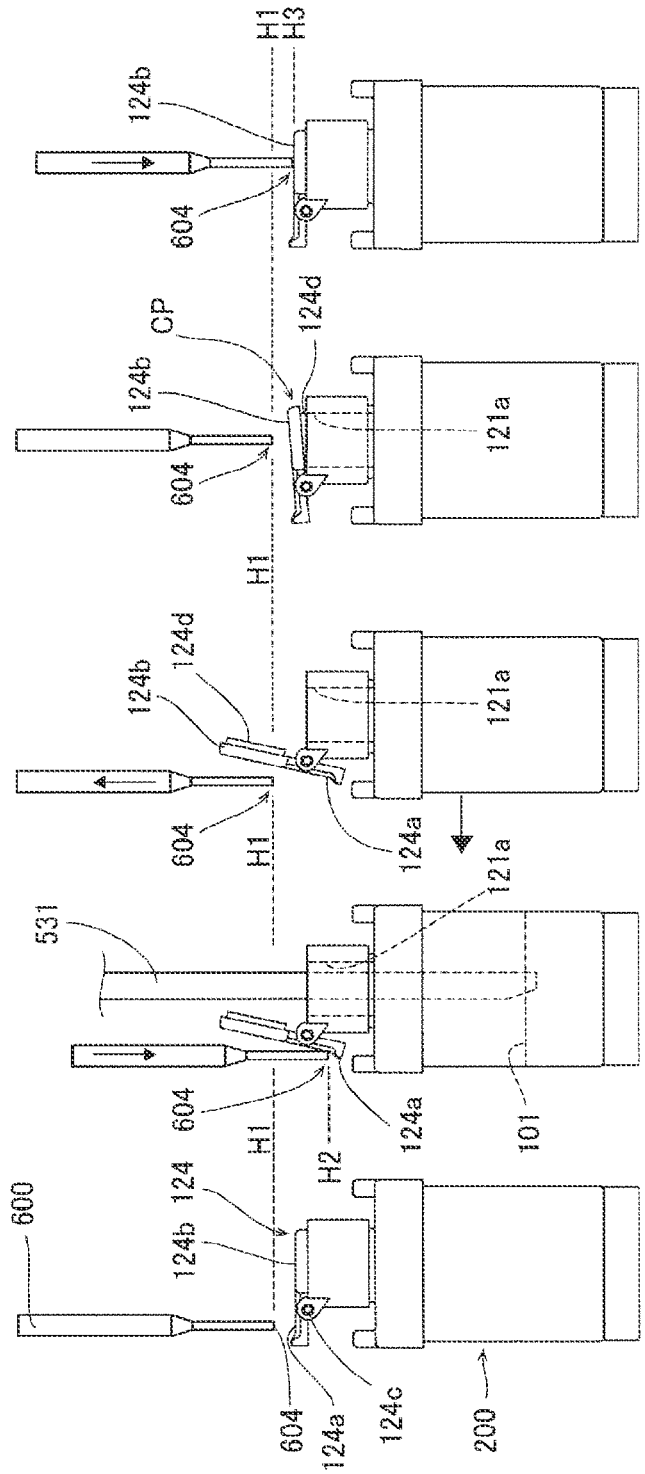
FIG. 34A through FIG. 34E are views showing the flow of opening and closing the lid and the suction operation of the reagent according to the structural example of FIG. 33.

FIG. 34 shows the flow of the opening and closing operation of the openable lid 124 by the pressing part 600. With respect to the opening and closing of the openable lid 124, the height position of the lower end part 604 of the pressing part 600 is taken as a reference. Here, an example in which the R2 reagent in the reagent container 200 is suctioned is shown, but the same applies to the case of suctioning the reagent in the reagent container 300.

As shown in FIG. 34A, when the suction of the reagent is not performed, the pressing part 600 stands by so that the lower end part 604 is arranged at the predetermined raised position H1. The raised position H1 is a predetermined position above the openable lid 124 in the closed state.

In the case of performing the suction of the reagent, as shown in FIG. 34B, the container holding unit 520 is rotationally driven in the circumferential direction by the holding unit drive unit 730, and the reagent container 200 accommodating the reagent to be suctioned is moved horizontally below the pressing part 600. More precisely, the holding unit drive unit 730 positions the first region 124a of the openable lid 124 of the reagent container 200 just under the pressing part 600.

When the reagent container 200 is disposed, the pressing part 600 moves downward and presses the first region 124a of the openable lid 124 downward. When the pressing part 600 presses the first region 124a downwardly to the descending position H2, the second region 124b pivots upward and opens the openable lid 124. In this way the upper opening 121a of the reagent container 200 is opened. The openable lid 124 rotates by an angle less than, for example, 90 degrees in the vicinity of 90 degrees.

As shown in FIG. 34B, when the openable lid 124 is opened and the upper opening 121a of the reagent container 200 is opened, the reagent dispensing unit 530 descends the suction tube 531 from above the reagent cooler 700, enters the interior of the reagent cooler 700 via the second hole 714b and enters the interior of the reagent container 200 via the upper opening 121a. Inside the reagent container 200, the liquid surface 30 of the reagent 101 is detected by the liquid level sensor 532. The reagent dispensing unit 530 suctions the reagent 101 in the reagent container 200 by the suction tube 531 at a lower position moved by a predetermined amount from the liquid level detection position. When a predetermined amount of reagent suction is completed, the reagent dispensing unit 530 moves the suction tube 531 upward, passes through the upper opening 121a and the second hole section 714b, and retracts the suction tube 531 from the inside of the reagent cooler 700. The lower end part 604 of the pressing part 600 is positioned at the descending position H2 until the reagent suction is completed.

As shown in FIG. 34C, the pressing part 600 presses the first region 124a of the openable lid 124 in the closed state downward to open the openable lid 124, and then moves upward beyond the hinge 124c, and moves upward to an ascending position H1 in contact with the second region 124b in the open state. That is, at the ascending position H1, the lower end part 604 of the pressing part 600 is disposed between the hinge 124c and the distal end part of the second region 124b in the open state. The container holding unit 520 is rotationally driven in the circumferential direction by the holding unit drive unit 730, and horizontally moves so that the upper opening 121a is positioned below the pressing part 600. The openable lid 124 in the opened state rotates toward the upper opening 121a by its own weight of the second area 124b, or the pressing part 600 and the second region 124b comes into contact in the horizontal direction as the horizontal movement to rotate toward the upper opening 121a. By setting the ascending position H1 to a position in contact with the second region 124b in the open state, it is possible to reliably bring the pressing part 600 into contact with the second region 124b.

As shown in FIG. 34D, when the openable lid 124 rotates toward the upper opening 121a, the upper opening 121a is naturally closed by the own weight of the second region 124b. However, there are cases where the openable lid 124 is not completely closed only by the weight of the second region 124b. In the example of FIG. 34, since the protrusion 124d contacts the edge portion of the upper opening 121a, the rotation of the openable lid 124 stops at the temporary closing position CP where the openable lid 124 is not completely closed.

As shown in FIG. 34E, the pressing part 600 makes horizontal contact with the second region 124b in the open state at the ascending position H1 to rotate the openable lid 124 to the temporary closing position CP, and pushes the second region 124b downward at the closing position CP. In this way the pressing part 600 rotates the openable lid 124, and hermetically closes the upper opening 121a of the reagent container 200 by the openable lid 124.

The lower end part 604 of the pressing part 600 descends to the cover closing position H3 corresponding to the height position of the upper surface of the second region 124b in the completely closed state so that the protrusion 124d is fitted into the upper opening 121a and the openable lid 124 is closed. The cover closing position H3 is at a height position between the descending position H2 and the ascending position H1. The shutter mechanism 620 is configured to be closed when the pressing part 600 is located at the ascending position H1 and the lid closed position H3, and to be opened when the pressing part 600 is located at the descending position H2. That is, the shutter mechanism 620 is opened only when the pressing part 600 descends to the descending position H2 where the openable lid 124 is opened, and the shutter mechanism 620 can be closed when closing the lid. Therefore, temperature change of the reagent cooler 700 can be effectively suppressed since the time during which the hole 714 of the reagent cooler 700 is opened can be shortened as much as possible.

After the pressing part 600 descends to the cover closing position H3 and presses the second region 124b, it moves upward to the ascending position H1 and returns to the state of FIG. 34A and waits. As the shutter mechanism 620 moves between the ascending position H1 and the lid closed position H3, the shutter mechanism 620 remains closed without moving, and when the shutter mechanism 620 is moved to the descending position H2, the shutter mechanism 620 is opened.

Outline of Immunoassay

In the structural examples shown in FIGS. 31 to 34, as described above, immunoassay is performed using R1 reagent to R5 reagent. As an example of immunoassay, an example in which the test substance 81 as a target substance is hepatitis B surface antigen (HBsAg) will be described referring to FIG. 35.

First, the sample containing the test substance 81 and the R1 reagent are dispensed into the reaction container 501. The R1 reagent is dispensed into the reaction container 501 by the first reagent dispensing unit 530a, and the sample is dispensed into the reaction container 501 by the sample dispensing unit 510. The R1 reagent contains the capture substance 84 and reacts with and binds to the test substance 81. The trapping substance 84 includes a binding substance for binding the capture substance 84 to the solid phase support 82 contained in the R2 reagent.

A combination of biotin and avidin, hapten and anti-hapten antibody, nickel and histidine tag, glutathione and glutathione-S-transferase and the like can be used for binding the binding substance and the solid phase carrier. "Avidins" means to include avidin and streptavidin.

For example, the capture substance 84 is an antibody modified with biotin (biotin antibody). That is, biotin is modified in the capture substance 84 as a binding substance. After dispensing the sample and the R1 reagent, the sample in the reaction container 501 is warmed to a predetermined temperature in the reaction unit 580, whereby the capture substance 84 and the test substance 81 are bonded.

Next, the R2 reagent is dispensed into the reaction container 501 by the second reagent dispensing unit 530b. The R2 reagent contains a solid phase carrier 82. The solid phase carrier 82 binds to the binding substance of the capture substance 84. The solid phase carrier 82 is, for example, magnetic particles (StAvi-bound magnetic particles) to which streptavidin bound to biotin is immobilized. Streptavidin of StAvi-binding magnetic particles reacts with biotin as a binding substance and binds. After dispensing the R2 reagent, the sample in the reaction container 501 is heated to a predetermined temperature in the reaction unit 580. As a result, the test substance 81 and the capture substance 84 are bonded to the solid phase carrier 82.

The test substance 81 and the capture substance 84 formed on the solid phase carrier 82 and the unreacted capture substance 84 are separated by a primary BF separation process performed by the BF separation unit 590. When the reaction container 501 is set in the processing port of the BF separation unit 590, the BF separation unit 590 suctions the liquid phase by the cleaning unit 591 in the magnetism-collected state by the magnetic force source 592, discharges the cleaning liquid, and stirs in the non-magnetism collected state, and each step is executed one or a plurality of times. Unreacted components such as unreacted trapping substance 84 are removed from the reaction container 501 by the primary BF separation treatment. In the primary BF separation process, the process proceeds to the next process in a state in which the liquid phase in the reaction container 501 is finally suctioned.

Figure 35:
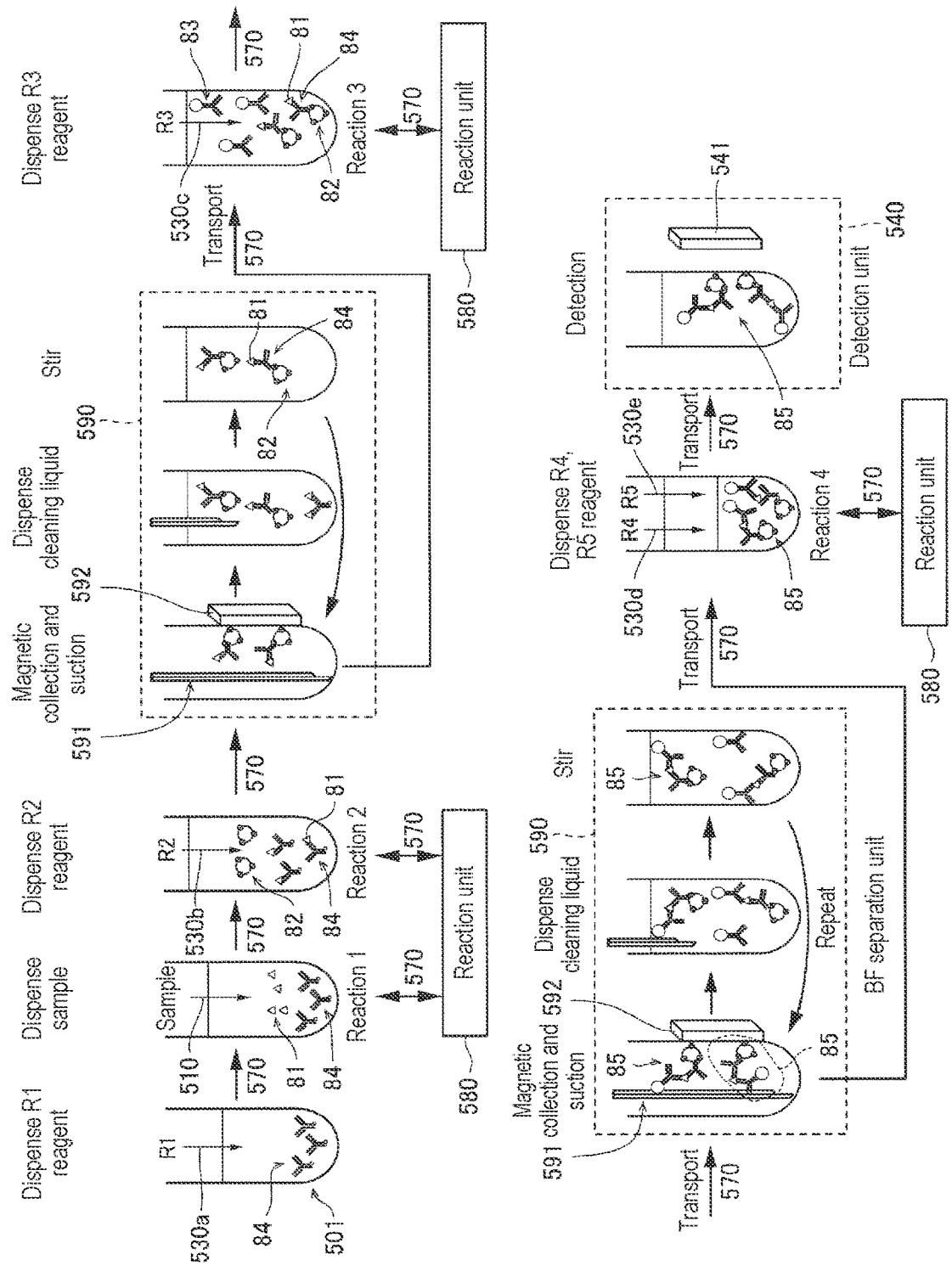
FIG. 35 is a diagram describing the analysis process of the sample measuring apparatus.

Next, the third reagent dispensing unit 530c dispenses the R3 reagent into the reaction container 501. The R3 reagent contains the labeling substance 83 and reacts with the test substance 81 to bind. After dispensing the R3 reagent, the sample in the reaction container 501 is heated to a predetermined temperature in the reaction unit 580. As a result, an immune complex 85 including the test substance 81, the labeling substance 83, and the capture substance 84 is formed on the solid phase carrier 82. In the example of FIG. 35, the labeling substance 83 is an ALP (alkaline phosphatase)-labeled antibody.

The immune complex 85 formed on the solid phase carrier 82 and the unreacted labeling substance 83 are separated by a secondary BF separation treatment. The BF separation unit 590 executes each step of suction of the liquid phase in the magnetism-collected state by the magnetic force source 592, discharges the cleaning liquid, and stirs one or more times in the non-magnetism-collected state. Unreacted components such as unreacted labeling substance 83 are removed from the reaction container 501 by the secondary BF separation treatment. In the secondary BF separation process, the process proceeds to the next process in the state in which the liquid phase in the reaction container 501 is finally suctioned.

Thereafter, the fourth reagent dispensing unit 530d and the fifth reagent dispensing section 530e respectively dispense the R4 reagent and the R5 reagent to the reaction container 501. The R4 reagent contains a buffer solution. The immune complex 85 bound to the solid phase carrier 82 is dispersed in the buffer solution. The R5 reagent contains a chemiluminescent substrate. The buffer contained in the R4 reagent has a composition that promotes a reaction between the label (enzyme) of the labeling substance 83 contained in the immunocomplex 85 and the substrate. After dispensing the R4 and R5 reagent, the sample in the reaction container 501 is heated to a predetermined temperature in the reaction unit 580. Light is generated by causing the substrate to react with the label, and the intensity of the generated light is measured by the photodetector 541 of the detection unit 540. The control unit 400 analyzes the content and the like of the test substance 81 in the sample based on the detection signals of the detection unit 540.

Description of Analysis Process Operation

Figure 36:
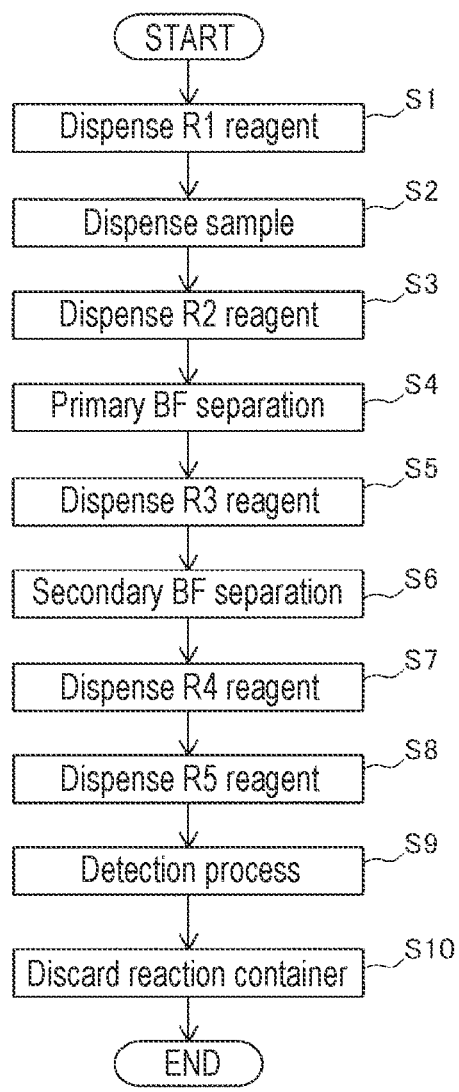
FIG. 36 is a flowchart describing the analysis process shown in FIG. 35.
Figure 37:
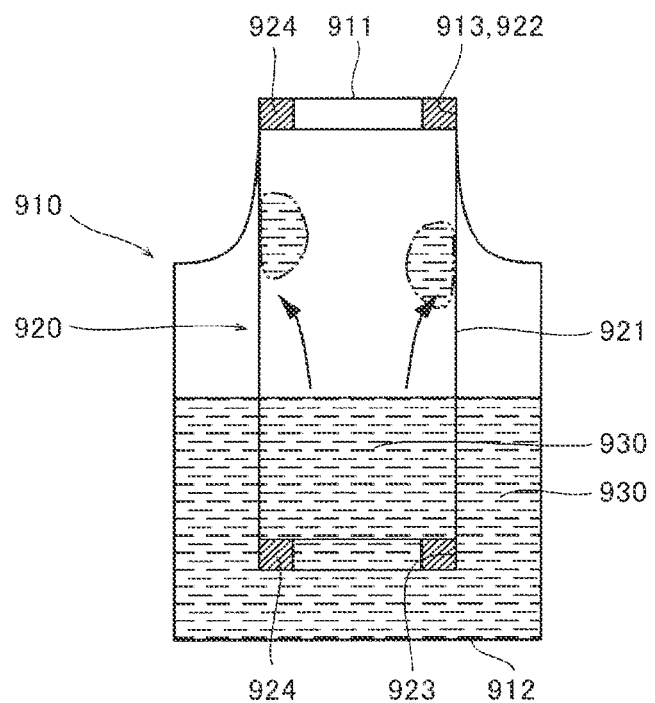
FIG. 37 is a diagram describing a conventional technique.

Next, the analysis process operation of the sample measuring apparatus 500 shown in FIG. 35 will be described with reference to FIG. 36. The process of each step shown in FIG. 36 is controlled by the control unit 400.

In step S1, the control unit 400 causes the reaction container transfer unit 570 to transfer the reaction container 501 to the R1 reagent dispensing position. The control unit 400 causes the first reagent dispensing unit 530a to dispense the R1 reagent into the reaction container 501.

In step S2, the sample is dispensed into the reaction container 501. The control unit 400 causes the sample dispensing unit 510 to suction the sample from the test tube on the sample transport unit 550. The control unit 400 causes the sample dispensing unit 510 to dispense the suctioned sample into the reaction container 501. After dispensing, the sample dispensing unit 510 is controlled so as to discard the dispensing tip at a disposal port (not shown). The sample dispensing unit 510 replaces the used dispensing tip with an unused dispensing chip every time a dispensing operation is performed via a dispensing tip.

In step S3, the control unit 400 causes the reaction container transfer unit 570 to transfer the reaction container 501 to the R2 reagent dispensing position, and causes the second reagent dispensing unit 530b to dispense the R2 reagent into the reaction container 501. After dispensing the R2 reagent, the control unit 400 causes the reaction container transfer unit 570 to transfer the reaction container 501 to the reaction unit 580. The reaction container 501 is heated in the reaction unit 580 for a predetermined time.

In step S4, the control unit 400 causes the BF separation unit 590 to execute the primary BF separation process. First, the control unit 400 causes the reaction container transfer unit 570 to transfer the reaction container 501 to the BF separation unit 590. The BF separation unit 590 performs a primary BF separation process (see FIG. 35) on the sample in the reaction container 501 and is controlled so as to remove the liquid component.

In step S5, the control unit 400 transfers the reaction container 501 to the R3 reagent dispensing position by the reaction container transferring unit 570, and dispenses the R3 reagent into the reaction container 501 by the third reagent dispensing unit 530c. After dispensing the R3 reagent, the control unit 400 causes the reaction container transfer unit 570 to transfer the reaction container 501 to the reaction unit 580. The reaction container 501 is heated in the reaction unit 580 for a predetermined time.

In step S6, the control unit 400 causes the BF separation unit 590 to execute the secondary BF separation process. First, the control unit 400 causes the reaction container transfer unit 570 to transfer the reaction container 501 to the BF separation unit 590. The BF separation unit 590 performs a secondary BF separation process (see FIG. 35) on the sample in the reaction container 501 and is controlled so as to remove the liquid component.

In step S7, the R4 reagent is dispensed into the reaction container 501. The control unit 400 causes the reaction container transfer unit 570 to transfer the reaction container 501 to the R4 reagent dispensing position and dispenses the R4 reagent into the reaction container 501 by the fourth reagent dispensing unit 530d.

In step S8, the R5 reagent is dispensed into the reaction container 501. The control unit 400 causes the reaction container transfer unit 570 to transfer the reaction container 501 to the R5 reagent dispensing position and dispenses the R5 reagent into the reaction container 501 by the fifth reagent dispensing unit 530e. After dispensing the R5 reagent, the control unit 400 causes the reaction container transfer unit 570 to transfer the reaction container 501 to the reaction unit 580. The reaction container 501 is heated in the reaction unit 580 for a predetermined time.

In step S9, detection process of the immune complex 85 is performed. The control unit 400 causes the reaction container transfer unit 570 to transfer the reaction container 501 to the detection unit 540. The detection unit 540 measures the intensity of light generated by causing the substrate to react with the label. The detection result of the detection unit 540 is output to the control unit 400.

After completion of the detection, in step S10 the reaction container transfer unit 570 is controlled so that the reaction container 501 after the analysis process is taken out from the detection unit 540 and discarded to a disposal port (not shown).

The analysis process operation by the sample measuring apparatus 500 is performed as described above.

It is to be understood that the embodiments disclosed herein are examples in all respects and are not restrictive. The scope of the present invention is indicated not by the description of the above embodiments but by the scope of the claims, and includes meanings equivalent to the claims and all changes within the scope thereof.

EXPLANATION OF REFERENCE NUMBERS 10, 110, 201, 202: container body
11, 111, 211, 221: top surface part
11a, 111a: opening
11b, 111b: guide part
12, 112, 212, 222: bottom part
13, 113, 213, 223: side surface parts
20, 120: suction tube introducing part
21a, 121a: upper opening
21b, 121b: lower opening
21c, 121c: tube
22, 122: protrusion
23, 123: first engaging part
100, 200, 300: reagent container
101: reagent
124: openable lid
124a: first region
124b: second region
124c: hinge
124d: protrusion
140, 203: upper cove 141, 231a, 231b: cover opening
142, 232: second engaging part
143, 233: gripped part
144, 234: first part
145, 235: second part
150, 204: lower cover
160: cap
251, 251a, 251b: fourth engaging part
500: sample measuring apparatus
501: reaction container
510: sample dispensing unit
520: container holding unit
530: reagent dispensing unit
531: suction tube
540: detection unit
610: container transfer unit.

What is claimed is:

1. A reagent container for use in a sample measuring apparatus having a suction tube for suctioning a reagent, the reagent container comprising: an upper surface part having an opening, a side surface part, and a bottom surface part that defines an internal space in which the reagent is stored; and a suction tube introducing part extending at least from the upper surface part to a position above a liquid level of the reagent to introduce the suction tube received from above the opening of the reagent container into the internal space, wherein the suction tube introducing part has a tubular shape and includes an upper opening and a lower opening, and is configured to receive the suction tube such that the suction tube passes through the upper opening and the lower opening, wherein suction tube introducing part is configured to maintain a size and shape of the lower opening independent of whether the suction tube passes through the lower opening.

2. The reagent container of claim 1, wherein the suction tube introducing part is provided at a position separated from the side surface part.

3. The reagent container of claim 1, further comprising:
a container body having the upper surface part, the bottom surface part, and the side surface part;
wherein the suction tube introducing part is formed separately from the container body and configured to be detachable from the reagent container.

4. The reagent container of claim 3, wherein the suction tube introducing part has an outer shape smaller than the opening of the upper surface part, and has a tube part to be inserted into the opening.

5. The reagent container of claim 4, wherein the suction tube introducing part has a protrusion having an outer shape larger than the opening.

6. The reagent container of claim 5, wherein:
the protrusion is provided at a position on the upper opening side of the suction tube introducing part.

7. The reagent container of claim 5, wherein:
the container body has a cylindrical guide part for inserting the suction tube introducing part from the opening; and
the protrusion has a first engaging part for engaging with the cylindrical guide part.

8. The reagent container of claim 7, wherein the cylindrical guide part and the first engaging part are configured to be engaged by a screw structure.

9. The reagent container of claim 7, wherein:
the cylindrical guide part is provided so as to protrude upward from the upper surface part; and
a distance from a lower end of the suction tube introducing part to the upper surface part of the suction tube introducing part is equal to or less than a protrusion length of the cylindrical guide part from the upper surface part.

10. The reagent container of claim 3, further comprising:
a cap provided separately from the suction tube introducing part and detachably attached to the container body to seal the opening thereof.

11. The reagent container of claim 1, wherein:
a lower end of the suction tube introducing part is disposed at a position that is one half of a distance from a liquid surface to the upper surface part.

12. The reagent container of claim 1, wherein:
a lower end of the suction tube introducing part is disposed at a position that is one half of a distance from a liquid surface to the upper surface part, wherein the liquid surface is set to be within a range of ⅖ or more and ⅘ or less of a distance from the bottom surface part to the upper surface part.

13. The reagent container of claim 1, wherein a lower end of the suction tube introducing part is disposed at a position separated from a liquid surface toward the upper surface part during agitation of the reagent by the sample measuring apparatus.

14. The reagent container of claim 1, wherein:
the suction tube introducing part faces away from the side surface part; and
a distance from a lower end of the suction tube introducing part to the upper surface part of the suction tube introducing part is equal to or less than a distance between the suction tube introducing part and the side surface part.

15. The reagent container of claim 1, wherein:
the upper surface part is formed in a flat plate shape substantially orthogonal to the side surface part;
the suction tube introducing part is provided so as to penetrate through the upper surface part; and
a distance from a lower end of the suction tube introducing part to the upper surface part is equal to or less than a distance from the suction tube introducing part to the upper opening.

16. The reagent container of claim 1, wherein:
the upper surface part is formed in a flat plate shape substantially orthogonal to the side surface part; and
the suction tube introducing part is disposed substantially at a center of the upper surface part.

17. The reagent container of claim 1, wherein the bottom surface part has a recessed part immediately below the suction tube introducing part and is inclined toward a concave part.

18. The reagent container of claim 17, wherein the recessed part is provided in the bottom surface part so as to extend along an oscillation direction of the reagent container when being stirred by the sample measuring apparatus.

19. A method for suctioning a reagent in a reagent container with a sample measuring apparatus having a suction tube, the method comprising:
inserting the suction tube into the reagent container which includes a bottom surface part, a side surface part, and an upper surface part with an opening, wherein the reagent container defines an internal space for accommodating the reagent, and a suction tube introducing part for introducing the suction tube received from above the opening into the internal space, wherein the suction tube introducing part comprises an upper opening and a lower opening, and wherein inserting the suction tube into the reagent container further comprises inserting the suction tube into the suction tube introducing part such that the suction tube passes through the upper opening and the lower opening without changing a size and a shape of the lower opening;

causing the suction tube to enter the internal space from the lower opening located at a lower end of the suction tube introducing part extending from the upper surface part to a position above a liquid level of the reagent; and suctioning the reagent by the suction tube at a position below the liquid level.

20. A sample measuring apparatus comprising:

a sample dispensing unit for suctioning a sample collected from a subject and dispensing the sample into a reaction vessel;

a container holding unit for holding a reagent container including an upper surface part having an opening, a bottom surface part, and a side surface part that defines an internal space for storing a reagent, and a suction tube introducing part that introduces a suction tube received from above the opening into the internal space, wherein the suction tube introducing part comprises an upper opening and a lower opening;

a reagent dispensing unit configured to suction reagent via the suction tube and dispense the suctioned reagent into the reaction vessel, the reagent dispensing unit comprising the suction tube configured to be inserted into the suction tube introducing part such that the suction tube passes through the upper opening and the lower opening without changing a size and a shape of the lower opening, and configured to be inserted into the internal space from the lower opening located at a lower end of the suction tube introducing part extending from the upper surface part to a position above a liquid surface of the reagent; and a detection unit for detecting a component contained in the sample in the reaction vessel containing the sample and the reagent.

* * * * *